United States Patent
Kaihoko

(10) Patent No.: US 8,842,243 B2
(45) Date of Patent: Sep. 23, 2014

(54) IPS OR FFS-MODE LIQUID-CRYSTAL DISPLAY DEVICE

(75) Inventor: Hiroyuki Kaihoko, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 160 days.

(21) Appl. No.: 13/361,649

(22) Filed: Jan. 30, 2012

(65) Prior Publication Data

US 2012/0194767 A1 Aug. 2, 2012

(30) Foreign Application Priority Data

Feb. 1, 2011 (JP) ................................. 2011-019670

(51) Int. Cl.
*G02F 1/1335* (2006.01)
*G02F 1/1343* (2006.01)
*G02B 5/30* (2006.01)
*G02F 1/13363* (2006.01)

(52) U.S. Cl.
CPC ........ *G02F 1/133634* (2013.01); *G02B 5/3083* (2013.01); *G02F 2001/133637* (2013.01); *G02F 2001/133633* (2013.01); *G02F 1/134363* (2013.01); *G02B 5/3033* (2013.01); *G02F 2413/06* (2013.01)
USPC ............. 349/117; 349/96; 349/118; 349/119; 349/121

(58) Field of Classification Search
None
See application file for complete search history.

(56) References Cited

U.S. PATENT DOCUMENTS

| 2006/0262255 A1* | 11/2006 | Wang et al. .................... 349/114 |
| 2008/0158490 A1* | 7/2008 | Nakayama et al. ........... 349/117 |
| 2010/0245725 A1* | 9/2010 | Kaihoko et al. ................ 349/96 |
| 2010/0253884 A1* | 10/2010 | Katou et al. .................... 349/96 |

FOREIGN PATENT DOCUMENTS

| JP | 2005-222004 | * | 8/2005 |
| JP | 2005-309382 | * | 11/2005 |
| JP | 2005-309382 A | | 11/2005 |
| JP | 4253259 B2 | | 1/2009 |

* cited by examiner

*Primary Examiner* — Bumsuk Won
*Assistant Examiner* — Ryan Crockett
(74) *Attorney, Agent, or Firm* — Jean C. Edwards, Esq.; Edwards Neils PLLC

(57) ABSTRACT

An IPS or FFS-mode liquid-crystal display device includes an optical compensatory film having a first retardation region and a second retardation region adjacent to the first retardation region, wherein a slow axis of the first retardation region is parallel to a slow axis of the second retardation region, retardation in-plane at a wavelength of 550 nm, Re(550) of the second retardation region is equal to or less than 20 nm, and retardation along the thickness-direction at a wavelength of 550 nm, Rth(550) of the second retardation region is from 20 nm to 120 nm, the first retardation region includes a retardation layer containing a vertically-aligned discotic liquid-crystal compound, and Re thereof at a wavelength of 450 nm, 550 nm and 650 nm, Re(450), Re(550) and Re(650) satisfy Re(450)/Re(550) of from 1 to 1.13 and Re(650)/Re(550) of from 0.94 to 1.

13 Claims, 4 Drawing Sheets

IPS OR FFS-MODE LIQUID-CRYSTAL DISPLAY DEVICE

CROSS-REFERENCE TO RELATED APPLICATIONS

The present application claims the benefit of priority from Japanese Patent Application No. 2011-019670, filed on Feb. 1, 2011, the contents of which are herein incorporated by reference in their entirety.

BACKGROUND OF THE INVENTION

1. Field of the Invention

The present invention relates to an IPS or FFS-mode liquid-crystal display device having improved viewing angle characteristics.

2. Background Art

IPS and FFS-mode liquid-crystal display devices become more and more versatile, and for example, have been used in TV displays or the like. Heretofore it is known that a retardation layer containing vertically-aligned discotic liquid-crystal compound molecules contributes toward improving the viewing angle characteristics of IPS-mode liquid-crystal display devices (Japanese Patent 4253259 and JP-A 2005-309382). Using the retardation layer in a simple configuration display device significantly improves the viewing angle contrast of the display device.

SUMMARY OF THE INVENTION

However, TV display devices are required to have more excellent viewing angle characteristics. The above-mentioned IPS-mode liquid-crystal display device may have a problem of color shift in oblique directions, and solving the problem is desired.

An object of the present invention is to provide an IPS or FFS-mode liquid-crystal display device of which not only the viewing angle contrast has been improved but also the color shift in oblique direction has been reduced.

The present inventors have assiduously studied and, as a result, have found that the color shift of the IPS-mode liquid-crystal display device, having the above-mentioned configuration, is influenced by the wavelength dispersion characteristics of retardation of the retardation layer that contains vertically-aligned discotic liquid-crystal molecules, and on the basis of this finding, the inventors have studied further and have made the present invention. Not only IPS-mode liquid-crystal display devices but also FFS-mode liquid-crystal display devices that are similarly classified in a group of horizontal alignment mode can achieve the advantage of the invention.

The means for achieving the above-described object are as follows:

[1] An IPS or FFS-mode liquid-crystal display device comprising:
  a first polarizing film,
  an optical compensatory film comprising a first retardation region and a second retardation region adjacent to the first retardation region,
  a first substrate
  a liquid-crystal layer comprising a nematic liquid-crystal material, and
  a second substrate in that order, wherein:
  liquid-crystal molecules of the nematic liquid-crystal material are aligned parallel to the surfaces of the pair of substrates at the black state,
  a slow axis of the first retardation region is parallel to a slow axis of the second retardation region,
  retardation in-plane at a wavelength of 550 nm, Re(550) of the second retardation region is equal to or less than 20 nm, and retardation along the thickness-direction at a wavelength of 550 nm, Rth(550) of the second retardation region is from 20 nm to 120 nm,
  the first retardation region comprises a retardation layer containing a vertically-aligned discotic liquid-crystal compound, and Re thereof at a wavelength of 450 nm, 550 nm and 650 nm, Re(450), Re(550) and Re(650) satisfy Re(450)/Re(550) of from 1 to 1.13 and Re(650)/Re(550) of from 0.94 to 1,
  where retardation in-plane Re and retardation along the thickness-direction Rth are defined as $Re=(nx-ny)\times d$, and $Rth=\{(nx+ny)/2-nz\}\times d$, in which nx and ny each are the in-plane refractive index ($nx \geq ny$), nz is the thickness-direction refractive index, and d is the thickness of the film.

[2] The IPS or FFS-mode liquid-crystal display device according to [1], wherein the first polarizing film, the first retardation region and the second retardation region are disposed in that order.

[3] The IPS or FFS-mode liquid-crystal display device according to claim [1], wherein the first polarizing film, the second retardation region and the first retardation region are disposed in that order.

[4] The IPS or FFS-mode liquid-crystal display device according to any one of [1]-[3], wherein Re(550) of the first retardation region is from 50 nm to 200 nm.

[5] The IPS or FFS-mode liquid-crystal display device according to any one of [1]-[4], wherein the absolute value of total Rth(550) of the optical compensatory film, |Rth(550)| is equal to or less than 40 nm.

[6] The IPS or FFS-mode liquid-crystal display device according to any one of [1]-[5], wherein the second retardation region comprises multiple layers, a layer of the multiple layers that is adjacent to the first retardation region is an alignment layer, the first retardation region comprises a composition containing at least a discotic liquid-crystal compound and an alignment controlling agent, and the alignment controlling agent has the effect of reducing the tilt angle of the director for the discotic liquid-crystal compound on the air interface side.

[7] The IPS or FFS-mode liquid-crystal display device according to any one of [2]-[6], wherein the first retardation region has a polymer film along with the retardation layer, and the polymer film is adjacent to the first polarizing film.

[8] The IPS or FFS-mode liquid-crystal display device according to any one of [1]-[7], which has a second polarizing film on the more outer side of the second substrate.

[9] The IPS or FFS-mode liquid-crystal display device according to [8], which has a polymer film between the second polarizing film and the second substrate.

[10] The IPS or FFS-mode liquid-crystal display device according to [7] or [9], wherein the absolute value of retardation in-plane at a wavelength of 550 nm, Re(550) of the polymer film, |Re(550)| is equal to or less than 10 nm, and the absolute value of retardation along the thickness-direction at the same wavelength, Rth(550) thereof, |Rth(550)| is equal to or less than 30 nm.

[11] The IPS or FFS-mode liquid-crystal display device according to [7], [9] or [10], wherein |Re(400)−Re(700)| of the polymer film is equal to or less than 10 nm, and |Rth(400)−Rth(700)| thereof is equal to or less than 35 nm.

[12] The IPS or FFS-mode liquid-crystal display device according to any one of [7] and [9]-[11], wherein the thickness of the polymer film is from 10 to 90 μm.

[13] The IPS or FFS-mode liquid-crystal display device according to any one of [7] and [9]-[12], wherein the polymer film is a cellulose acylate film, a cyclic olefin polymer film, or an acrylic polymer film.

[14] The IPS or FFS-mode liquid-crystal display device according to [13], wherein the acrylic polymer film contains an acrylic polymer containing at least one unit selected from a lactone ring unit, a maleic anhydride unit and a glutaric anhydride unit.

According to the invention, it is possible to provide an IPS or FFS-mode liquid-crystal display device of which not only the viewing angle contrast has been improved but also the color shift in oblique direction has been reduced.

Figure 1:
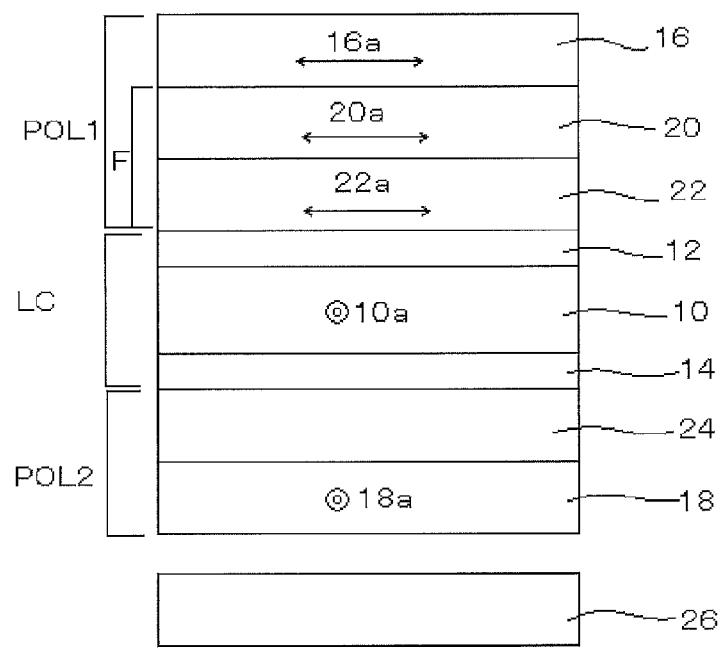
FIG. 1 is a schematic cross-sectional view of one example of an IPS or FFS-mode liquid-crystal display device of the invention.

In the drawings, the reference numerals and signs have the following meanings.
10 Liquid-Crystal Layer
12, 14 Substrate
16 First Polarizing Film
18 Second Polarizing Film
20 First Retardation Region
22 Second Retardation Region
24 Protective Film
26 Backlight

DETAILED DESCRIPTION OF THE INVENTION

Embodiments and constitutive members thereof of the liquid-crystal display device of the invention are described below in detail. In this description, the numerical range expressed by the wording "a number to another number" means the range that falls between the former number indicating the lower limit of the range and the latter number indicating the upper limit thereof.

In this description, the correlation between optical axes includes errors acceptable in the technical field to which the invention belongs. Concretely, "parallel" and "orthogonal" is meant to fall within a range of less than the strict angle±10°, preferably within a range of less than the strict angle±5°, more preferably within a range of less than the strict angle±3°. "Vertical alignment" is meant to fall within a range of less than ±20° from the strict vertical angle, preferably within a range of less than ±15°, more preferably within a range of less than ±10°. "Slow axis" means the direction in which the refractive index is the largest. Unless otherwise specifically indicated, the wavelength at which the refractive index is measured is λ=550 nm in a visible light region.

Unless otherwise specifically indicated in this description, "polarizing plate" is meant to include both a long polarizing plate and a polarizing plate cut into a size to be incorporated in a liquid-crystal device. In this description, "cutting" is meant to include "blanking" and "cutting out" and the like. In this description, "polarizing film" and "polarizing plate" are used as differentiated, and "polarizing plate" means a laminate having, on at least one side of "polarizing film", a transparent protective film to protect the polarizing film.

In the description of the embodiments given below, "symmetrical axis of molecule" is, when the molecule has a rotationally-symmetrical axis, meant to indicate that symmetrical axis, however, the term does not require that the molecule satisfies rotational symmetry in the strict sense of the word. In general, in a discotic liquid-crystal compound, the symmetrical axis of the molecule corresponds to the axis vertical to the discotic face and running through the center of the discotic face. This may be referred to as a director.

In this description, $Re(\lambda)$ and $Rth(\lambda)$ are retardation (nm) in plane and retardation (nm) along the thickness direction, respectively, at a wavelength of λ. $Re(\lambda)$ is measured by applying light having a wavelength of λnm to a film in the normal direction of the film, using KOBRA 21ADH or WR (by Oji Scientific Instruments). The selection of the measurement wavelength may be conducted according to the manual-exchange of the wavelength-selective-filter or according to the exchange of the measurement value by the program. When a film to be analyzed is expressed by a monoaxial or biaxial index ellipsoid, $Rth(\lambda)$ of the film is calculated as follows. This measurement method may be used partially in the measurement of the mean tilt angle at the alignment layer-interface or at the opposite interface of discotic liquid crystal molecules in an optically anisotropic layer.

$Rth(\lambda)$ is calculated by KOBRA 21ADH or WR on the basis of the six $Re(\lambda)$ values which are measured for incoming light of a wavelength λnm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane), a value of hypothetical mean refractive index, and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the $Rth(\lambda)$ of the film is calculated by KOBRA 21ADH or WR.

Around the slow axis as the inclination axis (rotation axis) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to formulae (11) and (12):

$$Re(\theta) = \left[ nx - \frac{(ny \times nz)}{\sqrt{\left\{ny\sin\left(\sin^{-1}\left(\frac{\sin(-\theta)}{nx}\right)\right)\right\}^2 + \left\{ny\cos\left(\sin^{-1}\left(\frac{\sin(-\theta)}{nx}\right)\right)\right\}^2}} \right] \times \qquad (11)$$

-continued $$\frac{d}{\cos\left\{\sin^{-1}\left(\frac{\sin(-\theta)}{nx}\right)\right\}}$$

Re(θ) represents a retardation value in the direction inclined by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the film.

$$Rth=\{(nx+ny)/2-nz\}\times d \quad (12)$$

In the formula, nx represents a refractive index in the in-plane slow axis direction; ny represents a refractive index in the in-plane direction perpendicular to nx; and nz represents a refractive index in the direction perpendicular to nx and ny. And "d" is a thickness of the film.

When the film to be analyzed is not expressed by a monoaxial or biaxial index ellipsoid, or that is, when the film does not have an optical axis, then Rth(λ) of the film may be calculated as follows:

Re(λ) of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of λnm applied in the inclined direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main optical films are listed below:

cellulose acylate (1.48), cycloolefin polymer (1.52), polycarbonate (1.59), polymethylmethacrylate (1.49) and polystyrene (1.59). KOBRA 21ADH or WR calculates nx, ny and nz, upon enter of the hypothetical values of these mean refractive indices and the film thickness. On the basis of thus-calculated nx, ny and nz, Nz=(nx−nz)/(nx−ny) is further calculated.

The wavelength λ for the measurement is a visible light wavelength, 550 nm so far as there is no specific notation.

(Measurement of Tilt Angle)

It is difficult to accurately and directly measure θ1, which is a tilt angle at a surface of an optically-anisotropic film (an angle between the physical symmetric axis of a discotic or rod-like liquid-crystal molecule in the optically-anisotropic film and an interface of the layer), and θ2, which is a tilt angle at another surface of the optically-anisotropic film. Therefore, in this description, θ1 and θ2 are calculated as follows: This method could not accurately express the actual alignment state, but may be helpful as a means for indicating the relative relationship of some optical characteristics of an optical film.

In this method, the following two points are assumed for facilitating the calculation, and the tilt angles at two interfaces of an optically-anisotropic film are determined.

1. It is assumed that an optically-anisotropic film is a multi-layered structure that comprises a layer containing discotic or rod-like compound(s). It is further assumed that the minimum unit layer constituting the structure (on the assumption that the tilt angle of the liquid crystal compound molecule is uniform inside the layer) is an optically-monoaxial layer.

2. It is assumed that the tilt angle in each layer varies monotonously as a linear function in the direction of the thickness of an optically-anisotropic layer.

A concrete method for calculation is as follows:

(1) In a plane in which the tilt angle in each layer monotonously varies as a linear function in the direction of the thickness of an optically-anisotropic film, the incident angle of light to be applied to the optically-anisotropic film is varied, and the retardation is measured at three or more angles. For simplifying the measurement and the calculation, it is desirable that the retardation is measured at three angles of −40°, 0° and +40° relative to the normal direction to the optically-anisotropic film of being at an angle of 0°. For the measurement, for example, used are KOBRA-21ADH and KOBRA-WR (by Oji Scientific Instruments), and transmission ellipsometers AEP-100 (by Shimadzu), M150 and M520 (by Nippon Bunko) and ABR10A (by Uniopto).

(2) In the above model, the refractive index of each layer for normal light is represented by n0; the refractive index thereof for abnormal light is by ne (ne is the same in all layers as well as n0); and the overall thickness of the multi-layer structure is represented by d. On the assumption that the tilting direction in each layer and the monoaxial optical axis direction of the layer are the same, the tilt angle θ1 in one face of the optically-anisotropic layer and the tilt angle θ2 in the other face thereof are fitted as variables in order that the calculated data of the angle dependence of the retardation of the optically-anisotropic layer could be the same as the found data thereof, and θ1 and θ2 are thus calculated.

In this, n0 and ne may be those known in literature and catalogues. When they are unknown, they may be measured with an Abbe's refractiometer. The thickness of the optically-anisotropic film may be measured with an optical interference thickness gauge or on a photograph showing the cross section of the layer taken by a scanning electronic microscope.

Embodiments of the invention are described in detail hereinunder with reference to the drawings.

FIG. 1 is a schematic cross-sectional view of one example of an IPS or FFS-mode liquid-crystal display device of the invention.

The liquid-crystal display device shown in FIG. 1 comprises at least a pair of a first polarizing film 16 and a second polarizing film 18, an optical compensational film F including a first retardation region 20 adjacent to the first polarizing film 16 and a second retardation region 22 adjacent to the first retardation region, and an IPS or FFS-mode liquid-crystal cell LC. On the outer side of the second polarizing film 18, disposed is a backlight 26.

In the liquid-crystal display device of FIG. 1, the liquid-crystal cell LC has a first substrate 12, a liquid-crystal layer 10 of a nematic liquid-crystal material, and a second substrate 14. The liquid-crystal layer 10 is an IPS or FFS-mode liquid-crystal cell in which the liquid-crystal molecules of the nematic liquid-crystal are aligned in parallel to the surface of the pair of substrates 12 and 14 at the black state. The product of the thickness d (μm) and the refractivity anisotropy Δn of the liquid-crystal layer, Δn·d is most suitably falls within a range of from 0.2 to 0.4 μm in the transmission-mode, IPS cell not having a twist structure, and within a range of from 0.3 to 0.5 μm in the FFS cell. Within the range, the brightness at the white state is high and the brightness at the black state is low, and therefore, the display device can have a bright and high contrast. On the surface of the substrates 12 and 14 adjacent to the liquid-crystal layer 10, formed is an alignment layer (not shown) by which the liquid-crystal molecules are aligned nearly in parallel to the surface of the substrate, and in accordance with the direction of the rubbing treatment given to the alignment layer, the alignment direction of the liquid-crystal molecules in a voltage-free state or in a low-voltage state are thereby controlled. On the inner surface of the substrate 12 or 14, formed is an electrode (not shown in FIG. 1) capable of applying voltage to the liquid-crystal molecules.

Figure 5:
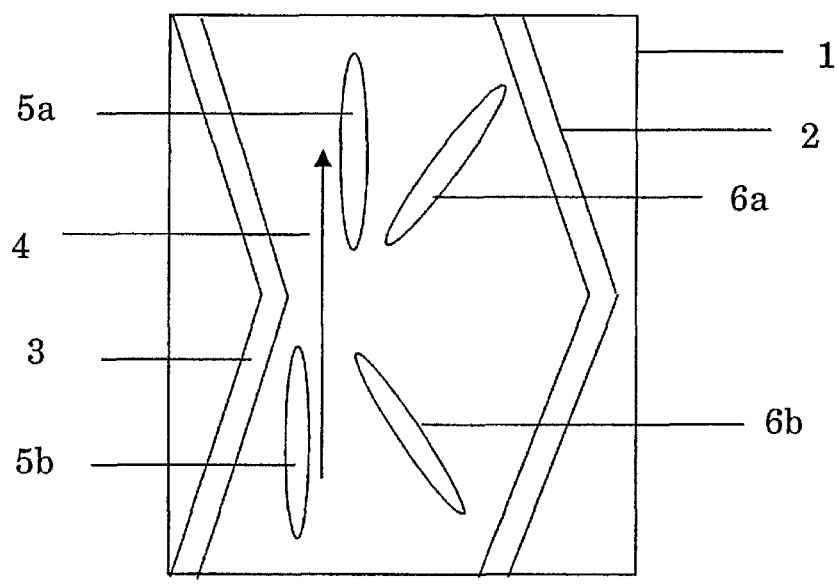
FIG. 5 is a graphical view showing an example of pixel region applicable to the invention.

In the liquid-crystal layer 10, the liquid-crystal molecules are not twisted in a voltage-free state, and for example, the molecules are controlled in accordance with the direction of the rubbing treatment of the alignment layer formed on the inner surface of the substrates 12 and 14 and are thereby aligned in a predetermined horizontal direction. When voltage is applied thereto, the liquid-crystal molecules are rotated horizontally by a predetermined angle owing to the electric field formed in the in-plane direction, and are thereby aligned in a predetermined direction. Regarding the form and the configuration of the electrode, various proposals are made and any of them is employable here. FIG. 5 graphically shows an example of alignment of the liquid-crystal molecules in one pixel region of the liquid-crystal layer 10. FIG. 5 is an example of a graphical view showing the alignment of liquid-crystal molecules in a region of an extremely small area corresponding to one pixel of the liquid-crystal layer 10, along with the rubbing direction 4 of the alignment layer formed on the inner surface of the substrates 12 and 14 and the electrodes 2 and 3 capable of applying voltage to the liquid-crystal molecules formed on the inner surface of the substrates 12 and 14 shown therein. In active driving with nematic liquid crystals having positive dielectric anisotropy as field-effect liquid crystals, the liquid-crystal molecules alignment directions in a voltage-free state or in a low-voltage state are 5a and 5b, and this state gives a black display. When voltage is applied between the electrodes 2 and 3, the liquid-crystal molecules change their alignment directions toward the directions 6a and 6b in accordance with the given voltage. In general, this stage gives a white display.

Again FIG. 1 is referred to, in which the absorption axis 16a of the first polarizing film 16 and the absorption axis 18a of the second polarizing film 18 are disposed orthogonally to each other. In a voltage-free state, the liquid-crystal molecules of the liquid-crystal layer 10 are horizontally aligned so that the slow axis 10a of the liquid-crystal layer 10 is parallel to the absorption axis 18a of the second polarizing film 18. Accordingly, the incident light from the backlight 26 passes through the liquid-crystal layer 10 while nearly keeping the polarized state thereof, and is blocked by the absorption axis 16a of the first polarizing film 16 thereby giving a black state. However, the incident light from the backlight 26 that has come in the device in oblique directions brings about light leakage since the absorption axes 16a and 18a of the polarizing films 16 and 18 are shifted from the orthogonal relationship, or that is, the viewing angle contrast is thereby lowered. The optical compensatory film F contributes to reducing the light leakage and improving the viewing angle contrast.

The optical compensatory film F comprises, for example, a second retardation region 22 including a polymer film or the like capable of being a support, and a first retardation region 20 including a retardation layer that contains vertically-aligned discotic liquid-crystal compound molecules. Heretofore, in case where a retardation layer containing vertically-aligned discotic liquid-crystal molecules is used for viewing angle compensation in an IPS-mode liquid-crystal display device or the like, the viewing angle contrast can be significantly improved, but on the other hand, there may occur a color shift in oblique directions; or that is, it is difficult to satisfy both the improvement of the viewing angle contrast and the reduction in the color shift.

One reason for the color shift in oblique directions is because the wavelength dispersion characteristics of retardation of the retardation layer used for optical compensation are not suitable. In general, the wavelength dispersion characteristics of retardation Re of the retardation layer formed by the use of a discotic liquid-crystal compound are determined depending on the properties of the discotic liquid-crystal compound used. For reducing the color shift, it is ideal that Re of the retardation layer has reversed wavelength dispersion characteristics of retardation in a visible light region; but on the other hand, in general, Re of the retardation layer formed by the use of a discotic liquid-crystal compound has regular wavelength dispersion characteristics of retardation. As a result of assiduous studies made by the present inventors, it has been known that, when the wavelength dispersion characteristics of Re of the first retardation region 20 satisfy Re(450)/Re(550) of from 1 to 1.13 and Re(650)/Re(550) of from 0.94 to 1, then the color shift could be reduced to a degree not giving any unpleasant sensation in observation with human eyes. Examples of the discotic liquid-crystal compound satisfying the characteristics are described below.

Figure 6:
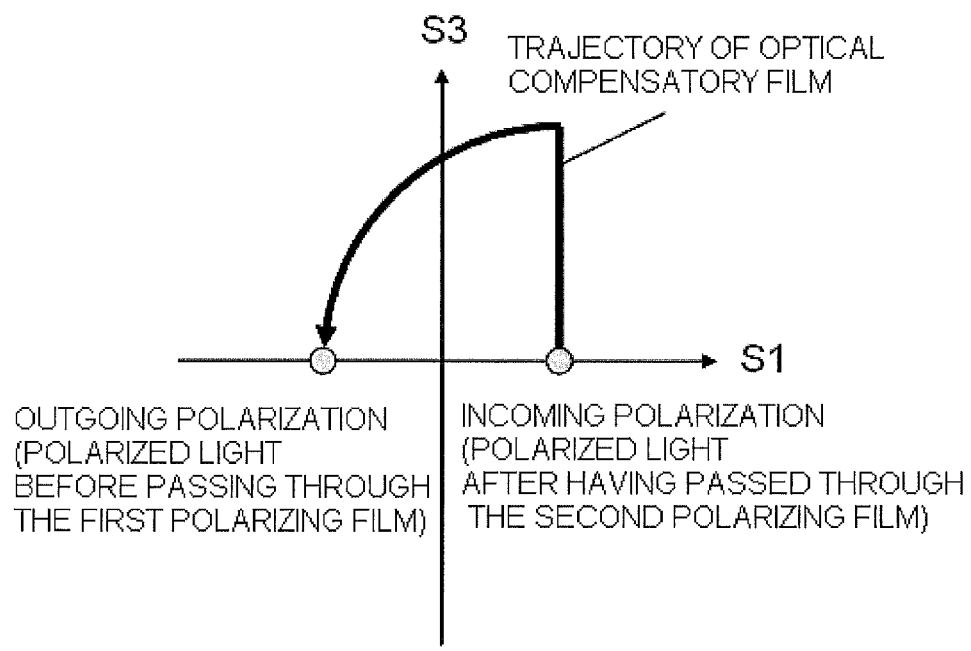
FIG. 6 is a view graphically showing, on a Poincare sphere, one example of the trajectory of the polarized state of the light having come in a liquid-crystal display device of the invention.

The first retardation region 20 is not specifically defined in point of Re and Rth thereof so far as the region satisfies the above-mentioned optical characteristics. Preferably, the absolute value of Rth(550) of the optical compensatory film F, as a whole, that comprises the first retardation region 20 and the second retardation region 22 is equal to or less than 40 nm, in view of improving the viewing angle contrast and reducing the color shift. The reason is described with referenced to the configuration of FIG. 1 at the black state. The transition of the polarization state of the incident light from the backlight 26 in an oblique direction that passes through the second polarizing film 18, the liquid-crystal layer 10, the optical compensatory film F and the first polarizing film 16 is shown on a Poincare sphere. The polarized light (incident light polarization) having passed through the second polarizing film and thereafter through the optical compensatory film runs along the trajectory shown in FIG. 6 and changes to the polarized light (going-out light polarization) before passing through the first polarizing film. In this state, the going-out light polarization is in a cross-Nicol relation to the first polarizing film, and therefore the brightness at the black state is thereby suppressed. As a result of assiduous studies made by the present inventors, it has been found that, when the absolute value of Rth(550) of the optical compensatory film is equal to or less than 40 nm, then the cross-Nicol relationship between the going-out light polarization and the first polarizing film is good.

The second retardation region 22 satisfies Re(550) of equal to or less than 20 nm and Rth(550) of from 20 to 120 nm. The second retardation region 22 is not specifically defined in point of the material thereof so far as the region satisfies the optical characteristics, and the region may be a single-layer structure or a laminate structure of two or more layers. Preferably, the region contains a self-supporting polymer film, as serving as the support of the first retardation region 20 to be formed by coating thereon. In one example to be mentioned here, the second retardation region 22 is a laminate that contains a polymer film and an alignment layer, and the alignment layer is adjacent to the first retardation region 20. The surface of the alignment layer may be processed for rubbing treatment, and preferably, the direction of the rubbing treatment is parallel to the slow axis direction of the polymer film (in general, the direction corresponds to the machine direction of the polymer film in many cases) as providing excellent production aptitude. Examples of the polymer film and the alignment layer usable for the second retardation region are described below.

In the liquid-crystal display device in FIG. 1, a protective film 24 for the second polarizing film 18 is disposed between the second polarizing film 18 and the liquid-crystal cell LC. From the viewpoint of improving the viewing angle contrast, the protective film 24 preferably has a low retardation, and concretely, the absolute value of Re(550) thereof, |Re(550)| is preferably equal to or less than 10 nm (more preferably equal to or less than 5 nm), and the absolute value of Rth(550) thereof, |Rth(550)| is preferably equal to or less than 30 nm (more preferably equal to or less than 15 nm). From the viewpoint of reducing the color shift in oblique directions, the protective film 24 preferably has low-level wavelength dispersion characteristics, and concretely, |Re(400)−Re(700)| is preferably equal to or less than 10 nm (more preferably equal to or less than 5 nm), and |Rth(400)−Rth(700)| is preferably equal to or less than 35 nm (more preferably equal to or less than 15 nm). From the viewpoint of the durability thereof, the protective film 24 is preferably thick in some degree, and concretely, the thickness thereof is preferably from 10 to 90 micro meters (more preferably from 40 to 80 micro meters). Examples of the polymer film usable as the protective film 24 are described below.

The protective film 24 is disposed for improving the durability of the second polarizing film 18 and the adhesiveness between the second polarizing film 18 and the substrate 14, and when the durability of the second polarizing film 18 and the adhesiveness thereof to the substrate 14 are sufficient, the protective film may be omitted.

Preferably, a protective film is disposed on the outside surface of the first polarizing film 16 and the second polarizing film 18. The first polarizing film 16 may be incorporated in the liquid-crystal display device as the polarizing plate POL1 having the optical compensatory film F on one surface thereof and having a protective film on the other surface thereof, and the second polarizing film 18 may be incorporated therein as the polarizing plate POL2 having the protective film 24 on one surface thereof and having a protective film on the other surface thereof.

The face of the optical compensatory film F that is adjacent to the first polarizing film 16 is the first retardation region 20 that contains a retardation layer containing vertically-aligned discotic liquid-crystal molecules; and in case where the first retardation region 20 is the retardation layer alone that is formed by curing a curable composition containing a discotic liquid-crystal compound, the adhesiveness thereof to the first polarizing film 16 may be poor. The adhesiveness of the region to the first polarizing film 16 may be enhanced by laminating a polymer film on the surface of the retardation layer. From the viewpoint of improving the viewing angle contrast, the polymer film is preferably a film having low Re and low Rth and having low-level wavelength dispersion characteristics of Re and Rth, or that is, it is desirable that optical characteristics of the polymer film are similar to those of the protective film 24.

Figure 2:
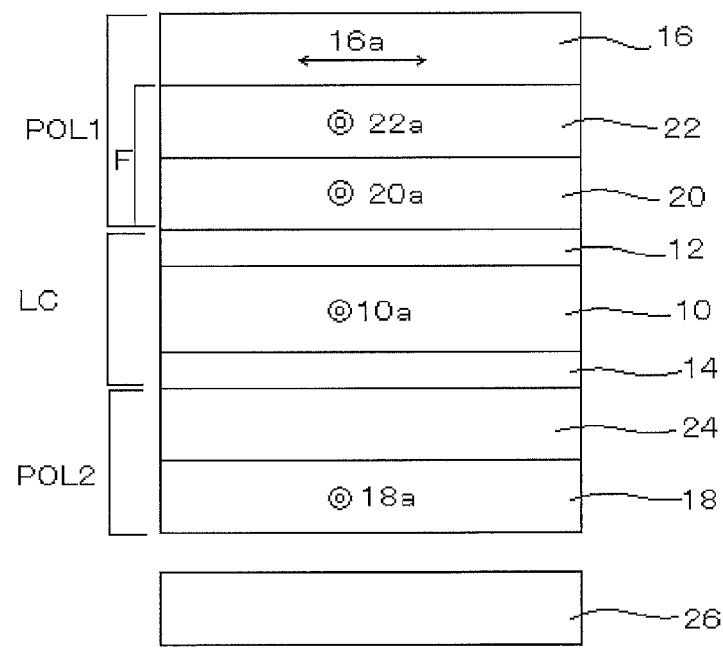
FIG. 2 is a schematic cross-sectional view of another example of an IPS or FFS-mode liquid-crystal display device of the invention.

As the case may be, the first retardation region 20 and the second retardation region 22 may be replaced with each other, or that is, the configuration shown in FIG. 2 is employable here. Any of these configurations attains the same effect of reducing the color shift. In the configuration of FIG. 2, the adhesiveness between the optical compensatory film F and the first polarizing film 16 can be enhanced and the configuration of the type is preferred from the viewpoint of the durability of the device. However, in this configuration, the slow axis of the first retardation region 20 must be rotated by 90 degrees from the slow axis of the second retardation region 22, and the configuration of the type is not suitable to a roll-to-roll system where a protective film coated with an adhesive is adhered to a roll-type optical compensatory film of a different type while the two are conveyed together, or that is, the productivity of the device having the configuration of the type is poor. Accordingly, the configuration of FIG. 1 is preferred.

The constitution of the backlight 26 is not specifically defined. Any of a light guide plate-type backlight or an underlight-type backlight is employable here. The backlight part of the light guide plate system is provided with a light source and a light guide plate; and backlight part of the underlight-type system is provided with a light source and a diffuser. The light source to be used is not also specifically defined. For example, usable here is any of light bulbs, light-emitting diodes (LED), electroluminescence panels (ELP), one or more cold-cathode fluorescent lamps (CCFL) and hot-cathode fluorescent lamps (HCFL), etc.

In the backlight 26, usable are a reflector for increasing the light utilization efficiency and any other member such as a brightness-increasing film or the like. Further, in constructing the liquid-crystal display device, one or more layers of any other members than the above-mentioned ones, for example, diffuser, protector, prism array, lens array sheet, light diffuser and the like may be disposed in the device.

Figure 3:
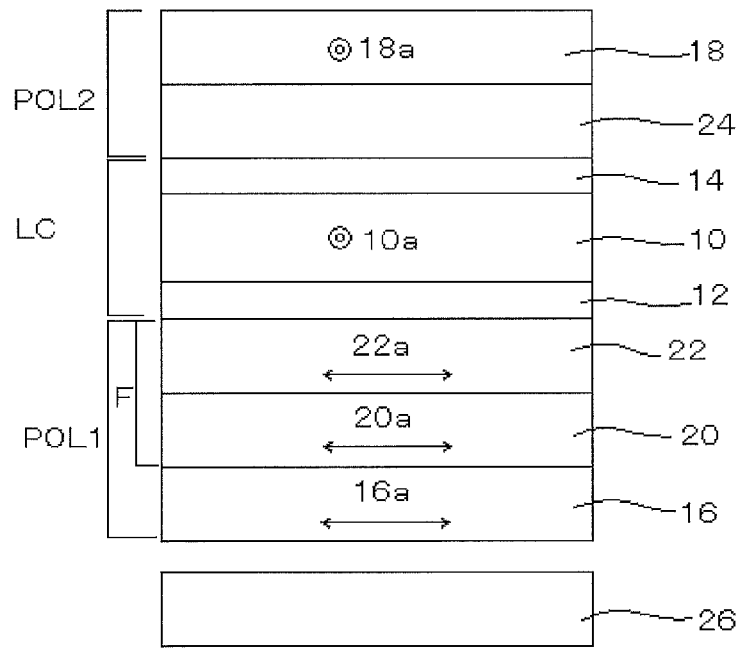
FIG. 3 is a schematic cross-sectional view of still another example of an IPS or FFS-mode liquid-crystal display device of the invention.
Figure 4:
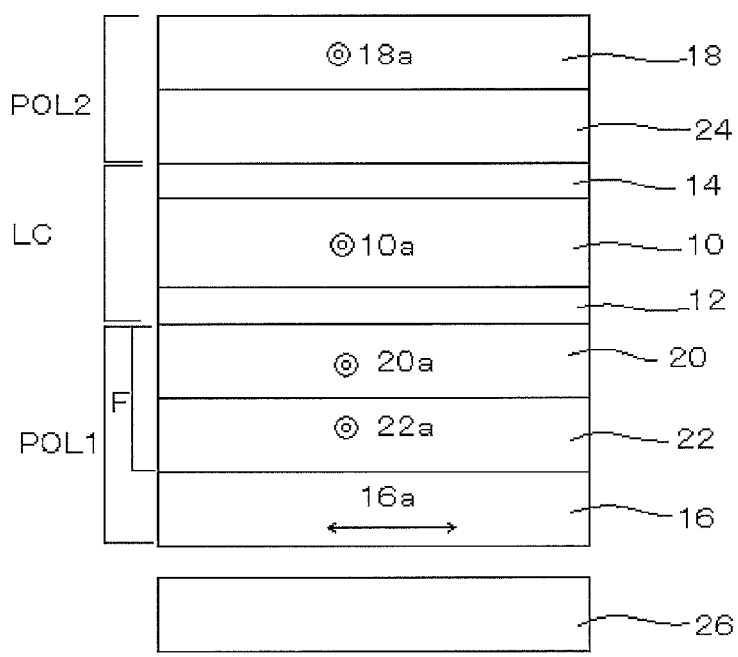
FIG. 4 is a schematic cross-sectional view of still another example of an IPS or FFS-mode liquid-crystal display device of the invention.

In the configurations shown in FIG. 1 and FIG. 2, the backlight 26 is disposed outside the second polarizing film 18; however, the backlight 26 may be disposed outside the first polarizing film 16, for example, as in the configurations of FIG. 3 and FIG. 4. The configurations of FIG. 3 and FIG. 4 attain the same effect as that of the configurations of FIG. 1 and FIG. 2.

The liquid-crystal display device of the invention includes a direct-view-type display device, a projection-type display device, and a light-modulation display device. The invention is especially effective in the embodiment thereof applied to an active matrix liquid-crystal display device using a three-terminal or two-terminal semiconductor element such as TFT or MIM. Needless-to-say, the invention is also effective when applied to a passive matrix liquid-crystal display device that is referred to as a time-sharing driving system.

Preferred optical characteristics of various members usable in the liquid-crystal display device of the invention and the materials for the members, as well as the production methods for them are described in detail hereinunder.

1. Optical Compensatory Film:

The liquid-crystal display device of the invention has an optical compensatory film that comprises a first retardation region containing a retardation layer containing vertically-aligned discotic liquid-crystal compound molecules and a second retardation region adjacent to the first retardation region and satisfying predetermined optical characteristics, and is characterized in that the wavelength dispersion characteristics of Re of the first retardation region fall within a predetermined range. The optical compensatory film is so designed that the slow axis of the first retardation region is parallel to the slow axis of the second retardation region. The first and second retardation regions each may have a single-layer structure or a laminate structure of two or more layers. Using the compensatory film of the type in the invention not only improves the viewing angle contrast but also reduces the color shift in oblique directions.

The wavelength dispersion characteristics of retardation in a visible light range of the first retardation region have some influence on the color shift occurring in oblique directions.

From the viewpoint of reducing the color shift, it is ideal that the wavelength dispersion characteristics of Re in the first retardation region are reversed wavelength dispersion characteristics, but in general, the wavelength dispersion characteristics of Re of the retardation layer formed by fixing the alignment of the discotic liquid-crystal compound molecules therein tend to be regular wavelength dispersion characteristics. As a result of assiduous studies made by the present inventors, it has been found that, even though Re of the first retardation region does not have reversed wavelength dispersion characteristics, but when Re(450)/Re(550) is from 1 to 1.13 (more preferably from 1 to 1.10) and Re(650)/Re(550) is from 0.94 to 1 (more preferably from 0.96 to 1.0), then the color shift in oblique directions can be reduced to a level not causing any problem in practical use. Examples of the discotic liquid-crystal compound capable of attaining the above-mentioned wavelength dispersion characteristics of retardation include discotic liquid-crystal compound represented by formula (I) mentioned below.

Re(550) of the second retardation region is equal to or less than 20 nm, and Rth(550) thereof is from 20 nm to 120 nm. Preferably, Re(550) is equal to or less than 15 nm, more preferably equal to or less than 10 nm, but ideally 0 nm. Rth(550) is preferably from 30 to 110 nm, more preferably from 40 to 100 nm.

On the other hand, Re and Rth of the first retardation region are not specifically defined. From the viewpoint of improving the viewing angle contrast as a whole of the optical compensatory film, preferably, Re(550) is from 50 to 200 nm, and also preferably, the absolute value of Rth(550) is equal to or less than 40 nm. In particular, when |Rth(550)| as a whole of the optical compensatory film is more than 40 nm, the viewing angle contrast may lower. In consideration of the optical characteristics of the second retardation region and the whole of the optical compensatory film, Re(550) of the first retardation region is preferably from 50 to 200 nm, more preferably from 80 to 170 nm, even more preferably from 100 to 150 nm, and Rth(550) thereof is preferably from 25 to 100 nm, more preferably from 40 to 85 nm, even more preferably from 50 to 75 nm.

One example of the optical compensatory film is an optical compensator film comprising a second retardation region that comprises a polymer film and an alignment layer formed on the polymer film, and a first retardation region that contains a retardation layer formed of a composition containing a discotic liquid-crystal compound and disposed adjacent to the alignment layer. In case where the optical compensatory film having the configuration of the type is produced continuously in the form a long film, it is general that the machine direction of the polymer film to be the support (in general, the direction corresponds to the slow axis of the polymer film) corresponds to the alignment control direction of the alignment layer (in general, when the alignment layer is a rubbed alignment layer, the direction is the rubbing treatment direction), from the viewpoint of the production aptitude thereof. In general, discotic liquid-crystal molecules are vertically aligned with the discotic face thereof kept inlayed along the grooves of the alignment layer surface formed through the rubbing treatment (hereinafter this may be referred to as "parallel vertical alignment"), and therefore the slow axis of the retardation layer to be formed by fixing the alignment state as such is to be parallel to the slow axis of the polymer film.

The materials and the methods to be used in producing the optical compensatory film having the above-mentioned configuration are described in detail hereinunder.

(1) Second Retardation Region:

One example of the second retardation region to be used in the optical compensatory film having the above-mentioned configuration is a laminate film comprising at least a polymer film to be a support and an alignment layer formed on the polymer film.

Polymer Film:

Having the above-mentioned optical characteristics, the material of the polymer film for use in the second retardation region is not specifically defined. Examples of the polymer film include a cellulose acylate film (for example, a cellulose triacetate film having a refractive index of 1.48, a cellulose diacetate film, a cellulose acetate butyrate film, a cellulose acetate propionate film), a polyethylene terephthalate film, a polyether sulfone film, a polyacrylic resin film, a polyurethane resin film, a polyester film, a polycarbonate film, a polysulfone film, a polyether film, a polymethylpentene film, a polyether ketone film, a (meth)acrylonitrile film, a polyolefin film, a film of an alicyclic structure-having polymer (Arton, trade name by JSR; amorphous polyolefin (Zeonex, trade name by Nippon Zeon)), a polypropylene film, etc. Of those, preferred are a triacetyl cellulose, a polyethylene terephthalate and a polymer having an alicyclic structure; and more preferred is a triacetyl cellulose.

Preferably, the cellulose acylate film is formed according to a solvent casting method. Regarding production examples for a cellulose acylate film according to a solvent casting method, referred to are U.S. Pat. Nos. 2,336,310, 2,367,603, 2,492,078, 2,492,977, 2,492,978, 2,607,704, 2,739,069 and 2,739,070; British Patents 640731 and 736892; and JP-B 45-4554, 49-5614, JP-A 60-176834, 60-203430 and 62-115035, etc. The cellulose acylate film may be stretched. For the method and the condition for the stretching treatment, for example, referred to are JP-A 62-115035, 4-152125, 4-284211, 4-298310, 11-48271, etc.

A method of stretching in the transverse direction (TD stretching) is described, for example, in 62-115035, 4-152125, 4-284211, 4-298310, 11-48271, etc. In stretching in the transverse direction, the film may be conveyed while the width thereof is held with a tenter, and the tenter width may be gradually expanded to thereby stretch the film. After dried, the film may be stretched with a stretcher (preferably in a mode of monoaxial stretching with a long stretcher). In case where the film is stretched in the machine direction (MD stretching), for example, two pairs of nip rolls are disposed, and while the distance between them is heated, the peripheral speed of the nip rolls on the outlet port side is made higher than the peripheral speed of the nip rolls on the inlet port side, thereby stretching the film therebetween. In this case, by varying the distance (L) between the nip rolls and the width (W) of the unstretched film, the retardation level in the thickness direction of the stretched film may be controlled. When L/W is from more than 2 to 50 (long spun stretching), Rth could be small; and when L/W is from 0.01 to 0.3 (short spun stretching), Rth could be large. In the invention, any of long spun stretching, short spun stretching or a region between these (intermediate stretching, L/W is from more than 0.3 to 2) may be employed; but preferred is long spun stretching or short spun stretching in which the alignment angle can be small. Further, it is desirable that short spun stretching is employed for attaining a high Rth and long spun stretching is employed for attaining a low Rth, or that is, the stretching modes are preferably employed in distinction from each other in that manner.

Preferably, the stretching temperature in machine-direction stretching is from (Tg−10 degrees Celsius) to (Tg+50 degrees Celsius), more preferably from (Tg−5 degrees Celsius) to (Tg+40 degrees Celsius), even more preferably from (Tg+5 degrees Celsius) to (Tg+30 degrees Celsius). By controlling the speed of the conveyance rollers for the film, the film winding speed may be made higher than the film peeling speed to thereby stretch the film.

In the above, an optical compensatory film having a laminate structure in which an optically anisotropic layer is formed on the support has been described, however, the invention is not limited to this embodiment. Needless-to-say, the optically anisotropic layer may be formed of a stretched polymer film alone, or may be formed of a liquid-crystal film of a composition containing a liquid-crystal compound. Preferred examples of the stretched polymer film are the same as those of the support that the optical film has. Preferred examples of the liquid-crystal film are also the same as those of the optically anisotropic layer that the optical compensatory film has.

The second retardation region may be formed of a stretched polymer film alone, or may be formed of a liquid-crystal film of a composition containing a liquid-crystal compound.

Preferably, the second retardation region is produced continuously in the form of a long film. In case where the second retardation region is formed of a liquid-crystal compound, the angle of the slow axis of the second retardation region can be controlled by the angle in rubbing. In case where the second retardation region is formed of a stretched polymer film, the angle of the slow axis thereof can be controlled by the stretching direction. When the slow axis of the second retardation region is made parallel to or perpendicular to the machine direction of the long film, then the long polarizing film may be stuck to the region in a roll-to-roll process, in which the axial angle accuracy in sticking is high and the polarizing plate can be produced at high productivity.

Preferably, the optical compensatory film is produced continuously in the form of a long film. In case where the optically anisotropic layer is formed of a liquid-crystal compound, the angle of the slow axis of the optically anisotropic layer can be controlled by the angle in rubbing. In case where the optically anisotropic layer is formed of a stretched polymer film, the angle of the slow axis thereof can be controlled by the stretching direction. When the slow axis of the second retardation region is made parallel to or perpendicular to the machine direction of the long film, then the long polarizing film may be stuck to the layer in a roll-to-roll process, in which the axial angle accuracy in sticking is high and the polarizing plate can be produced at high productivity.

The surface of the polymer film may be surface-treated (e.g., as glow discharge treatment, corona discharge treatment, UV treatment, flame treatment, alkali saponification) for the purpose of enhancing the adhesiveness thereof to alignment layer. As the case may be, an adhesive layer (undercoat layer) may be formed on the film. In this embodiment, preferably, the back of the polymer surface (on the side thereof on which alignment layer and first retardation region are not formed) is also surface-treated through alkali saponification or the like since the back thereof is stuck to polarizing film.

Alignment Layer:

Examples of the alignment layer usable in this embodiment are not specifically defined. Above all, preferred is a rubbed alignment layer to be formed by rubbing the surface of a film formed of a composition mainly comprising a polymer. Examples of the polymer usable in forming the alignment layer include, for example, methacrylate copolymers, styrene copolymers, polyolefins, polyvinyl alcohol and modified polyvinyl alcohols, poly(N-methylolacrylamides), polyesters, polyimides, vinyl acetate copolymers, carboxymethyl cellulose, polycarbonates and others, as in JP-A 8-338913, paragraph [0022]. A silane coupling agent may also be used as the polymer. Water-soluble polymers (e.g., poly(N-methylolacrylamide), carboxymethyl cellulose, gelatin, polyvinyl alcohol, modified polyvinyl alcohol) are preferred; gelatin, polyvinyl alcohol and modified polyvinyl alcohols are more preferred; and polyvinyl alcohol and modified polyvinyl alcohols are most preferred. The degree of saponification of polyvinyl alcohol for use herein is preferably from 70 to 100%, more preferably from 80 to 100%. Also preferably, the degree of polymerization of polyvinyl alcohol is from 100 to 5000.

In forming the alignment layer, the ingredients may be crosslinked. For the crosslinking reaction, a polymer having a crosslinkable functional group in the side chains thereof may be used as the main ingredient polymer, or a crosslinking agent may be additionally used.

The alignment layer may be formed on the surface of a polymer film by applying thereonto a coating composition containing the above-mentioned main polymer, drying it and optionally crosslinking the ingredients in the formed film. Examples of the coating method employable here include a spin coating method, a dip coating method, a curtain coating method, an extrusion coating method, a rod coating method, and a roll coating method. Preferred is a rod coating method. Preferably, the thickness of the film after dried is from 0.1 to 10 μm.

After formed, the surface of the film is rubbed. From the viewpoint of the production aptitude, the rubbing treatment is preferably attained in the polymer film traveling direction, or that is, in the machine direction of the long film produced continuously. The rubbing treatment may be attained by rubbing the surface of the film continuously in a predetermined direction with paper, gauze, felt, rubber, nylon, polyester fibers, etc.

In addition, an optical alignment layer may also be used here as the alignment layer.

In the manner as above, the second retardation region of a laminate film can be formed, which comprises a polymer film satisfying predetermined optical characteristics and an alignment layer, and in which the slow axis direction of the polymer film (in general, this corresponds to the machine direction of the polymer film in many cases) corresponds to the alignment control direction of the alignment layer (when the alignment layer is a rubbed alignment layer, this direction is the rubbing direction of the film).

(2) First Retardation Region:

One example of the first retardation region is a retardation layer formed by curing a curable composition containing a discotic liquid-crystal compound, or a laminate that comprises such a retardation layer and a polymer film formed on the layer. The polymer film is used for enhancing the adhesiveness of the region to the first polarizing film, and is preferably disposed as the outermost surface layer to be stuck to the first polarizing film.

Examples of the discotic liquid crystalline compound which can be used in the invention for preparing the first retardation region include those described in various publications (C. Destrade et al., Mol. Crysr. Liq. Cryst., Vol. 71, page 111 (1981); Kikan Kagaku Sosetu (Quarterly Chemistry Review), No. 22, Ekisho no Kagaku (Chemistry of Liquid Crystals), Chapter V, Chapter X, 2nd Section, Ed. by The Chemical Society of Japan, (1994); B. Kohne et al., Angew. Chem. Soc. Chem. Comm., page 1794 (1985); J. Zhang et al., J. Am. Chem. Soc., Vol. 116, page 2655 (1994)).

Especially, the compound represented by formula (I) is suitable for preparing the retardation layer satisfying the above-described wavelength dispersion characteristics.

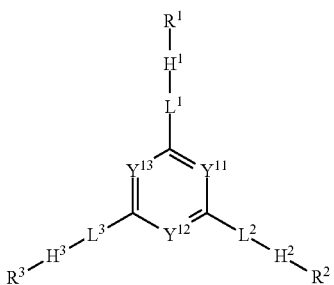

(I)

In the formula, $Y^{11}$, $Y^{12}$ and $Y^{13}$ each independently represent a methine group or a nitrogen atom.

When each of $Y^{11}$, $Y^{12}$ and $Y^{13}$ each is a methine group, the hydrogen atom of the methine group may be substituted with a substituent. Examples of the substituent of the methine group include an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom, and a cyano group. Of those, preferred are an alkyl group, an alkoxy group, an alkoxycarbonyl group, an acyloxy group, a halogen atom and a cyano group; more preferred are an alkyl group having from 1 to 12 carbon atoms (the term "carbon atoms" means hydrocarbons in a substituent, and the terms appearing in the description of the substituent of the discotic liquid crystal compound have the same meaning), an alkoxy group having from 1 to 12 carbon atoms, an alkoxycarbonyl group having from 2 to 12 carbon atoms, an acyloxy group having from 2 to 12 carbon atoms, a halogen atom and a cyano group.

Preferably, $Y^1$, $Y^2$ and $Y^3$ are all methine groups, more preferably non-substituted methine groups, in terms of ease to cost of preparation.

In the formula, $L^1$, $L^2$ and $L^3$ each independently represent a single bond or a bivalent linking group.

The bivalent linking group is preferably selected from —O—, —S—, —C(=O)—, —NR$^7$—, —CH=CH—, —C≡C—, a bivalent cyclic group, and their combinations. $R^7$ represents an alkyl group having from 1 to 7 carbon atoms, or a hydrogen atom, preferably an alkyl group having from 1 to 4 carbon atoms, or a hydrogen atom, more preferably a methyl, an ethyl or a hydrogen atom, even more preferably a hydrogen atom.

The bivalent cyclic group, occasionally referred to as cyclic group, represented by $L^1$, $L^2$ or $L^3$ means any bivalent linking group having a cyclic structure. The cyclic group is preferably a 5-membered, 6-membered or 7-membered group, more preferably a 5-membered or 6-membered group, even more preferably a 6-membered group. The ring in the cyclic group may be a condensed ring. However, a monocyclic ring is preferred to a condensed ring for it. The ring in the cyclic ring may be any of an aromatic ring, an aliphatic ring, or a hetero ring. Examples of the aromatic ring are a benzene ring and a naphthalene ring. An example of the aliphatic ring is a cyclohexane ring. Examples of the hetero ring are a pyridine ring and a pyrimidine ring. Preferably, the cyclic group contains an aromatic ring or a hetero ring. In the invention, the bivalent cyclic group is preferably a bivalent cyclic group formed of only a cyclic structure which may have at least one substituent. The same is applied to the following description.

Of the bivalent cyclic group, the benzene ring-having cyclic group is preferably a 1,4-phenylene group. The naphthalene ring-having cyclic group is preferably a naphthalene-1,5-diyl group or a naphthalene-2,6-diyl group. The pyridine ring-having cyclic group is preferably a pyridine-2,5-diyl group. The pyrimidine ring-having cyclic group is preferably a pyrimidin-2,5-diyl group.

The bivalent cyclic group for $L^1$, $L^2$ and $L^3$ may have a substituent. Examples of the substituent are a halogen atom (preferably a fluorine or chlorine atom), cyano, nitro, an alkyl group having from 1 to 16 carbon atoms, an alkenyl group having from 2 to 16 carbon atoms, an alkynyl group having from 2 to 16 carbon atoms, a halogen atom-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms.

In the formula, $L^1$, $L^2$ and $L^3$ are preferably a single bond, *—O—CO—, *—CO—O—, *—CH=CH—, *—C≡C—, *-"bivalent cyclic group"-, *—O—CO-"bivalent cyclic group"-, *—CO—O-"bivalent cyclic group"-, *—CH=CH-"bivalent cyclic group"-, *—C≡C-"bivalent cyclic group"-, *-"bivalent cyclic group"-O—CO—, *-"bivalent cyclic group"-CO—O—, *-"bivalent cyclic group"-CH=CH—, or *-"bivalent cyclic group"-C≡C—. More preferably, they are a single bond, *—CH=CH—, *—C≡C—, *—CH=CH-"bivalent cyclic group"- or *—C≡C-"bivalent cyclic group"-, even more preferably a single bond. In the examples, "*" indicates the position at which the group bonds to the 6-membered ring of the formula that contains $Y^{11}$, $Y^{12}$ and $Y^{13}$.

In formula (I), $H^1$, $H^2$ and $H^3$ each independently represent the following formula (I-A) or (I-B):

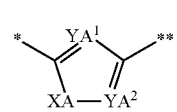

(I-A)

In formula (I-A), $YA^1$ and $YA^2$ each independently represent a methine group or a nitrogen atom;

XA represents an oxygen atom, a sulfur atom, a methylene group or an imino group;

* indicates the position at which the formula bonds to any of $L^1$ to $L^3$ in formula (I); and

** indicates the position at which the formula bonds to any of $R^1$ to $R^3$ in formula (I).

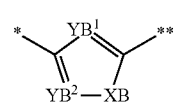

(I-B)

In formula (I-B), $YB^1$ and $YB^2$ each independently represent a methine group or a nitrogen atom;

XB represents an oxygen atom, a sulfur atom, a methylene group or an imino group;

* indicates the position at which the formula bonds to any of $L^1$ to $L^3$ in formula (I); and

** indicates the position at which the formula bonds to any of $R^1$ to $R^3$ in formula (I).

In the formula, $R^1$, $R^2$ and $R^3$ each independently represent the following formula (I-R):

$$*\text{-}(\text{-}L^{21}\text{-}Q^2)_{n1}\text{-}L^{22}\text{-}L^{23}\text{-}Q^1 \qquad \text{(I-R)}$$

In formula (I-R), * indicates the position at which the formula bonds to $H^1$, $H^2$ or $H^3$ in formula (I).

$L^{21}$ represents a single bond or a bivalent linking group. When $L^{21}$ is a bivalent linking group, it is preferably selected from a group consisting of —O—, —S—, —C(=O)—, —NR$^7$—, —CH=CH—, —C≡C—, and their combination. $R^7$ represents an alkyl group having from 1 to 7 carbon atoms, or a hydrogen atom, preferably an alkyl group having from 1 to 4 carbon atoms, or a hydrogen atom, more preferably a methyl group, an ethyl group or a hydrogen atom, even more preferably a hydrogen atom.

In the formula, $L^{21}$ is preferably a single bond, —O—CO—, —CO—O—, —CH=CH— or —C≡C— (in which ** indicates the side indicated by "*" in formula (I-R)). More preferably it is a single bond.

In formula (I-R), $Q^2$ represents a bivalent cyclic linking group having at least one cyclic structure. The cyclic structure is preferably a 5-membered ring, a 6-membered ring, or a 7-membered ring, more preferably a 5-membered ring or a 6-membered ring, even more preferably a 6-membered ring. The cyclic structure may be a condensed ring. However, a monocyclic ring is preferred to a condensed ring for it. The ring in the cyclic ring may be any of an aromatic ring, an aliphatic ring, or a hetero ring. Examples of the aromatic ring are a benzene ring, a naphthalene ring, an anthracene ring, a phenanthrene ring. An example of the aliphatic ring is a cyclohexane ring. Examples of the hetero ring are a pyridine ring and a pyrimidine ring.

The benzene ring-having group for $Q^2$ is preferably a 1,4-phenylene group. The naphthalene ring-having group is preferably a naphthalene-1,4-diyl group, a naphthalene-1,5-diyl group, a naphthalene-1,6-diyl group, a naphthalene-2,5-diyl group, a naphthalene-2,6-diyl group, or a naphthalene-2,7-diyl group. The cyclohexane ring-having group is preferably a 1,4-cyclohexylene group. The pyridine ring-having group is preferably a pyridine-2,5-diyl group. The pyrimidine ring-having group is preferably a pyrimidin-2,5-diyl group. More preferably, $Q^2$ is a 1,4-phenylene group, a naphthalene-2,6-diyl group, or a 1,4-cyclohexylene group.

In the formula, $Q^2$ may have a substituent. Examples of the substituent are a halogen atom (e.g., fluorine atom, chlorine atom, bromine atom, iodine atom), cyano, nitro, an alkyl group having from 1 to 16 carbon atoms, an alkenyl group having from 1 to 16 carbon atoms, an alkynyl group having from 2 to 16 carbon atoms, a halogen atom-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. The substituent is preferably a halogen atom, a cyano group, an alkyl group having from 1 to 6 carbon atoms, a halogen atom-substituted alkyl group having from 1 to 6 carbon atoms, more preferably a halogen atom, an alkyl group having from 1 to 4 carbon atoms, a halogen atom-substituted alkyl group having from 1 to 4 carbon atoms, even more preferably a halogen atom, an alkyl group having from 1 to 3 carbon atoms, or a trifluoromethyl group.

In the formula, n1 indicates an integer of from 0 to 4. n1 is preferably an integer of from 1 to 3, more preferably 1 or 2.

In the formula, $L^{22}$ represents —O—, —O—CO—, —CO—O—, —O—CO—O—, —S—, —NH—, —SO$_2$—, —CH$_2$—, —CH=CH— or —C≡C—, where "**" indicates the site linking to the $Q^2$ side.

$L^{22}$ preferably represents —O—, —O—CO—, —CO—O—, —O—CO—O—, —CH$_2$—, —CH=CH— or —C≡C—, or more preferably —O—, —O—CO—, —O—CO—O— or **—CH$_2$—. When $L^{22}$ has a hydrogen atom, then the hydrogen atom may be substituted with a substituent. Examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms.

In the formula, $L^{23}$ represents a bivalent linking group selected from —O—, —S—, —C(=O)—, —SO$_2$—, —NH—, —CH$_2$—, —CH=CH— and —C≡C—, and a group formed by linking two or more of these. The hydrogen atom in —NH—, —CH$_2$— and —CH=CH— may be substituted with any other substituent. Examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms. The group substituted with the substituent improves the solubility of the compound of formula (I) in solvent, and therefore the composition of the invention containing the compound can be readily prepared as a coating liquid.

In the formula, $L^{23}$ is preferably a linking group selected from a group consisting of —O—, —C(=O)—, —CH$_2$—, —CH=CH— and —C≡C—, and a group formed by linking two or more of these. $L^{23}$ preferably has from 1 to 20 carbon atoms, more preferably from 2 to 14 carbon atoms. Preferably, $L^{23}$ has from 1 to 16 (—CH$_2$—)'s, more preferably from 2 to 12 (—CH$_2$—)'s.

In the formula, $Q^1$ represents a polymerizable group or a hydrogen atom. When the compound of formula (DI) is used in producing optical films of which the retardation is required not to change by heat, such as optical compensatory films, $Q^1$ is preferably a polymerizable group. The polymerization for the group is preferably addition polymerization (including ring-cleavage polymerization) or polycondensation. In other words, the polymerizing group preferably has a functional group that enables addition polymerization or polycondensation. Examples of the polymerizing group are shown below.

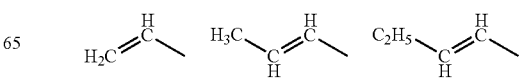

-continued

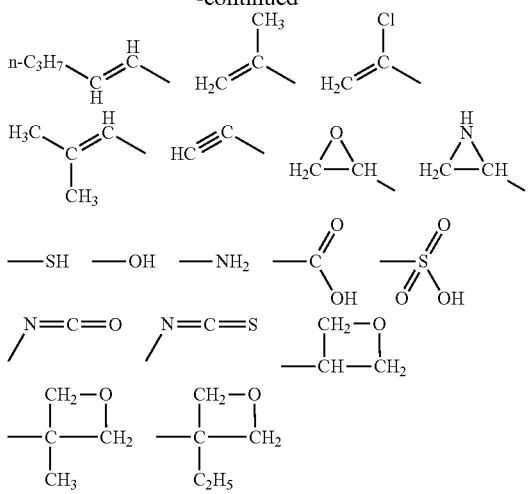

More preferably, the polymerizable group is addition-polymerizable functional group. The polymerizable group of the type is preferably a polymerizable ethylenic unsaturated group or a ring-cleavage polymerizable group.

Examples of the polymerizable ethylenic unsaturated group are the following (M-1) to (M-6):

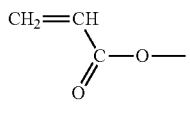
(M-1)

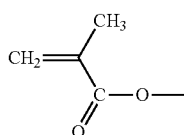
(M-2)

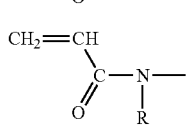
(M-3)

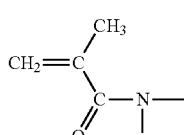
(M-4)

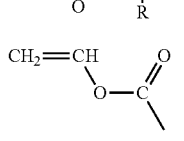
(M-5)

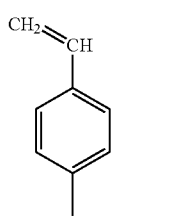
(M-6)

In formulae (M-3) and (M-4), R represents a hydrogen atom or an alkyl group. R is preferably a hydrogen atom or a methyl group. Of formulae (M-1) to (M-6), preferred are formulae (M-1) and (M-2), and more preferred is formula (M-1).

The ring-cleavage polymerizable group is preferably a cyclic ether group, or more preferably an epoxy group or an oxetanyl group.

Among the compounds represented by formula (I), the compounds represented by formula (I') are preferable.

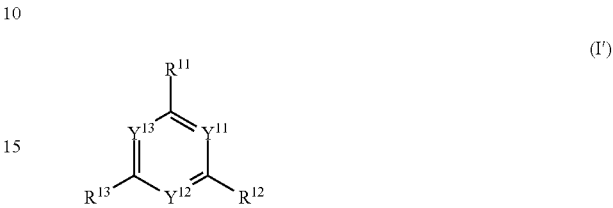
(I')

In the formula, $Y^{11}$, $Y^{12}$ and $Y^{13}$ each independently represent a methine group or a nitrogen atom, preferably represent a methine, or even more preferably represent a non-substituted methine.

In the formula, $R^{11}$, $R^{12}$ and $R^{13}$ each independently represent the following formula represent the following formula (I'-A), (I'-B) or (I'-C). When the small wavelength dispersion of birefringence is needed, preferably, $R^{11}$, $R^{12}$ and $R^{13}$ each represent the following formula (I'-A) or (I'-C), more preferably the following formula (I'-A). Preferably, $R^{11}$, $R^{12}$ and $R^{13}$ are same ($R^{11}=R^{12}=R^{13}$).

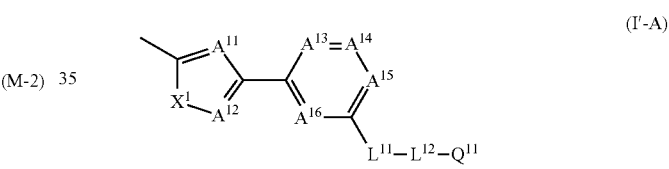
(I'-A)

In formula (I'-A), $A^{11}$, $A^{12}$, $A^{13}$, $A^{14}$, $A^{15}$ and $A^{16}$ each independently represent a methine group or a nitrogen atom.

Preferably, at least one of $A^{11}$ and $A^{12}$ is a nitrogen atom; more preferably the two are both nitrogen atoms.

Preferably, at least three of $A^{13}$, $A^{14}$, $A^{15}$ and $A^{16}$ are methine groups; more preferably, all of them are methine groups. Non-substituted methine is more preferable.

Examples of the substituent that the methine group represented by $A^{11}$, $A^{12}$, $A^{13}$, $A^{14}$, $A^{15}$ or $A^{16}$ may have are a halogen atom (fluorine atom, chlorine atom, bromine atom, iodine atom), cyano, nitro, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

In the formula, $X^1$ represents an oxygen atom, a sulfur atom, a methylene group or an imino group, but is preferably an oxygen atom.

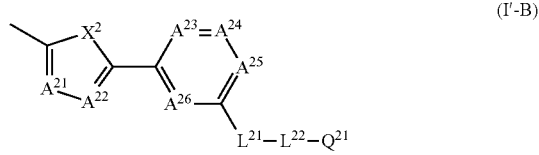

(I'-B)

In formula (I'-B) $A^{21}$, $A^{22}$, $A^{23}$, $A^{24}$, $A^{25}$ and $A^{26}$ each independently represent a methine group or a nitrogen atom. Preferably, at least either of $A^{21}$ or $A^{22}$ is a nitrogen atom; more preferably the two are both nitrogen atoms.

Preferably, at least three of $A^{23}$, $A^{24}$, $A^{25}$ and $A^{26}$ are methine groups; more preferably, all of them are methine groups.

Examples of the substituent that the methine group represented by $A^{23}$, $A^{24}$, $A^{25}$ or $A^{26}$ may have are a halogen atom (fluorine atom, chlorine atom, bromine atom, iodine atom), cyano, nitro, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

In the formula, $X^2$ represents an oxygen atom, a sulfur atom, a methylene group or an imino group, but is preferably an oxygen atom.

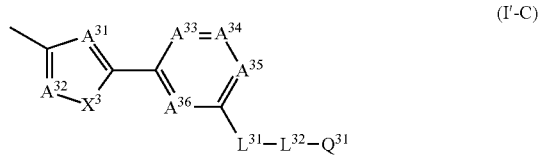

(I'-C)

In formula (I'-C), $A^{31}$, $A^{32}$, $A^{33}$, $A^{34}$, $A^{35}$ and $A^{36}$ each independently represent a methine group or a nitrogen atom.

Preferably, at least either of $A^{31}$ or $A^{32}$ is a nitrogen atom; more preferably the two are both nitrogen atoms.

Preferably, at least three of $A^{33}$, $A^{34}$, $A^{35}$ and $A^{36}$ are methine groups; more preferably, all of them are methine groups.

When $A^{33}$, $A^{34}$, $A^{35}$ and $A^{36}$ are methine groups, the hydrogen atom of the methine group may be substituted with a substituent. Examples of the substituent that the methine group may have are a halogen atom (fluorine atom, chlorine atom, bromine atom, iodine atom), cyano, nitro, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

In the formula, $X^3$ represents an oxygen atom, a sulfur atom, a methylene group or an imino group, but is preferably an oxygen atom.

$L^{11}$ in formula (I'-A), $L^{21}$ in formula (I'-B) and $L^{31}$ in formula (I'-C) each independently represent —O—, —O—CO—, —CO—O—, —O—CO—O—, —S—, —NH—, —SO$_2$—, —CH$_2$—, —CH═CH— or —C≡C—; preferably —O—, —O—CO—, —CO—O—, —O—CO—O—, —CH$_2$—, —CH═CH— or —C≡C—; more preferably —O—, —O—CO—, —CO—O—, —O—CO—O— or —C≡C—. $L^{11}$ in formula (I'-A) is especially preferable —O—, —CO—O— or —C≡C— in terms of the small wavelength dispersion of birefringence; among these, —CO—O— is more preferable because the discotic nematic phase may be formed at a higher temperature. When above group has a hydrogen atom, then the hydrogen atom may be substituted with a substituent. Preferred examples of the substituent are a halogen atom, cyano, nitro, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms.

$L^{12}$ in formula (I'-A), $L^{22}$ in formula (I'-B) and $L^{32}$ in formula (I'-C) each independently represent a bivalent linking group selected from —O—, —S—, —C(═O)—, —SO$_2$—, —NH—, —CH$_2$—, —CH═CH— and —C≡C—, and a group formed by linking two or more of these. The hydrogen atom in —NH—, —CH$_2$— and —CH═CH— may be substituted with a substituent. Preferred examples of the substituent are a halogen atom, cyano, nitro, hydroxy, carboxyl, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. More preferred are a halogen atom, hydroxy and an alkyl group having from 1 to 6 carbon atoms; and especially preferred are a halogen atom, methyl and ethyl.

Preferably, $L^{12}$, $L^{22}$ and $L^{32}$ each independently represent a bivalent linking group selected from —O—, —C(=O)—, —CH$_2$—, —CH=CH— and —C≡C—, and a group formed by linking two or more of these.

Preferably, $L^{12}$, $L^{22}$ and $L^{32}$ each independently have from 1 to 20 carbon atoms, more preferably from 2 to 14 carbon atoms. Preferably, $L^{12}$, $L^{22}$ and $L^{32}$ each independently have from 1 to 16 (—CH$_2$—)'s, more preferably from 2 to 12 (—CH$_2$—)'s.

The number of carbon atoms constituting the $L^{12}$, $L^{22}$ or $L^{32}$ may influence both of the liquid crystal phase transition temperature and the solubility of the compound. Generally, the compound having the larger number of the carbon atoms has a lower phase transition temperature at which the phase transition from the discotic nematic phase (Nd phase) transits to the isotropic liquid occurs. Furthermore, generally, the solubility for solvent of the compound, having the larger number of the carbon atoms, is more improved.

$Q^{11}$ in formula (I'-A), $Q^{21}$ in formula (I'-B) and $Q^{31}$ in formula (I'-C) each independently represent a polymerizable group or a hydrogen atom. Preferably, $Q^{11}$, $Q^{21}$ and $Q^{31}$ each represent a polymerizable group. The polymerization for the group is preferably addition polymerization (including ring-cleavage polymerization) or polycondensation. In other words, the polymerizing group preferably has a functional group that enables addition polymerization or polycondensation. Examples of the polymerizable group are same as those exemplified above. Their preferred ranges are the same as that of $Q^1$ in formula (I-R). $Q^{11}$, $Q^{21}$ and $Q^{31}$ may be same or different, and preferably, they are same.

Examples of the compound represented by formula (I) include, but are not limited to, the compounds described in JP-A-2009-97002, [0038]-[0069]; and those described below

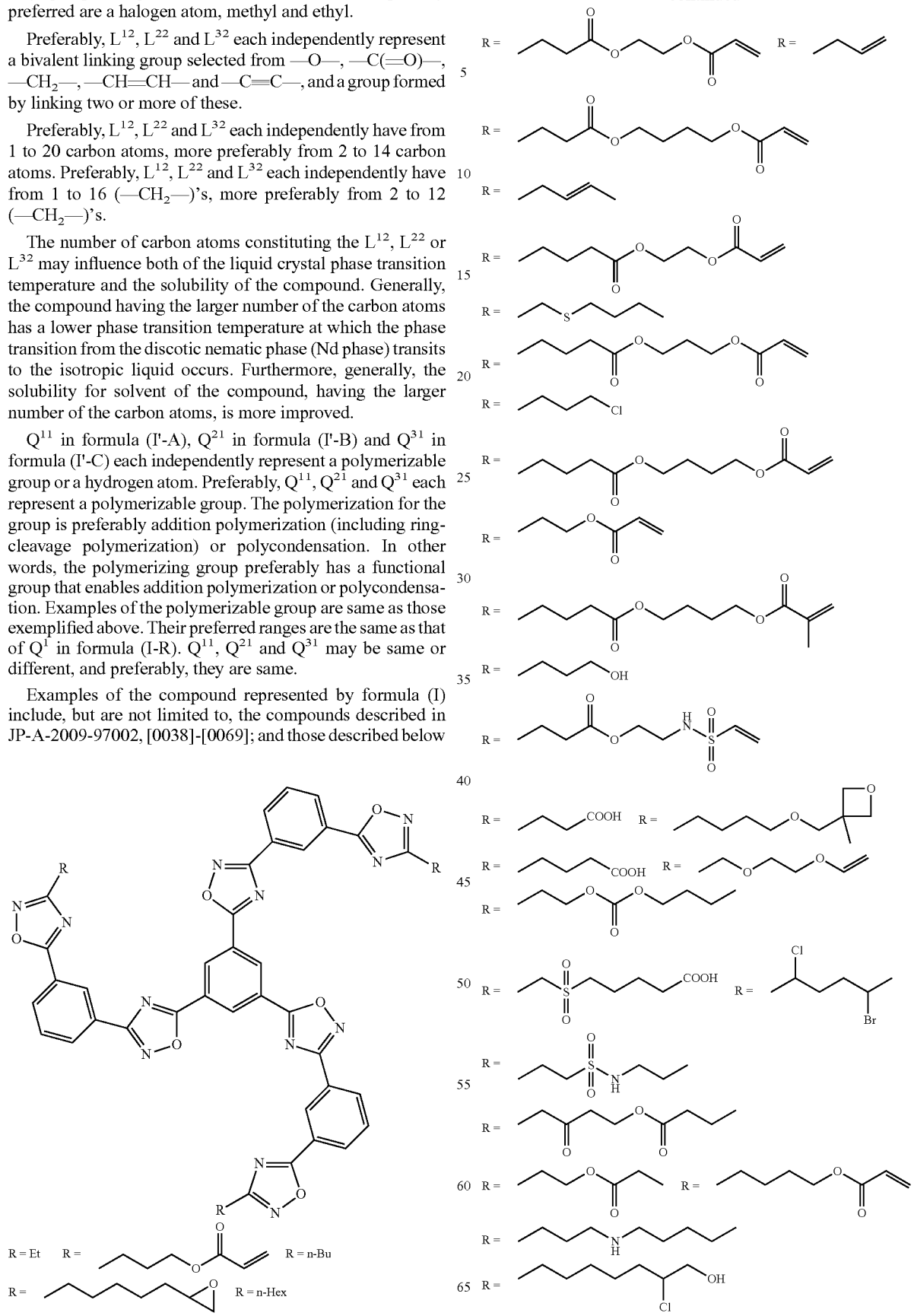

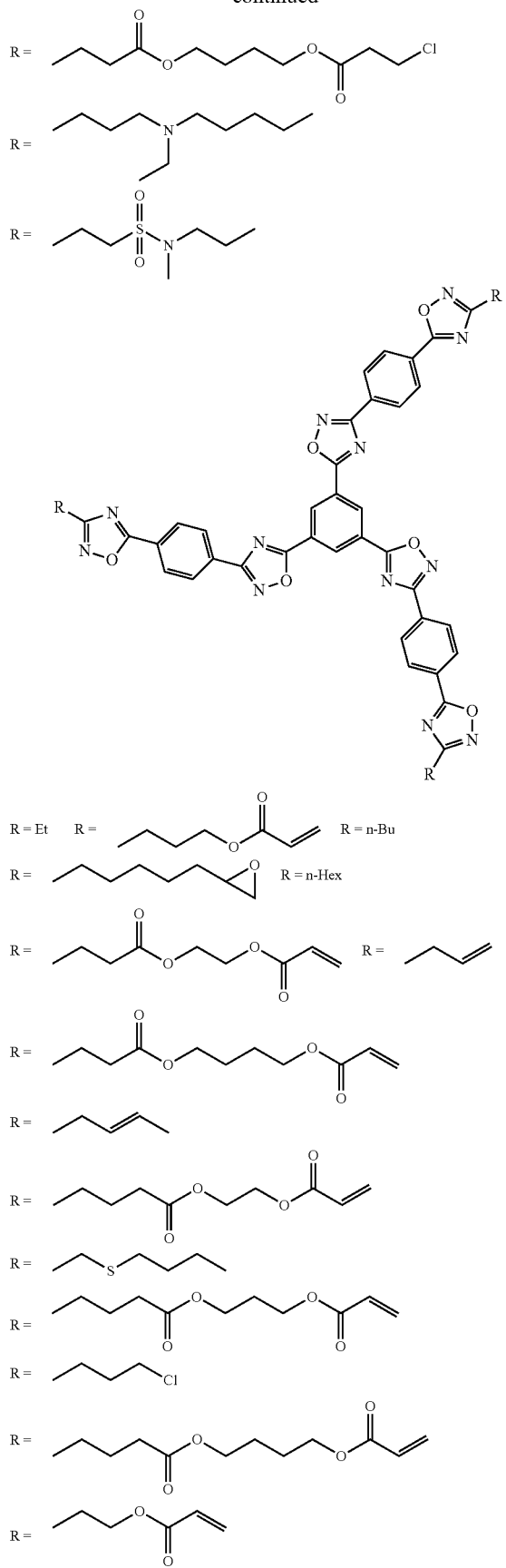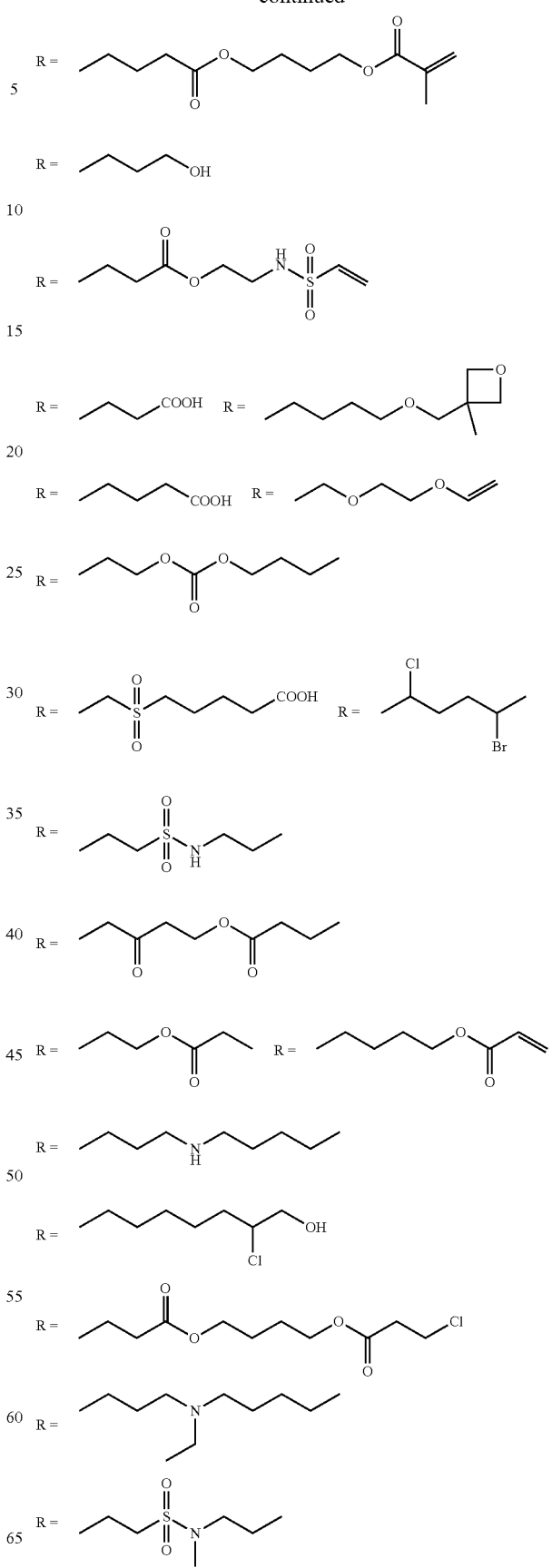

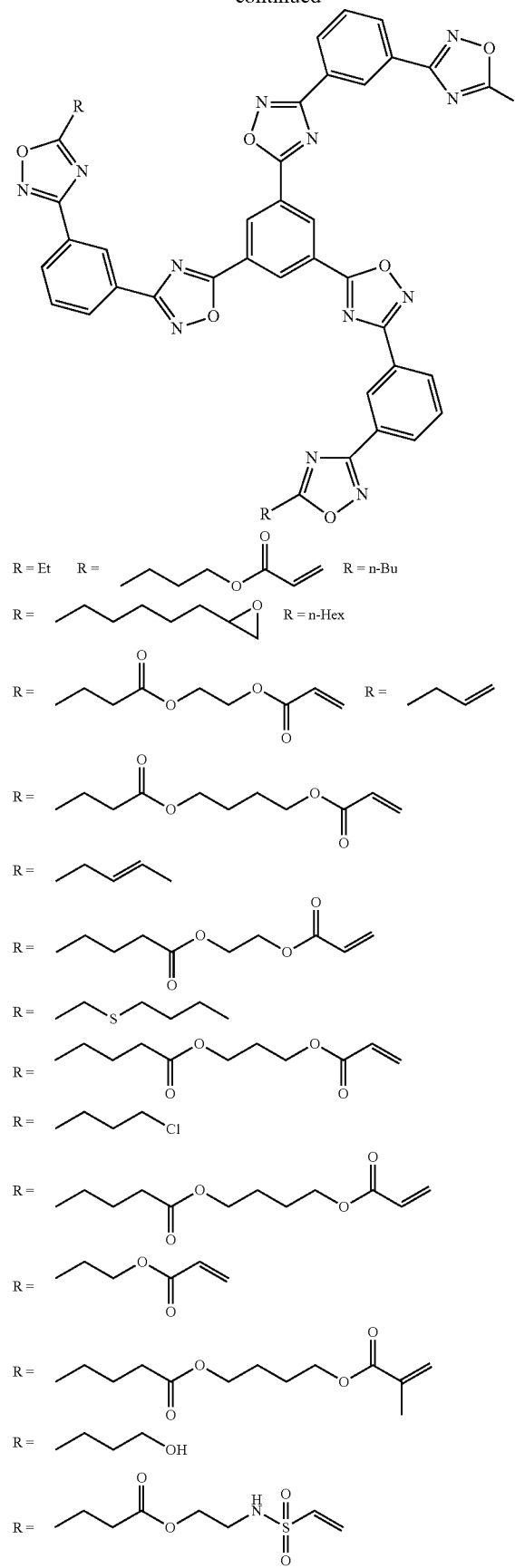
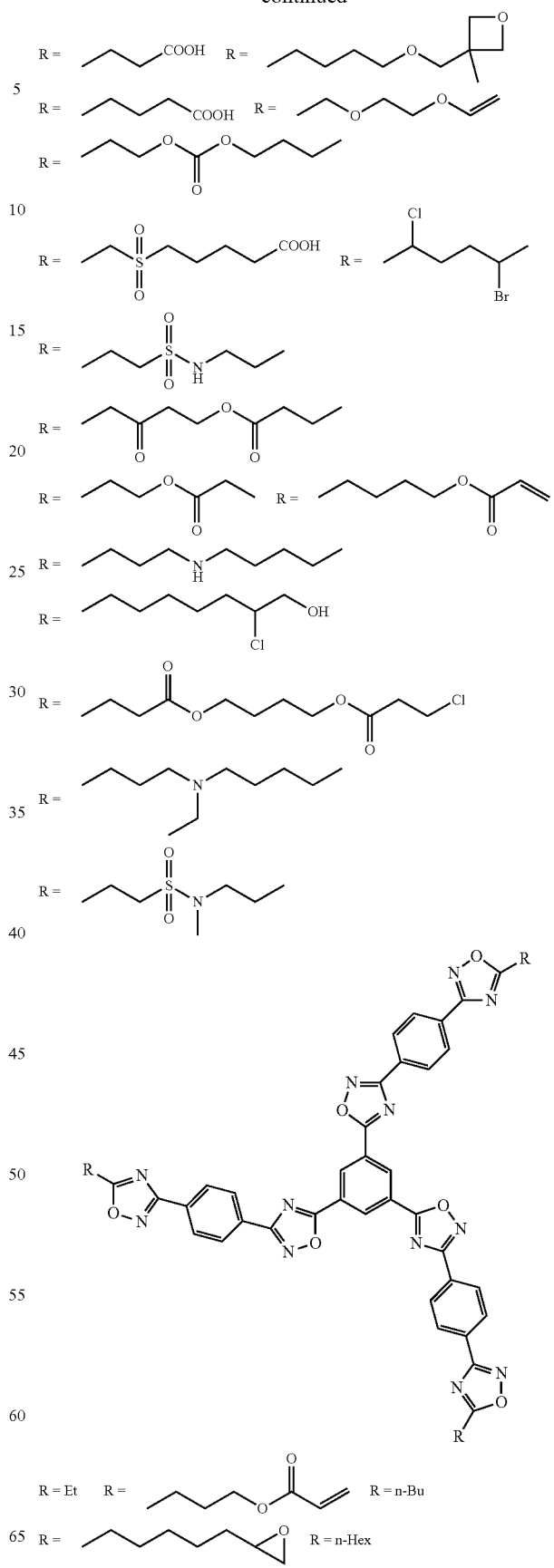

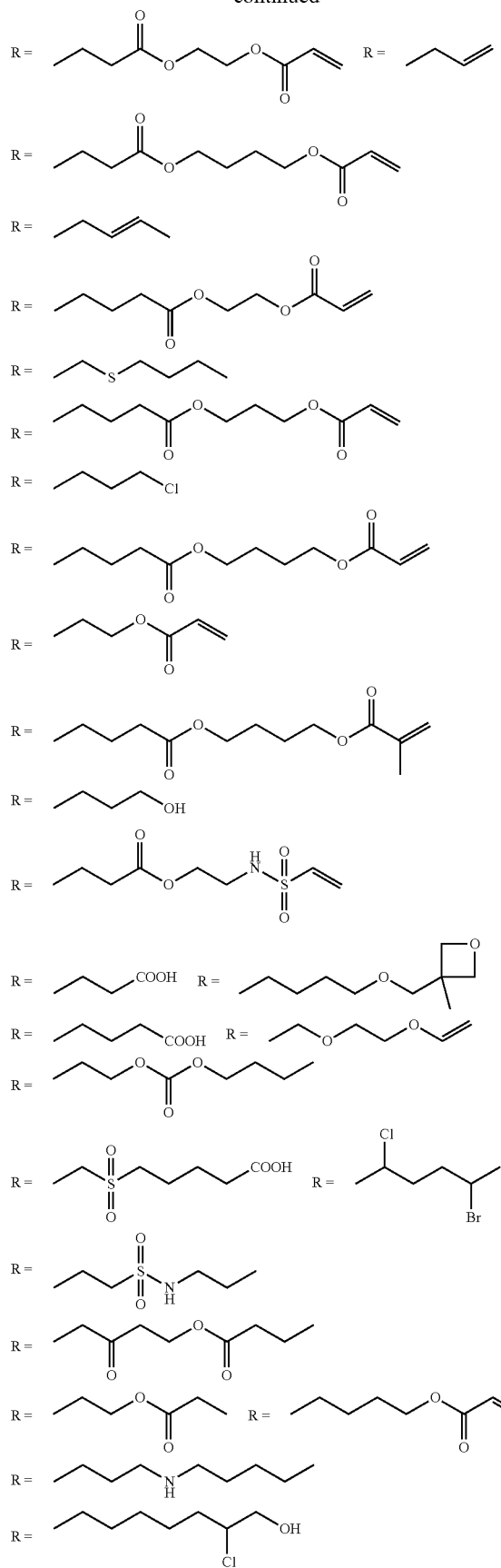
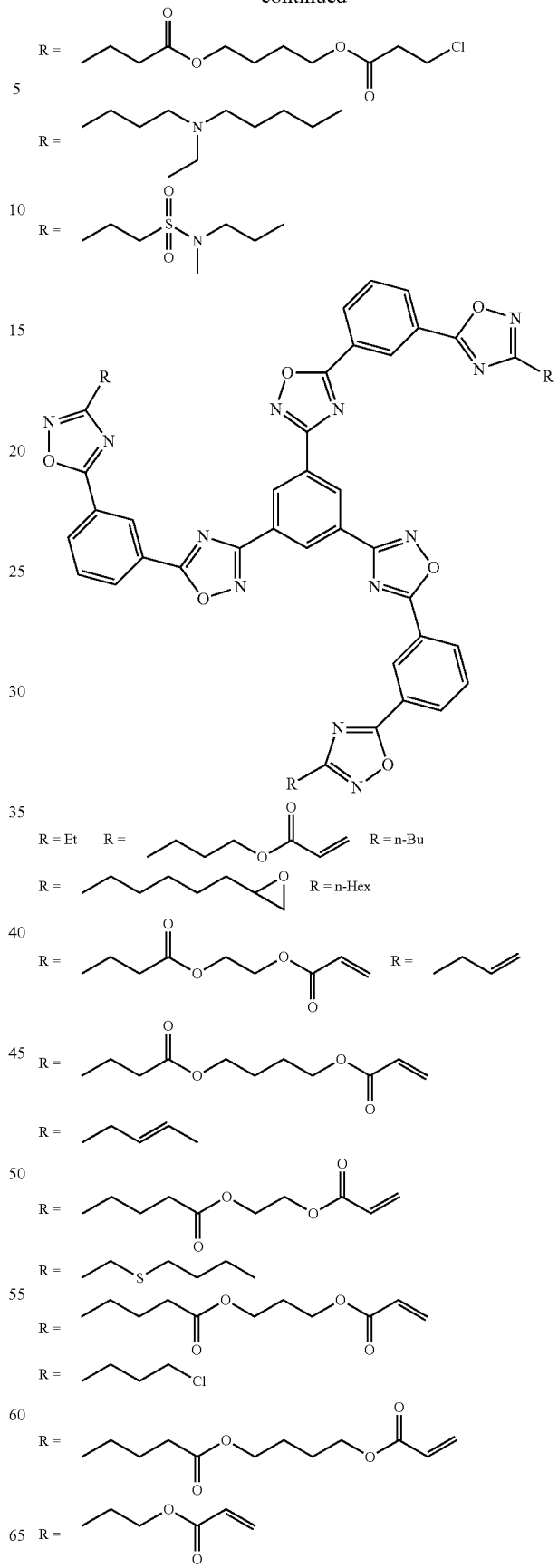

33
-continued
34
-continued
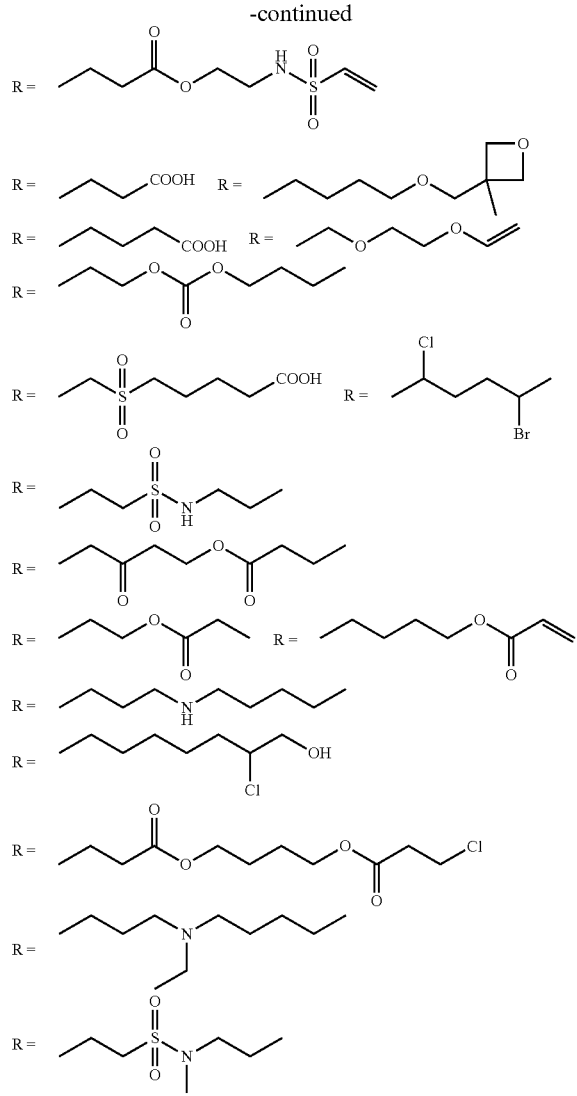
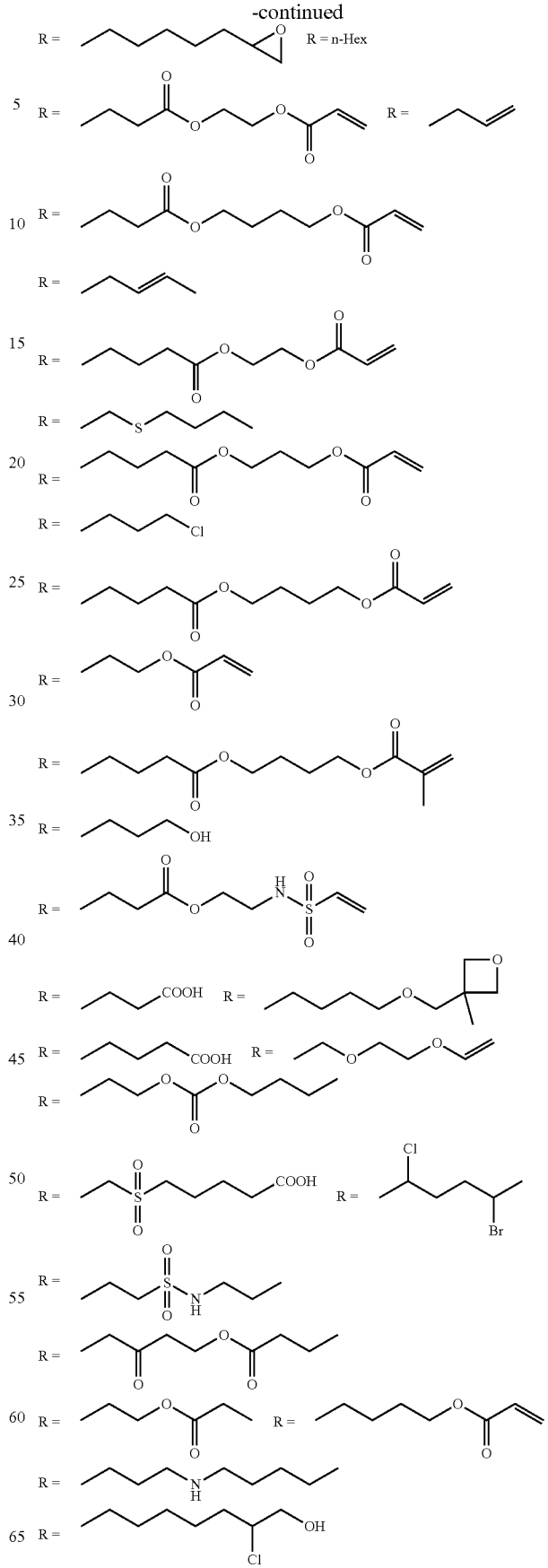
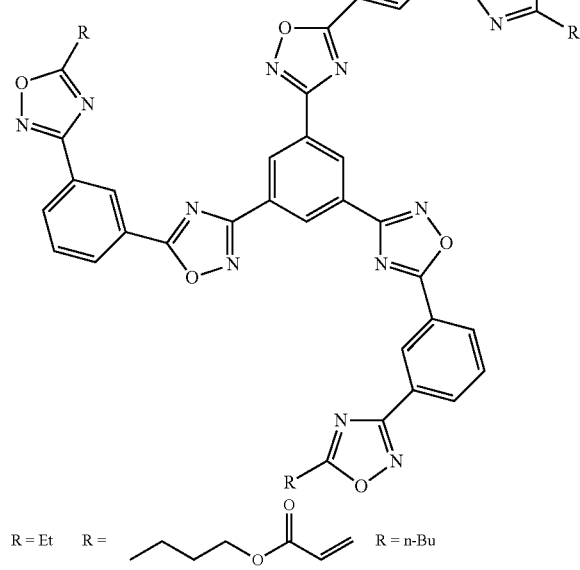

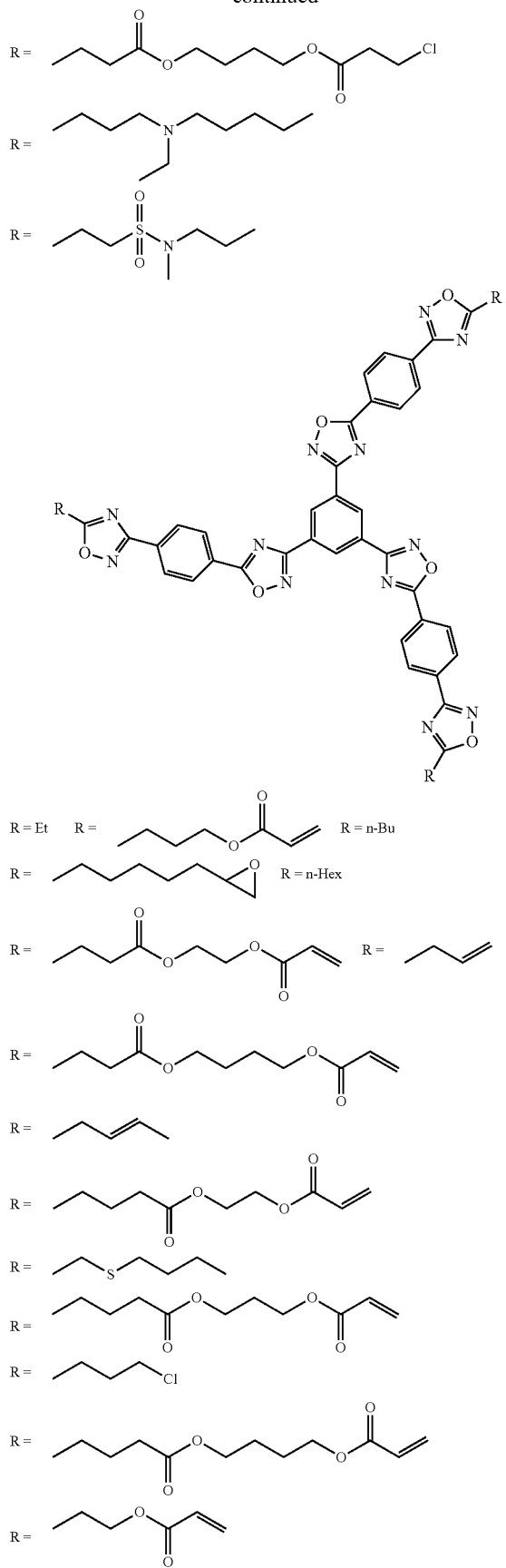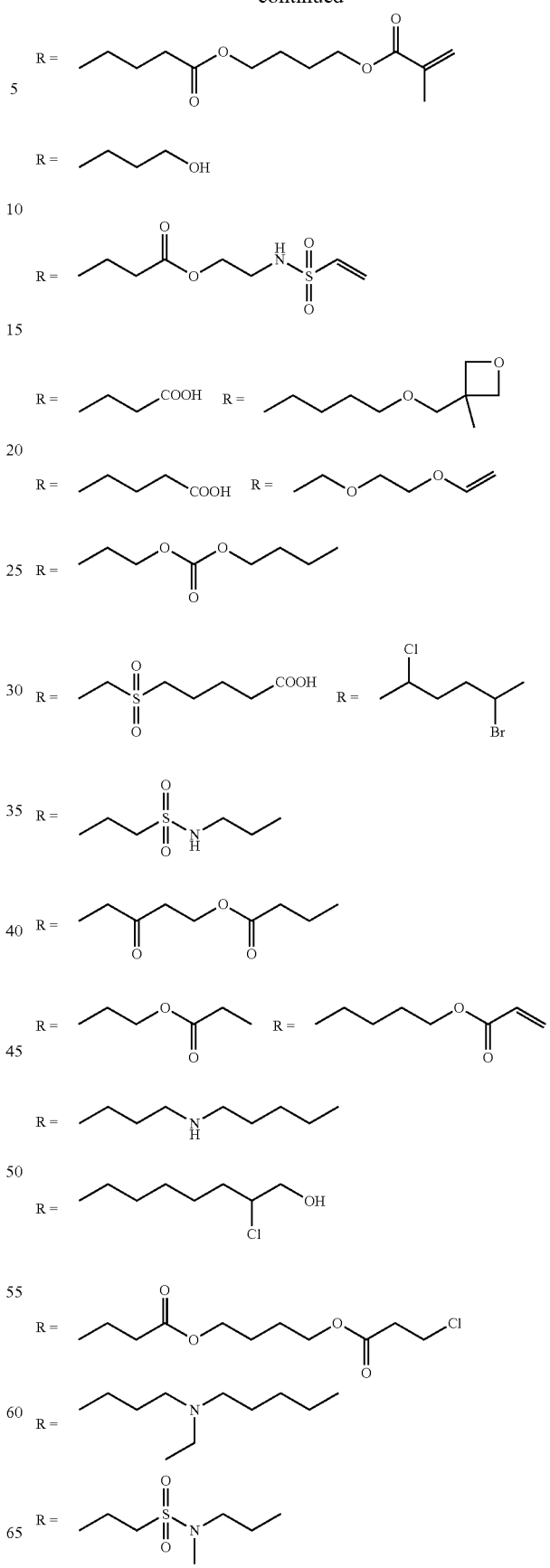

37
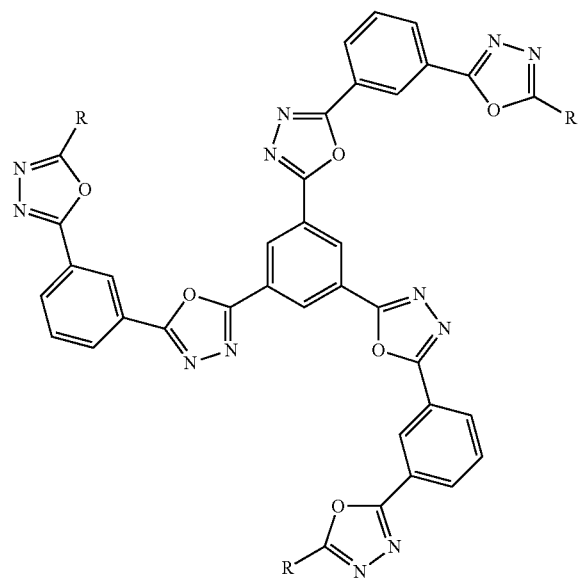
R = 
38
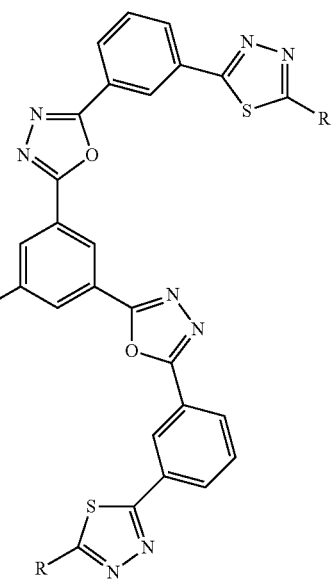
R = 

39
-continued
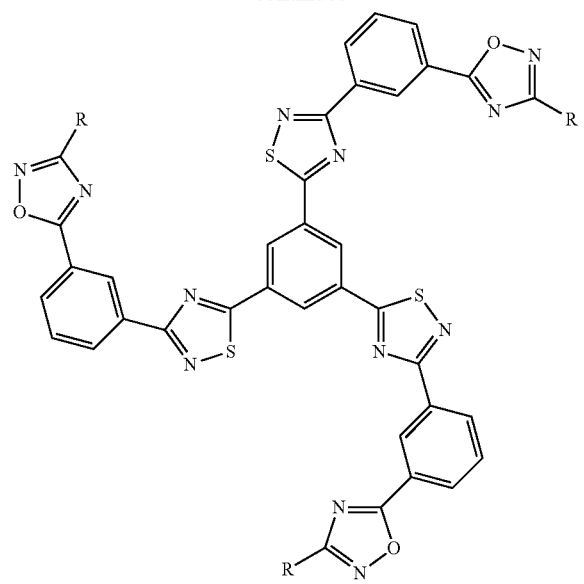
R = 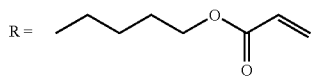
40
-continued
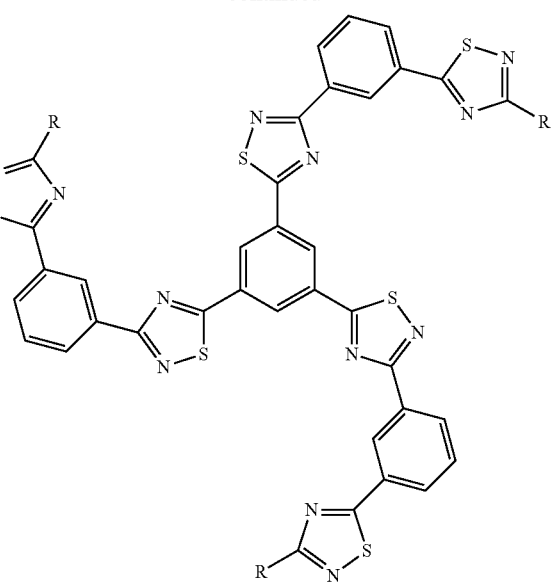
R = 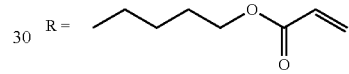
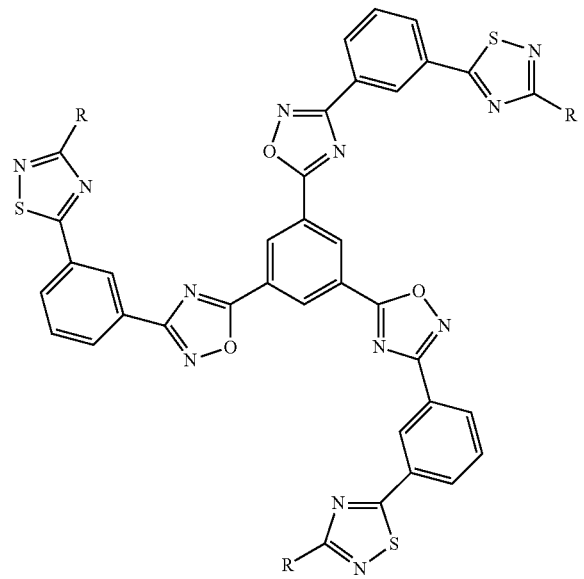
R = 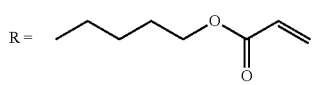
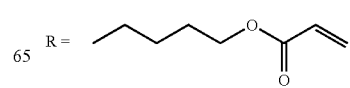
R =

41
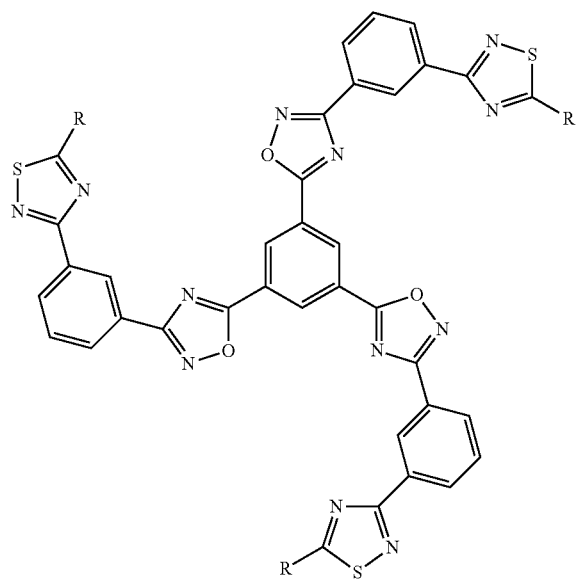
R = 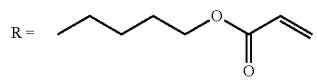
42
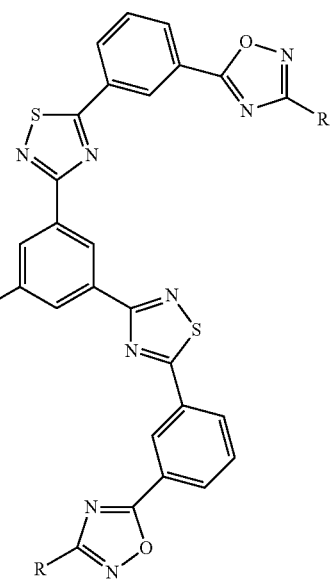
R = 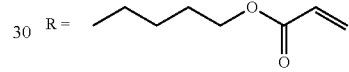
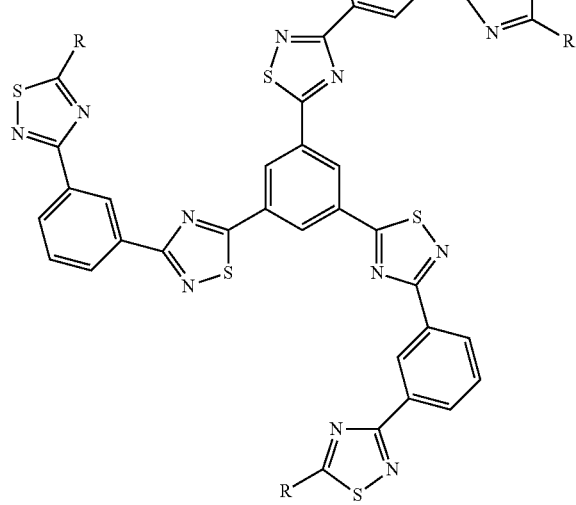
R = 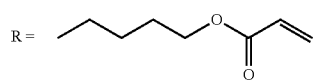
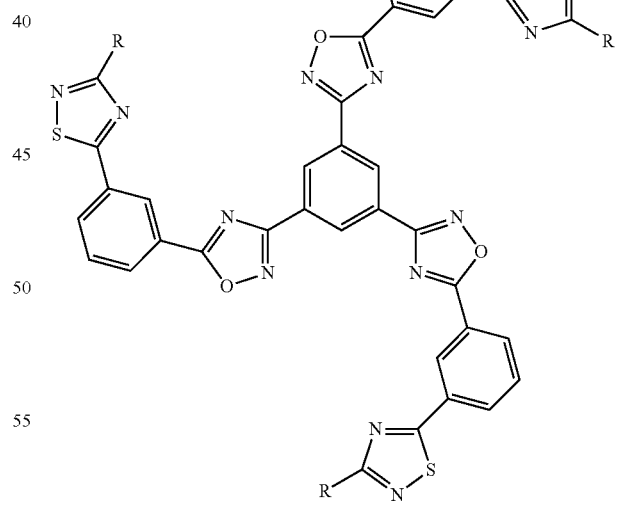
R = 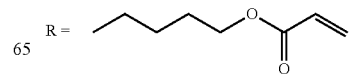

43
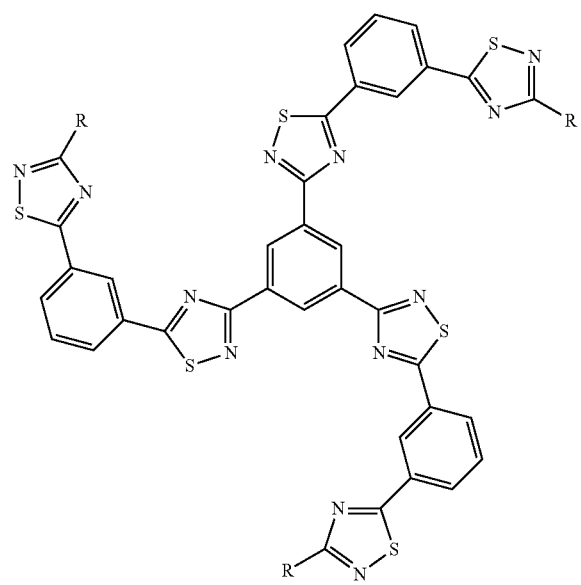
R = 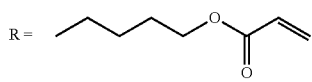
44
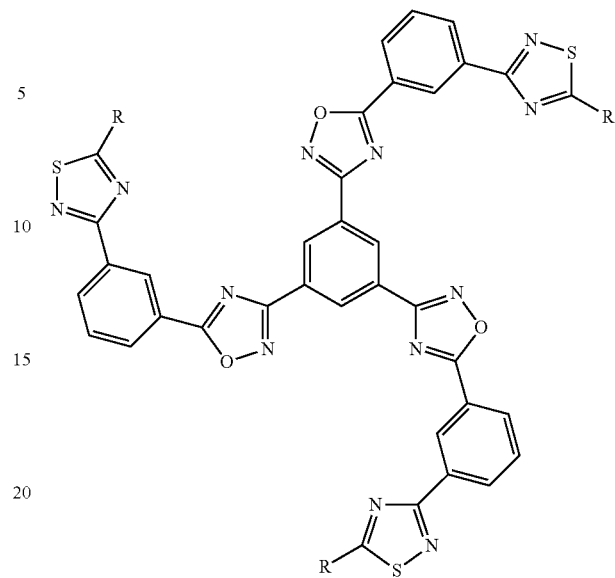
R = 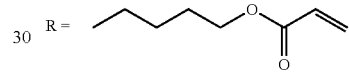
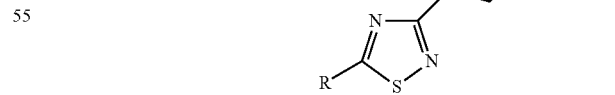
R = 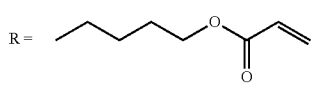
R = 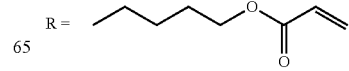

45
-continued
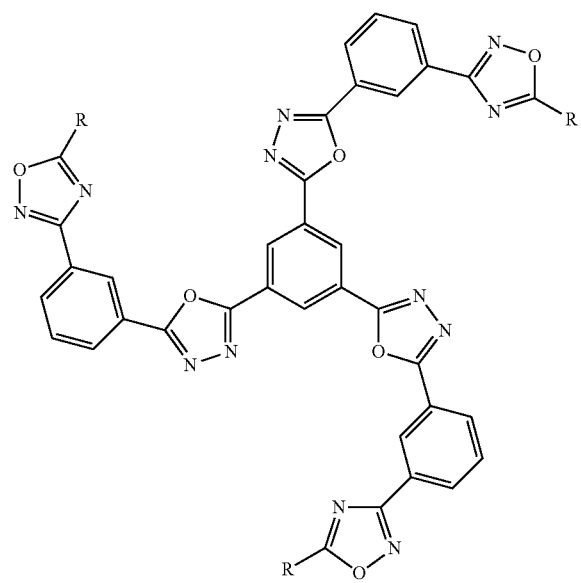
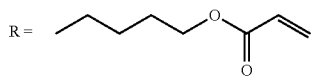
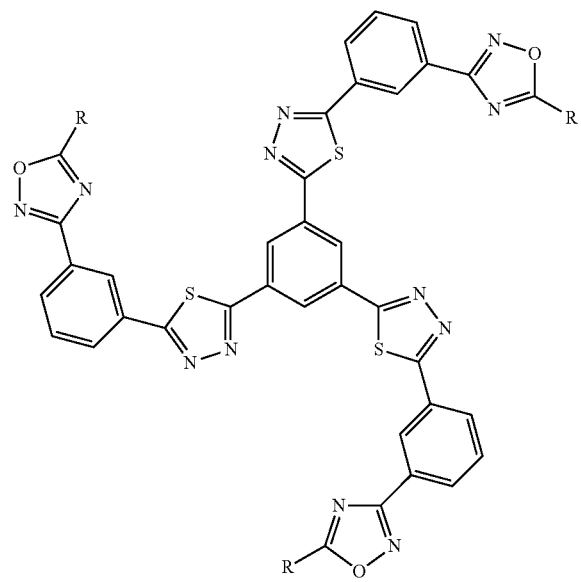
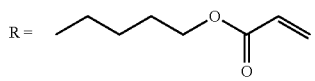
46
-continued
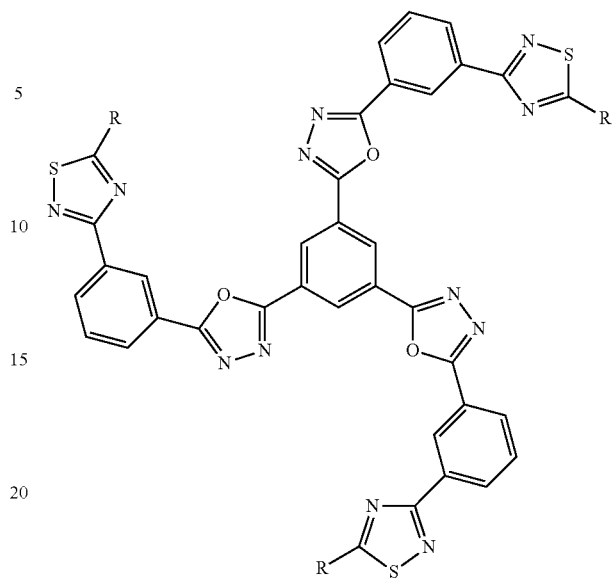
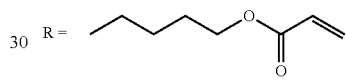
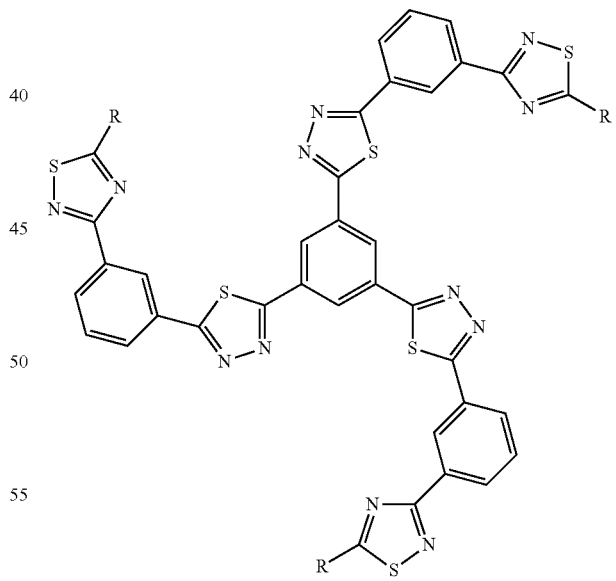
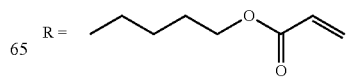

47
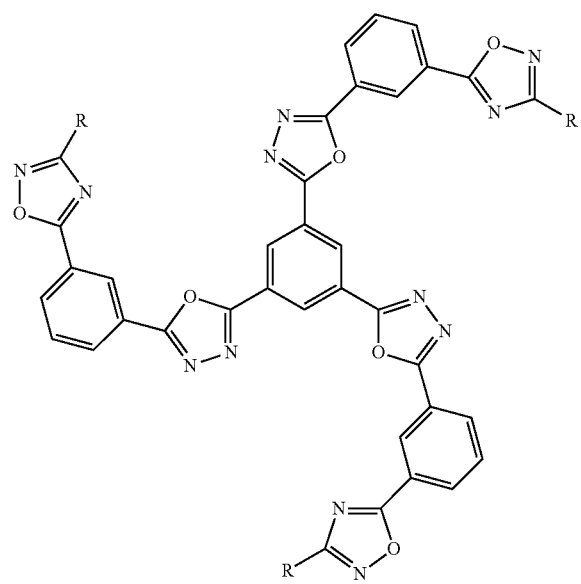
R = 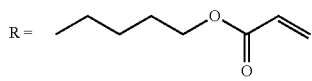
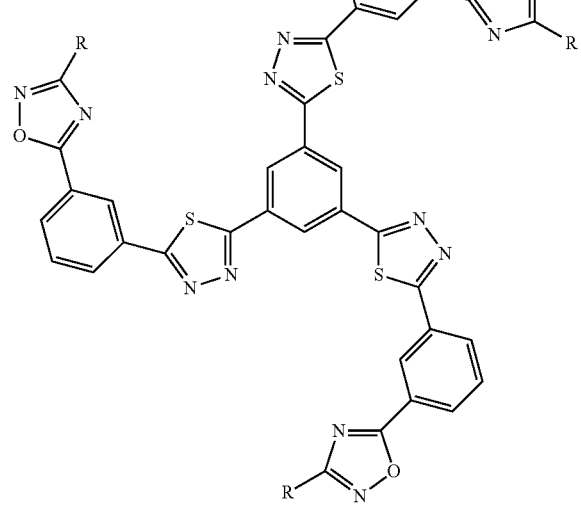
R = 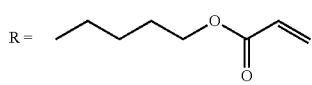
48
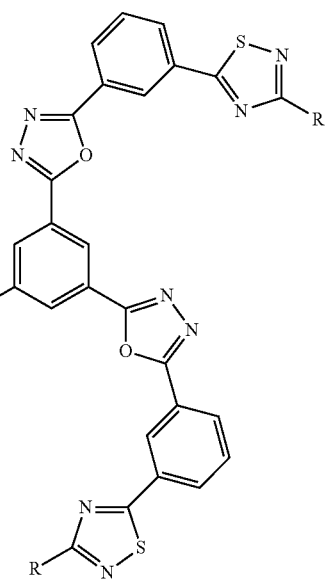
R = 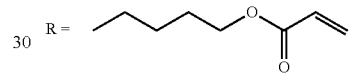
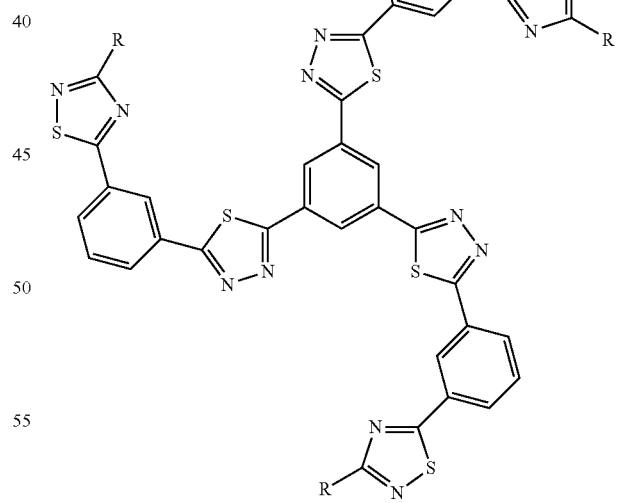
R = 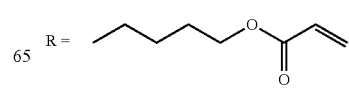

49
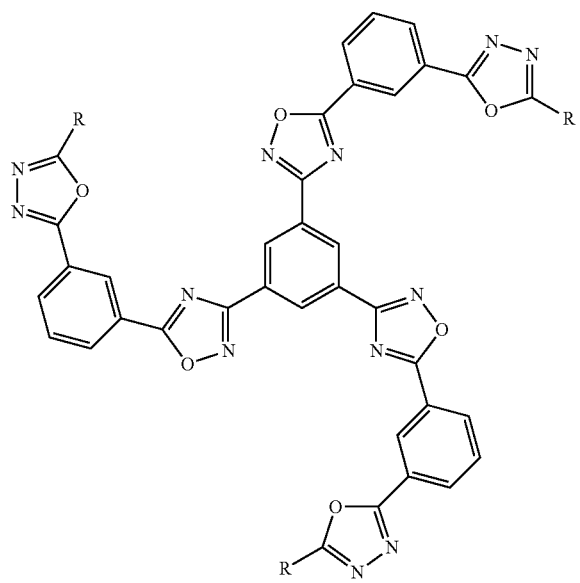
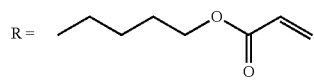
50
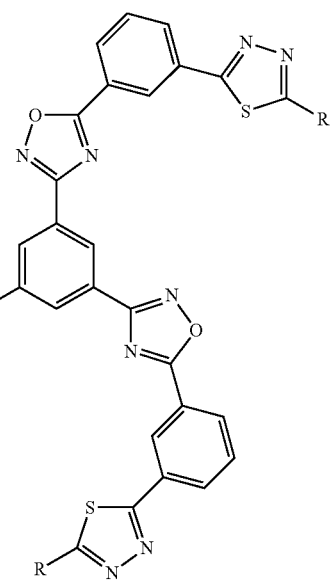
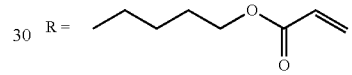
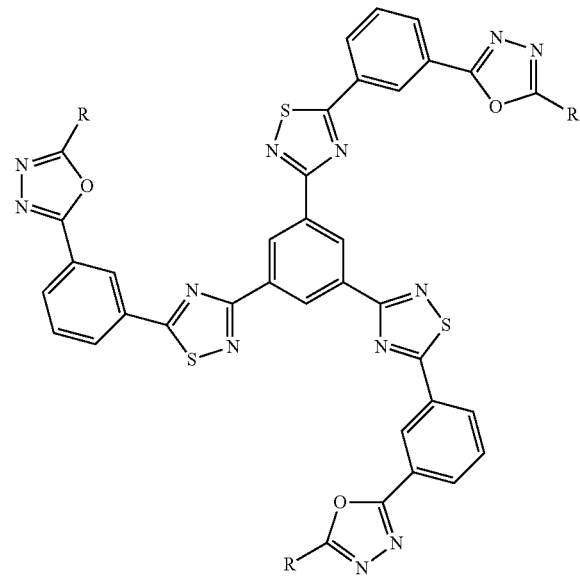
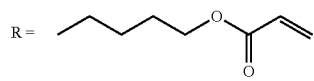
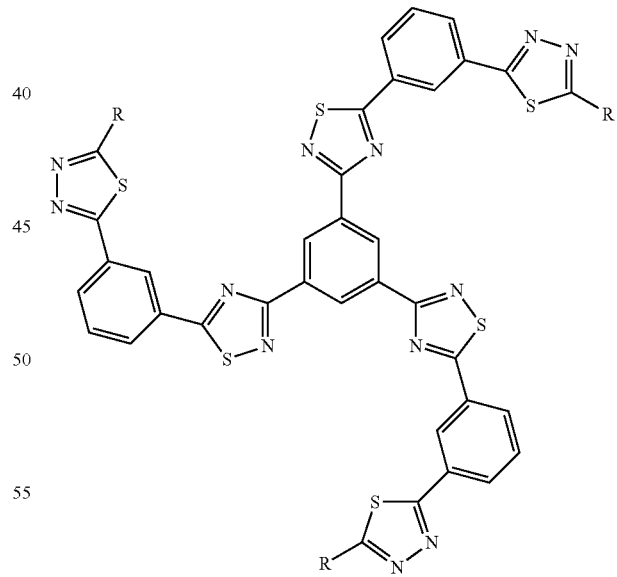
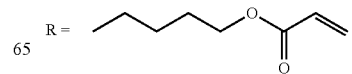

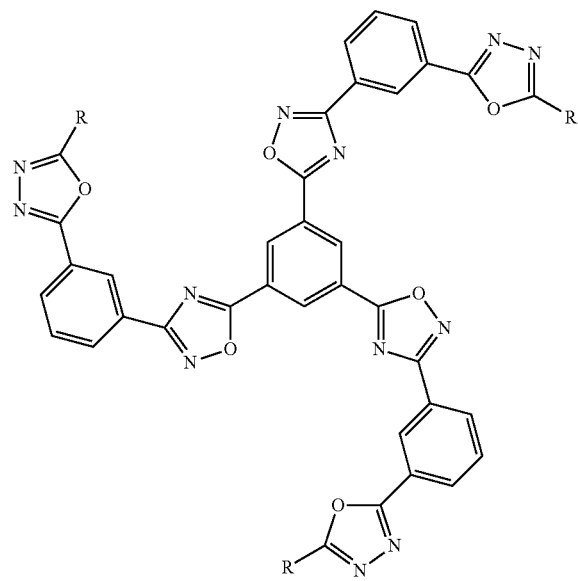

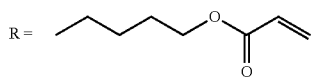

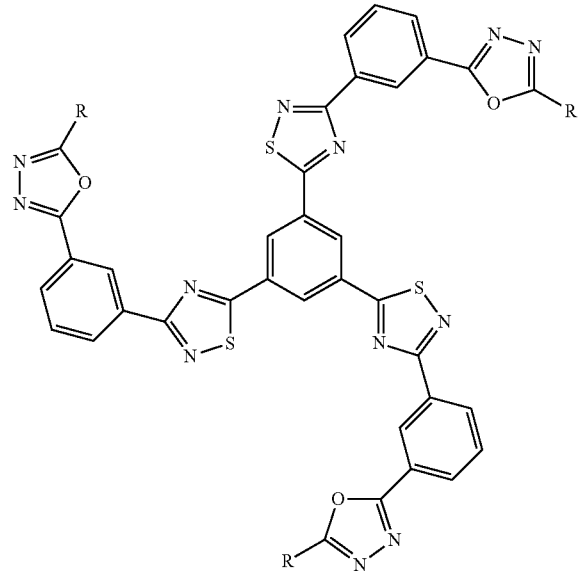

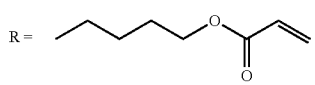

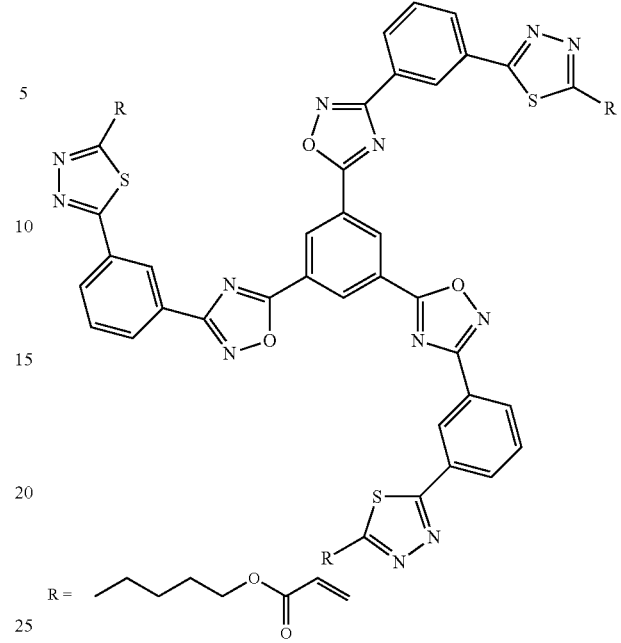

Examples of the triphenylene discotic liquid crystal compound having the small wavelength dispersion include, but are not limited to, those described in JP-A-2007-108732, [0062]-[0067].

[Vertical Alignment Promoting Agent]

In order to uniformly align a liquid crystalline compound vertically in preparing the retardation layer, it is necessary to control alignment vertically of the liquid crystalline compound in an alignment layer interface side and an air interface side. The action which is capable of aligning discotic liquid crystal molecules vertically corresponds to the action which is capable of reducing the tilt angle of the director thereof, or that is, which is capable of reducing the angle between the director and the air-side surface of the liquid crystal. Especially, air interface side vertical alignment material which has an action capable of reducing the tilt angles of the directors of discotic liquid crystal molecules in the air-interface side is preferably used.

Examples of the material for promoting vertical alignment include compounds capable of localizing at the alignment layer interface and thereby aligning the liquid crystalline compound vertically by means of an exclusion volume effect, an electrostatic effect or a surface energy effect. Examples of the material for promoting vertical alignment include also compounds capable of localizing at the air-interface during the alignment of the liquid crystal compound, and thereby aligning the liquid crystalline compound vertically by means of an exclusion volume effect, an electrostatic effect or a surface energy effect.

For the compound (alignment layer interface side vertical alignment material) that promotes vertically aligning of the molecules of the liquid crystalline compound at the interface side of these alignment layers, a pyridinium derivative can be preferably used. As for a compound (air interface side vertical alignment material) that promotes vertically aligning of the molecules of the liquid crystalline compound at the interface side of these alignment layers, a compound, which promotes to localization of the above-mentioned compounds at the air-interface, containing at least one or more hydrophilic group selected from a fluoro aliphatic group, a carboxyl group (—COOH), a sulfo group (—SO$_3$H), a phosphonoxy group {—OP(=O)(OH)$_2$} and their salts can be more preferably used. Further, by combining these compounds, for example, when the crystalline compound is prepared as a coating solution, the coatability of the coating solution may be improved, and thus generation of unevenness and fish eye are inhibited. Hereinbelow, the vertical alignment material will be described in detail.

[Alignment Layer Interface Side Vertical Alignment Material]

For the alignment layer interface side vertical aligning material used in the invention, a pyridinium derivative (pyridinium salt) represented by Formula (II) described below can be suitably used. By adding at least one kind of the pyridinium derivative to the liquid crystalline composition, it is possible to align the molecules of a discotic liquid crystalline compound in the substantially vertical direction near an alignment layer.

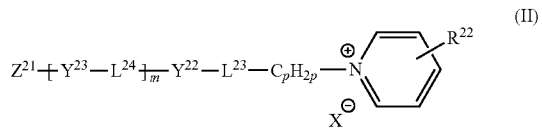

(II)

In the formula, L$^{23}$ and L$^{24}$ represent a divalent linking group respectively.

L$^{23}$ is preferably a single bond, —O—, —O—CO—, —CO—O—, —C≡C—, —CH=CH—, —CH=N—, —N=CH—, —N=N—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO— or —O—CO-AL-CO—O—.

AL is an alkylene group having 1 to 10 carbon atoms. L$^{23}$ is preferably a single bond, —O—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO— or —O—CO-AL-CO—O—, more preferably a single bond or —O—, or even more preferably —O—.

L$^{24}$ is preferably a single bond, —O—, —O—CO—, —CO—O—, —C≡C—, —CH=CH—, —CH=N—, —N=CH— or —N=N—, more preferably O—CO— or —CO—O—. When m is equal to or more than 2, a plurality of L$^{24}$ is more preferably —O—CO— or —CO—O— alternately.

R$^{22}$ is a hydrogen atom, an unsubstituted amino group or an alkyl-substituted amino group having 1 to 25 carbon atoms. When R$^{22}$ is a dialkyl-substituted amino group, two alkyl groups may be bonded to each other to form a nitrogen-containing heterocyclic ring. The formed nitrogen-containing heterocyclic ring is preferably a 5- or 6-membered ring. R$^{22}$ is more preferably a hydrogen atom, an unsubstituted amino group or a dialkyl-substituted amino group having 2 to 12 carbon atoms, and most preferably a hydrogen atom, an unsubstituted amino group or a dialkyl-substituted amino group having 2 to 8 carbon atoms. When R$^{22}$ is an unsubstituted amino group, it is preferable that a pyridinium ring is substituted with amino at the 4-position.

X is an anion.

Examples of the anion include a halogen anion (e.g., a fluorine ion, a chlorine ion, bromine ion, an iodine ion, etc.), a sulfonate ion (e.g., a methane sulfonate ion, a trifluoromethane sulfonate ion, a methylsulfate ion, a p-toluene sulfonate ion, a p-chlorobenzene sulfonate ion, a 1,3-benzene disulfonate ion, a 1,5-naphthalene disulfonate ion and a 2,6-naphthalene disulfonate ion), a sulfate ion, a carbonate ion, a nitrate ion, a thiocyanate ion, a perchlorate ion, a tetrafluoroborate ion, a picrate ion, an acetate ion, a formate ion, a trifluoroacetate ion, a phosphate ion (e.g., hexafluorophosphate ion), a hydroxyl ion, and the like. X is preferably a halogen anion, a sulfonate ion, or a hydroxyl ion.

Y$^{22}$ and Y$^{23}$ are each independently a divalent group having a 5- or 6-membered ring which may have a substituent as a partial structure. Examples of the 6-membered ring include an aliphatic ring, an aromatic ring (a benzene ring) and a heterocyclic ring. Preferably, at least one of Y$^{22}$ and Y$^{23}$ is a divalent group having a 5- or 6-membered ring which has a substituent as a partial structure. Preferably, Y$^{22}$ and Y$^{23}$ each independently represent a divalent group having a 6-membered ring which may have a substituent as a partial structure. Examples of the 6-membered ring include an aliphatic ring, aromatic ring (benzene ring) and heterocyclic ring. Examples of the 6-membered aliphatic ring include a cyclohexane ring, a cyclohexene ring, and a cyclohexadiene ring. Examples of the 6-membered heterocyclic ring include a pyran ring, a dioxane ring, a dithiane ring, a thiine ring, a pyridine ring, a piperidine ring, an oxazine ring, a morpholine ring, a thiazine ring, a pyridazine ring, a pyrimidine ring, a pyrazine ring, a piperazine ring and a triazine ring. The 6-membered ring may form a condensed ring with other 6- or 5-membered rings.

Examples of the substituent include a halogen atom, a cyano group, an alkyl group having 1 to 12 carbon atoms and an alkoxy group having 1 to 12 carbon atoms. The alkyl group and the alkoxy group may be substituted with an acyl group having 2 to 12 carbon atoms or an acyloxy group having 2 to 12 carbon atoms. the substituent is preferably $C_{1-12}$ (more preferably $C_{1-6}$, or even more preferably $C_{1-3}$) alkyl. the ring may have two or more substituents. For example, when $Y^{22}$ and $Y^{23}$ represent a phenylene, they may have from one to four $C_{1-12}$ (more preferably $C_{1-6}$, or even more preferably $C_{1-3}$) alkyls.

In the formula, m is 1 or 2, ore preferably 2. When m is 2, plural $Y^{23}$ and $L^{24}$ are same or different from each other respectively.

$Z^{21}$ represents a monovalent group selected from the group consisting of cyano, a halogenated phenyl, a nitro-substituted phenyl, a phenyl having a $C_{1-25}$ alkyl, a phenyl having a $C_{1-25}$ alkoxy, a $C_{1-25}$ alkyl, a $C_{2-25}$ alkynyl, a $C_{1-25}$ alkoxy, a $C_{1-25}$ alkoxycarbonyl, a $C_{7-26}$ aryloxy carbonyl and a $C_{7-26}$ aryl carbonyloxy.

When m is 2, $Z^{21}$ is preferably a cyano group, a $C_{1-25}$ alkyl or a $C_{1-25}$ alkoxy or more preferably a $C_{4-20}$ alkoxy.

When m is 1, $Z^{21}$ is preferably a $C_{7-25}$ alkyl group, a $C_{7-25}$ alkoxy group, a $C_{7-25}$ acyl-substituted alkyl, a $C_{7-25}$ acyl-substituted alkoxy, a $C_{7-25}$ acyloxy-substituted alkyl, or a $C_{7-25}$ acyloxy-substituted alkoxy.

The acyl group is represented by —CO—R and the acyloxy group is represented by —O—CO—R, wherein R is an aliphatic group (an alkyl group, a substituted alkyl group, an alkenyl group, a substituted alkenyl group, an alkynyl group and a substituted alkynyl group) or an aromatic group (an aryl group and a substituted aryl group). R is preferably an aliphatic group, and more preferably an alkyl group or an alkenyl group.

p is an integer of 1 to 10. Further, p is more preferably 1 or 2. $C_pH_{2p}$ represents a chained alkylene group which may have a branched structure. $C_pH_{2p}$ is preferably a linear alkylene group (—$(CH_2)_p$—).

Among the compounds represented by formula (II), the compounds represented by formula (II') are preferable.

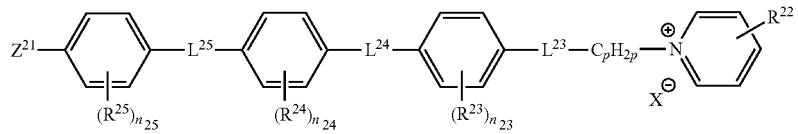

In formula (II'), the symbols have same definitions as those in formula (II) respectively, and the preferable scopes thereof are same as those in formula (II). $L^{25}$ has a same definition as that of $L^{24}$, and the preferable scope thereof is same as that of $L^{24}$. $L^{24}$ and $L^{25}$ preferably represent —O—CO— or —CO—O—, or more preferably, $L^{24}$ is —O—CO— and $L^{25}$ is —CO—O—.

$R^{23}$, $R^{24}$ and $R^{25}$ represent a $C_{1-12}$ (more preferably $C_{1-6}$, or even more preferably $C_{1-3}$) alkyl. $n_{23}$ is from 0 to 4; $n_{24}$ is from 1 to 4; and $n_{25}$ is from 0 to 4. Preferably, $n_{23}$ and $n_{25}$ are 0, and $n_{24}$ is from 1 to 4 (more preferably from 1 to 3).

Examples of the compound represented by formula (II) include those described in JP-A-2006-113500, [0058]-[0061].

Examples of the compound represented by formula (II) include also those described below. In the formulas, anion ($X^-$) is omitted.

(II-1)
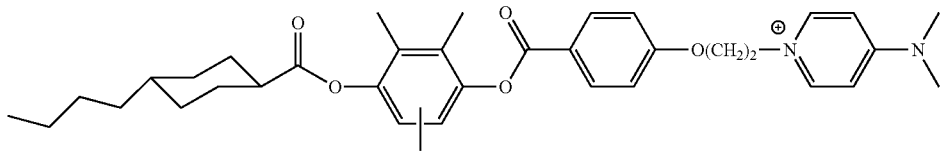
(II-2)
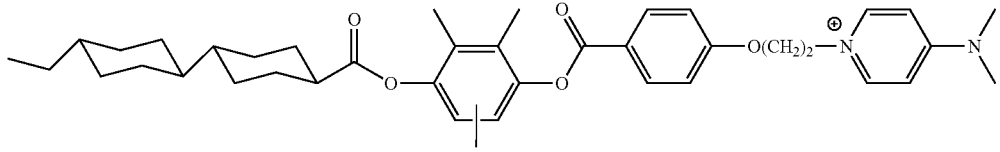
(II-3) (II-4)
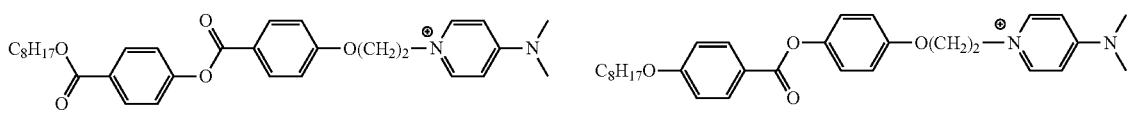
(II-5)
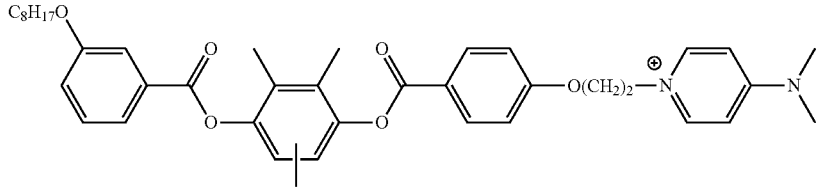
(II-6)
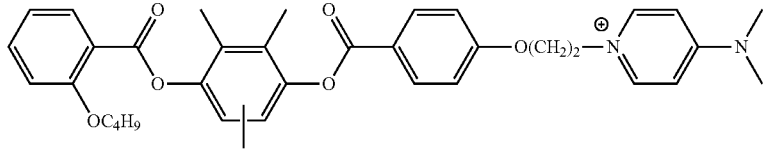
(II-7)
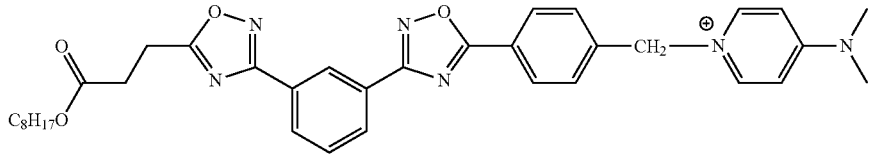
(II-8)
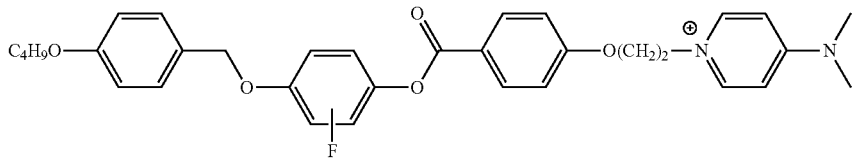
(II-9)
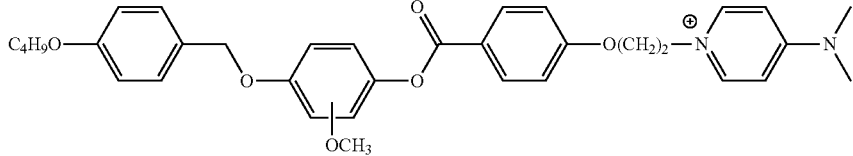

Examples of the compound represented by formula (II') include those described below. In the formulas, anion (X⁻) is omitted.
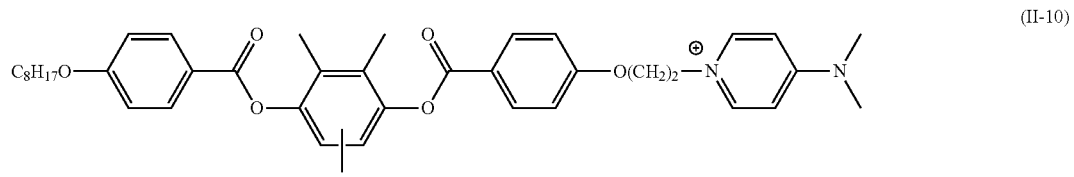
(II-10)
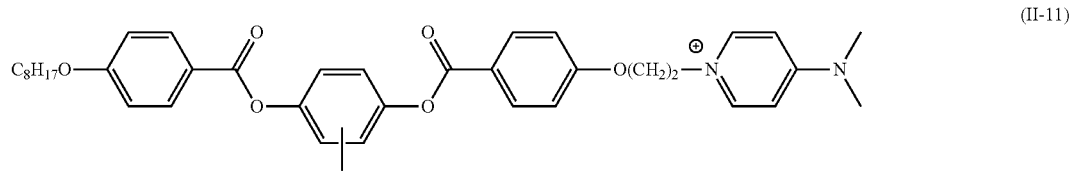
(II-11)
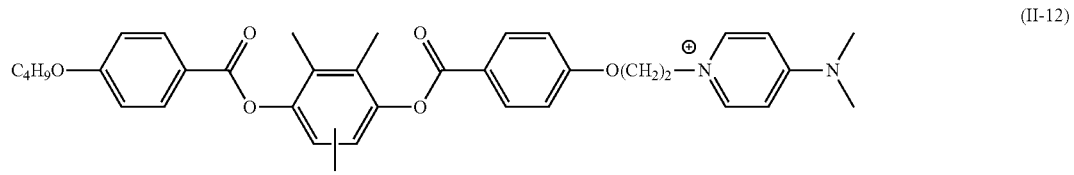
(II-12)
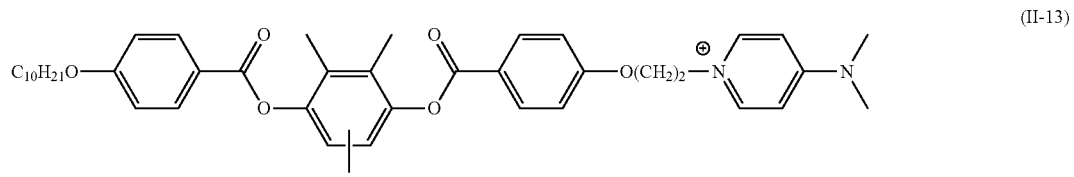
(II-13)
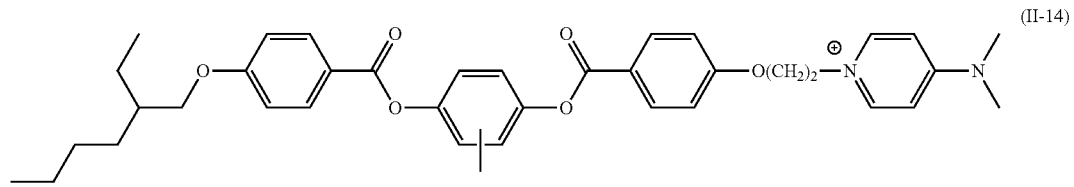
(II-14)
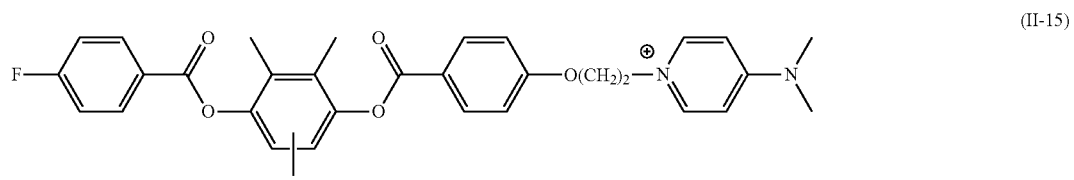
(II-15)
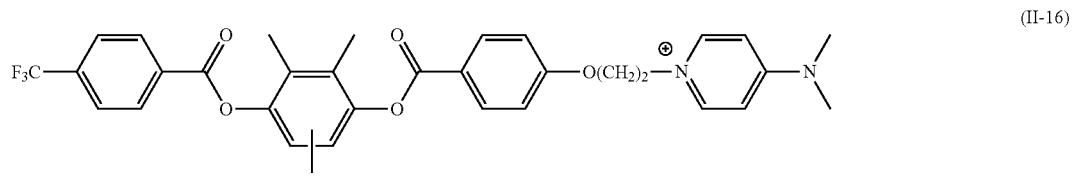
(II-16)
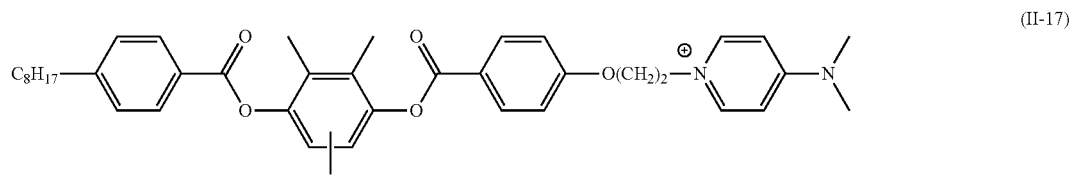
(II-17)
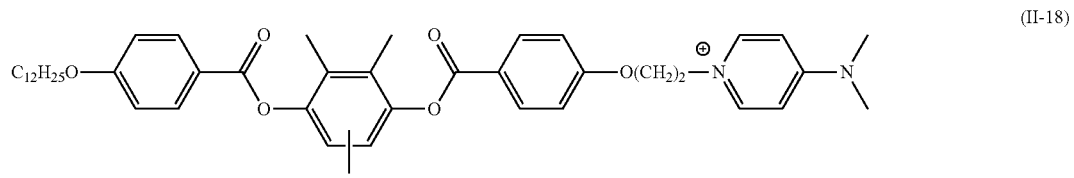
(II-18)

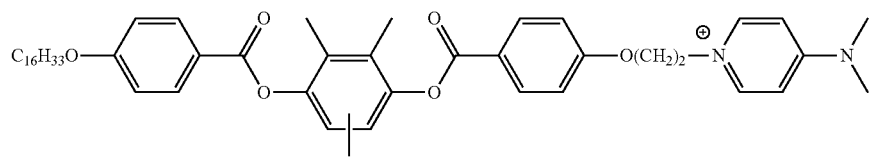
(II-19)
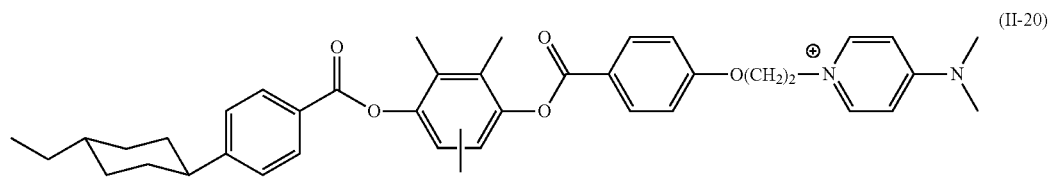
(II-20)
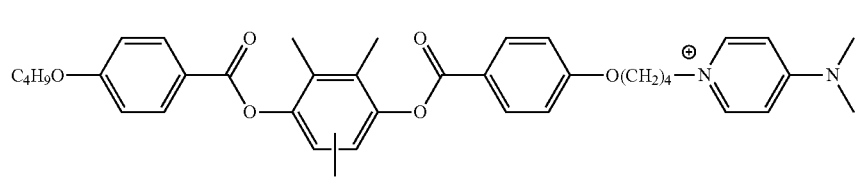
(II-21)
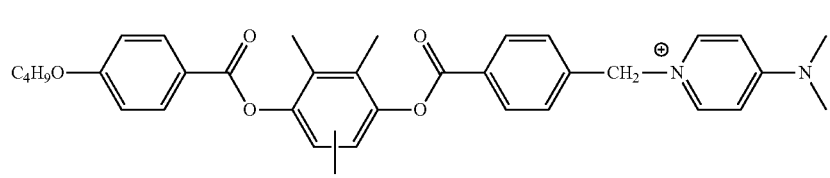
(II-22)
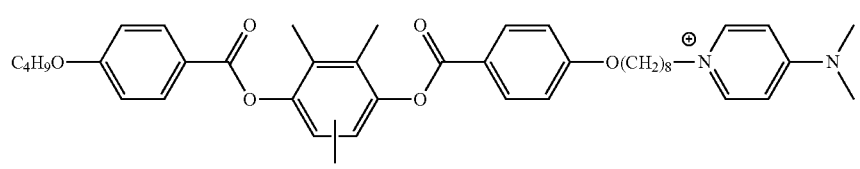
(II-23)
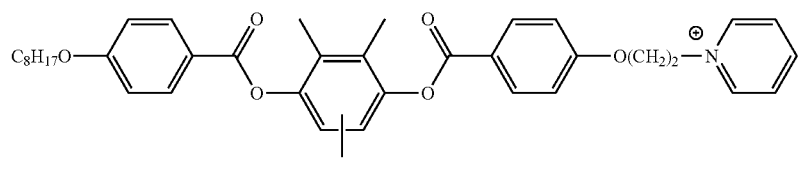
(II-24)
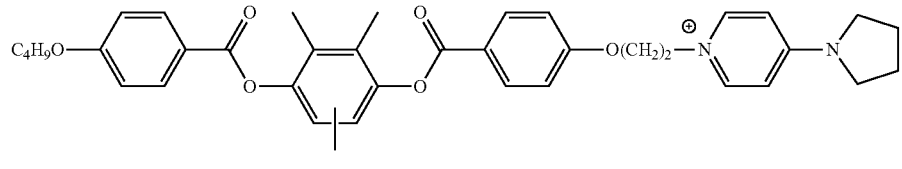
(II-25)
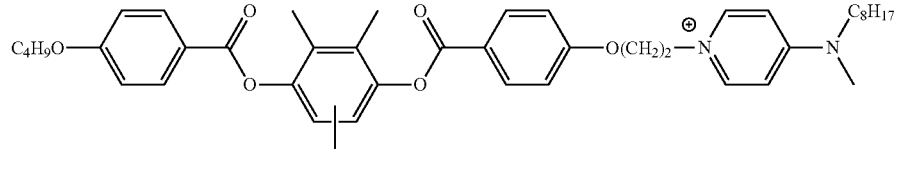
(II-26)
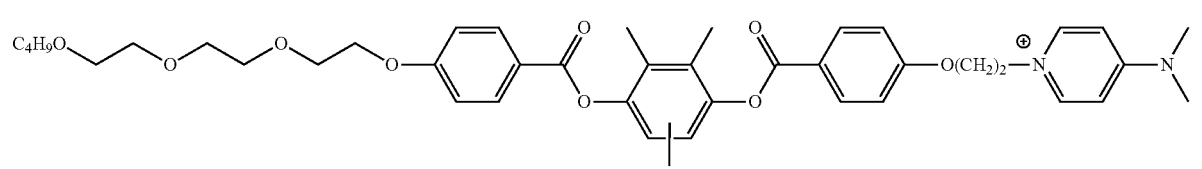
(II-27)

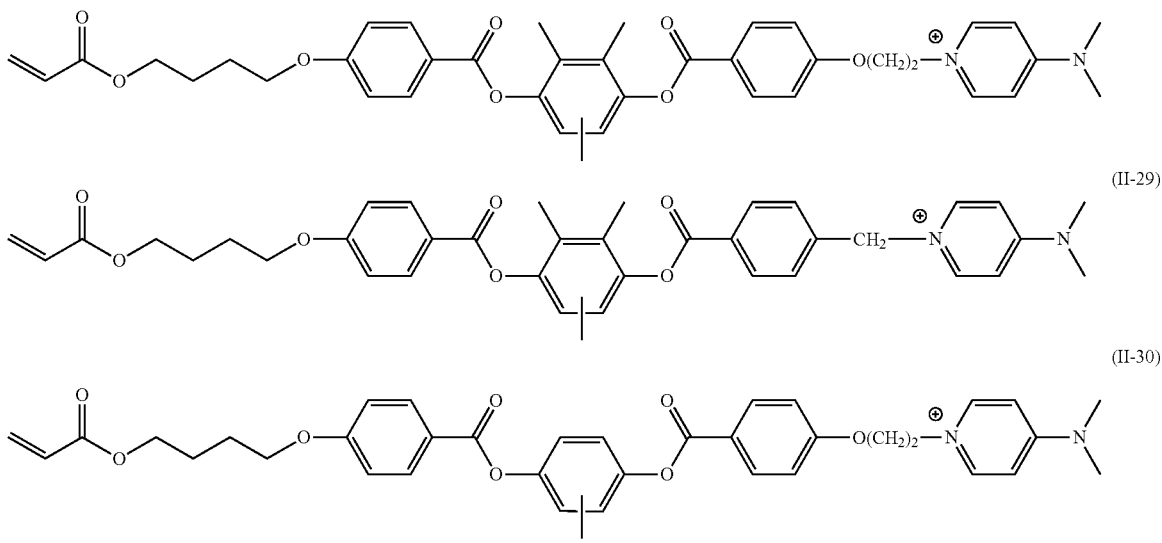

Pyridinium derivatives of formula (II) can be usually obtained by subjecting a pyridine ring to the alkylation (Menschutkin reaction).

A preferable range of the content of the pyridinium derivatives in the liquid crystalline composition varies depending on their use, but it is preferably 0.005 to 8% by weight, and more preferably 0.01 to 5% by weight in the liquid crystalline composition (liquid crystalline composition without a solvent in the case of preparing as a coating solution).

[Air Interface Vertical Alignment Material]

According to the invention, as the air-interface vertical alignment material, the fluorine-containing polymer represented by following formula (II) or the fluorine-containing compound represented by formula (III) may be used.

Fluorine-containing polymer: Copolymer containing a repetitive unit derived from a monomer having a fluoro-aliphatic group and a repetitive unit derived from following formula (II)

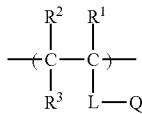

In Formula (II), $R^1$, $R^2$ and $R^3$ each independently represent a hydrogen atom or a substituent; L represents an arbitrary group selected from the following linking groups or a divalent linking group formed of combination of two or more kinds thereof;

(Group of Linking Groups)

a single bond, —O—, —CO—, —NR$^4$— (wherein R$^4$ is a hydrogen atom, an alkyl group, an aryl group or an aralkyl group), —S—, —SO$_2$—, —P(=O)(OR$^5$)— (wherein R$^5$ is an alkyl group, an aryl group or an aralkyl group), an alkylene group and an arylene group;

Q represents a carboxyl group (—COOH) or its salts, a sulfo group (—SO$_3$H) or its salts, or a phosphonoxy group {—OP(=O)(OH)$_2$} or its salts.

Fluorine-Containing Compound Represented by Formula (III):

$$(R^o)_m\text{-}L^o\text{-}(W)_n \qquad (III)$$

In the formula, R$^o$ is an alkyl group, an alkyl group having a CF$_3$ group at the end, or an alkyl group having a CF$_2$H group at the end; m is an integer of 1 or greater; a plurality of R$^o$ may be the same as or different from each other, but at least one R$^o$ is an alkyl group having a CF$_3$ group or a CF$_2$H group at the end; L$^o$ is a (m+n)-valent linking group; W is a carboxyl group (—COOH) or a salt thereof, a sulfo group (—SO$_3$H) or a salt thereof, or a phosphonoxy group {—OP(=O)(OH)$_2$} or a salt thereof; and n is an integer of 1 or greater.

At first, the fluorine-containing polymer will be described in detail.

The fluorine-containing polymer used in the invention is characterized in that it contains a fluoro-aliphatic group and at least one or more hydrophilic group selected from a group of a carboxyl group (—COOH), a sulfo group (—SO$_3$H), a phosphonoxy group {—OP(=O)(OH)$_2$} and salts thereof. Examples of the polymers, as described in Otsu, T. "Revised. The Chemistry of Polymer Synthesis", Kagaku Dojin, p. 1-4 (1968), include polyolefins, polyesters, polyamides, polyimides, polyurethanes, polycarbonates, polysulfones, polycarbonates, polyethers, polyacetals, poly ketones, polyphenylene oxides, polyphenylene sulfides, polyarylates, polytetrafluoroethylenes (PTFE), polyvinylidene fluorides, a cellulose derivatives and the like. The fluorine-containing polymers are preferably polyolefins.

Such the fluorine-containing polymer is a polymer having a fluoro-aliphatic group in its side chain. The fluorine-containing polymer preferably has 1 to 12 carbon atoms, and more preferably has 6 to 10 carbon atoms. The aliphatic group may be a chained group or a ring group. When the aliphatic group is a chained group, it may be a linear chain or a branched chain. Among them, a linear chain fluoro-aliphatic group having 6 to 10 carbon atoms is preferred. The degree of substitution by a fluorine atom is not particularly limited, but 50% or more of the hydrogen atoms in the aliphatic group are preferably substituted by a fluorine atom, and a substitution degree of 60% or more is further preferred. The fluoro-aliphatic group is contained in the side chain bonded with the main chain of a polymer introduced by an ester bond, an amide bond, an imide bond, a urethane bond, an ether bond, a thioether bond, aromatic ring or the like. One of the fluoro-aliphatic groups is derived from a fluoro-aliphatic compound prepared by the telomerization method (also referred to as a telomer method) or the oligomerization method (also referred to as an oligomer method). The preparation method of the fluoro-aliphatic compound is described, for example, in N. Ishikawa, "Synthesis and Function of Fluorine Compound", CMC, p. 117-118 (1987) or Hudlicky, M. & Pavlath, A. E., "Chemistry of Organic Fluorine Compounds II" Monograph 187, Edited by Milos Hudlicky and Attila E. Pavlath, American Chemical Society p. 747-752 (1995). The telomerization method is a process in which an alkyl halide having a large chain transfer constant such as an iodide is used as a telogen to conduct radical polymerization of a fluorine-containing vinyl compound such as tetrafluoroethylene to synthesize a telomer (exemplified in Scheme-1).

Scheme 1

The obtained iodine-terminated telomer is usually subjected to an appropriate terminal chemical modification, such as those shown by Scheme 2, and thereby converted to fluoro-aliphatic compounds. These compounds are further converted, if necessary, into desired monomer structures, which are then used in preparing a fluorine-containing polymer.

Scheme 2

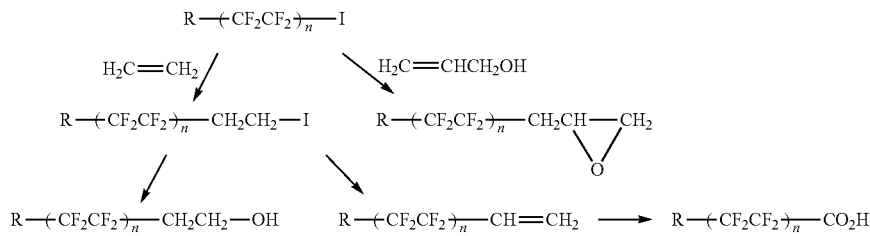

Specific examples of the monomer used for preparation of the fluorine-containing polymer useful in the invention include, are not limited to, those described in JP-A-2006-113500, [0075]-[0081].

One embodiment of the fluorine-containing polymer used in the invention is a copolymer of a repeating unit derived from a fluoro-aliphatic group-containing monomer (sometimes referred to as a 'fluorine-containing monomer') and a repeating unit having a hydrophilic group represented by the following Formula (II).

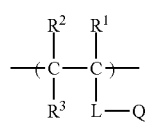

(II)

In Formula (II), $R^1$, $R^2$ and $R^3$ are each independently a hydrogen atom or a substituent. Q is a carboxyl group (—COOH) or its salts, a sulfo group (—SO$_3$H) or its salts, or a phosphonoxy group {—OP(=O)(OH)$_2$} or its salts. L is an arbitrary group selected from the following linking groups or a divalent linking group formed of combination of two or more kinds thereof.

(Group of Linking Groups)

A single bond, —O—, —CO—, —NR$^4$— (wherein R$^4$ is a hydrogen atom, an alkyl group, an aryl group or an aralkyl group), —S—, —SO$_2$—, —P(=O)(OR$^5$)— (wherein R$^5$ is an alkyl group, an aryl group or an aralkyl group), an alkylene group and an arylene group.

In Formula (II), $R^1$, $R^2$ and $R^3$ each independently represent a hydrogen atom or a substituent selected from the following group of the substituents.

(Group of Substituents)

An alkyl group (an alkyl group having preferably 1 to 20 carbon atoms, more preferably 1 to 12 carbon atoms, and even more preferably 1 to 8 carbon atoms such as a methyl group, an ethyl group, an isopropyl group, a tert-butyl group, an n-octyl group, an n-decyl group, an n-hexadecyl group, a cyclopropyl group, a cyclopentyl group, a cyclohexyl group, etc.); an alkenyl group (an alkenyl group having preferably 2 to 20 carbon atoms, more preferably 2 to 12 carbon atoms, and even more preferably 2 to 8 carbon atoms such as a vinyl group, an allyl group, a 2-butenyl group, a 3-pentenyl group, etc.); an alkynyl group (an alkynyl group having preferably 2 to 20 carbon atoms, more preferably 2 to 12 carbon atoms, and even more preferably 2 to 8 carbon atoms such as a propargyl group, a 3-pentynyl group, etc.); an aryl group (an aryl group having preferably 6 to 30 carbon atoms, more preferably 6 to 20 carbon atoms, and even more preferably 6 to 12 carbon atoms such as a phenyl group, a p-methylphenyl group, a naphthyl group, etc.); an aralkyl group (an aralkyl group having 7 to 30 carbon atoms, more preferably 7 to 20 carbon atoms, and even more preferably 7 to 12 carbon atoms such as a benzyl group, a phenethyl group, a 3-phenylpropyl group, etc.); a substituted or unsubstituted amino group (an amino group having preferably 0 to 20 carbon atoms, more preferably 0 to 10 carbon atoms, and even more preferably 0 to 6 carbon atoms such as an unsubstituted amino group, a methylamino group, a dimethylamino group, a diethylamino group, an anilino group, etc.); an alkoxy group (an alkoxy group having preferably 1 to 20 carbon atoms, more preferably 1 to 16 carbon atoms, and even more preferably 1 to 10 carbon atoms such as a methoxy group, an ethoxy group, a butoxy group, etc.); an alkoxycarbonyl group (an alkoxycarbonyl group having preferably 2 to 20 carbon atoms, more preferably 2 to 16 carbon atoms, and even more preferably 2 to 10 carbon atoms such as a methoxycarbonyl group, an ethoxycarbonyl group, etc.); an acyloxy group (an acyloxy group having preferably 2 to 20 carbon atoms, more preferably 2 to 16 carbon atoms, and even more preferably 2 to 10 carbon atoms such as an acetoxy group, a benzoyloxy group, etc.); an acylamino group (an acylamino group having preferably 2 to 20 carbon atoms, more preferably 2 to 16 carbon atoms, and even more preferably 2 to 10 carbon atoms such as an acetylamino group, a benzoylamino group, etc.); an alkoxycarbonylamino group (an alkoxycarbonylamino group having preferably 2 to 20 carbon atoms, more preferably 2 to 16 carbon atoms, and even more preferably 2 to 12 carbon atoms such as methoxycarbonylamino group, etc.); an aryloxycarbonylamino group (an aryloxycarbonylamino group having preferably 7 to 20 carbon atoms, more preferably 7 to 16 carbon atoms, and even more preferably 7 to 12 carbon atoms such as phenyloxycarbonylamino group, etc.); a sulfonylamino group (a sulfonylamino group having preferably 1 to 20 carbon atoms, more preferably 1 to 16 carbon atoms, and even more preferably 1 to 12 carbon atoms such as a methanesulfonylamino group, a benzenesulfonylamino group, etc.); a sulfamoyl group (a sulfamoyl group having preferably 0 to 20 carbon atoms, more preferably 0 to 16 carbon atoms, and even more preferably 0 to 12 carbon atoms such as a sulfamoyl group, a methylsulfamoyl group, a dimethylsulfamoyl group, a phenylsulfamoyl group, etc.); a carbamoyl group (a carbamoyl group having preferably 1 to 20 carbon atoms, more preferably 1 to 16 carbon atoms, and even more preferably 1 to 12 carbon atoms such as an unsubstituted carbamoyl group, a methylcarbamoyl group, a diethylcarbamoyl group, a phenylcarbamoyl group, etc.); an alkylthio group (an alkylthio group having preferably 1 to 20 carbon atoms, more preferably 1 to 16 carbon atoms, and even more preferably 1 to 12 carbon atoms such as a methylthio group, an ethylthio group, etc.); an arylthio group (an arylthio group having preferably 6 to 20 carbon atoms, more preferably 6 to 16 carbon atoms, and even more preferably 6 to 12 carbon atoms such as a phenylthio group, etc.); a sulfonyl group (a sulfonyl group having preferably 1 to 20 carbon atoms, more preferably 1 to 16 carbon atoms, and even more preferably 1 to 12 carbon atoms such as a mesyl group, a tosyl group, etc.); a sulfinyl group (a sulfinyl group having preferably 1 to 20 carbon atoms, more preferably 1 to 16 carbon atoms, and even more preferably 1 to 12 carbon atoms such as a methanesulfinyl group, a benzenesulfinyl group, etc.); a ureido group (a ureido group having preferably 1 to 20 carbon atoms, more preferably 1 to 16 carbon atoms, and even more preferably 1 to 12 carbon atoms such as an unsubstituted ureido group, a methylureido group, a phenylureido group, etc.); a phosphoric amido group (a phosphoric amido group having preferably 1 to 20 carbon atoms, more preferably 1 to 16 carbon atoms, and even more preferably 1 to 12 carbon atoms such as a diethylphosphoric amido group, a phenylphosphoric amido group, etc.); a hydroxyl group; a mercapto group; a halogen atom (e.g., a fluorine atom, a chlorine atom, a bromine atom and an iodine atom); a cyano group; a sulfo group; a carboxyl group; a nitro group; a hydroxamic acid group; a sulfino group; a hydrazino group; an imino group; a heterocyclic group (a heterocyclic group having preferably 1 to 30 carbon atoms, and more preferably 1 to 12 carbon atoms such as heterocyclic group containing heteroatoms such as a nitrogen atom, an oxygen atom, a sulfur atom, e.g., an imidazolyl group, a pyridyl group, a quinolyl group, a fury) group, a piperidine group, a morpholino group, a benzoxazolyl group, a benzimidazolyl group, a benzthiazolyl group, etc.); a silyl group (a silyl group having preferably 3 to 40 carbon atoms, more preferably 3 to 30 carbon atoms, and even more preferably 3 to 24 carbon atoms such as a trimethylsilyl group, a triphenylsilyl group, etc.). These substituents may be further substituted with these substituents. In addition, when two or more substituents exist, they may be the same as or different from each other. Further, they may be bonded to each other to form a ring, if possible.

Preferably, $R^1$, $R^2$ and $R^3$ each independently represent a hydrogen atom, an alkyl group, a halogen group (e.g., a fluorine atom, a chlorine atom, a bromine atom, an iodine atom, etc.) or a group represented by -L-Q to be described below, more preferably a hydrogen atom, an alkyl group having 1 to 6 carbon atoms, a chlorine atom or a group represented by -L-Q, particularly preferably a hydrogen atom, an alkyl group having 1 to 4 carbon atoms, and most preferably a hydrogen atom or an alkyl group having 1 to 2 carbon atoms. Specific examples of the alkyl group include a methyl group, an ethyl group, an n-propyl group, an n-butyl group, a sec-butyl group and the like. The alkyl group may have a suitable substituent. Examples of the substituent include a halogen atom, an aryl group, a heterocyclic group, an alkoxyl group, an aryloxy group, an alkylthio group, an arylthio group, an acyl group, a hydroxyl group, an acyloxy group, an amino group, an alkoxycarbonyl group, an acylamino group, an oxycarbonyl group, a carbamoyl group, a sulfonyl group, a sulfamoyl group, a sulfonamido group, a sulforyl group, a carboxyl group and the like. Further, for the number of carbon atoms in the alkyl group, carbon atoms in the substituents are not considered. Hereinafter, it is also applied to the number of carbon atoms in other groups.

L is a divalent linking group selected from the above-mentioned linking groups, or a divalent linking group formed by combination of two or more kinds thereof. Among the above-mentioned group of the linking groups, $R^4$ of —$NR^4$— is a hydrogen atom, an alkyl group, an aryl group or an aralkyl group, and preferably a hydrogen atom or an alkyl group. Further, $R^5$ of —$PO(OR^5)$— is an alkyl group, an aryl group or an aralkyl group, and preferably an alkyl group. When $R^4$ and $R^5$ are an alkyl group, an aryl group or an aralkyl group, the number of carbon atoms is the same as described for the 'group of the substituents'. Examples of L preferably include a single bond, —O—, —CO—, —$NR^4$—, —S—, —$SO_2$—, an alkylene group or an arylene group, and particularly preferably include —CO—, —O—, —$NR^4$—, an alkylene group or an arylene group. When L is an alkylene group, it is an alkylene group having preferably 1 to 10 carbon atoms, more preferably 1 to 8 carbon atoms, and even more preferably 1 to 6 carbon atoms. Specific examples of the particularly preferable alkylene group include a methylene group, an ethylene group, a trimethylene group, a tetrabutylene group, a hexamethylene group and the like. When L is an arylene group, the number of carbon atoms in an arylene group is preferably 6 to 24, more preferably 6 to 18, and even more preferably 6 to 12. Specific examples of the particularly preferable arylene group include a phenylene group, a naphthylene group and the like. When L comprises a divalent linking group obtained by combination of an alkylene group and an arylene group, the number of carbon atoms in the aralkylene group is preferably 7 to 34, more preferably 7 to 26, and even more preferably 7 to 16. Specific examples of the particularly preferable aralkylene group include a phenylenemethylene group, a phenyleneethylene group, a methylenephenylene group and the like. The group mentioned as L may have a suitable substituent. Such the substituent may be the same substituent as the above-mentioned for the substituent in $R^1$, $R^2$ and $R^3$. Specific structures of L include, but are not limited to, those described in JP-A-2006-113500, [0090]-[0091].

In Formula (II), Q is a carboxyl group and a salt thereof (e.g., a lithium salt, a sodium salt, a potassium salt, an ammonium salt (e.g., ammonium, tetramethyl ammonium, trimethyl-2-hydroxyethyl ammonium, tetrabutyl ammonium, trimethylbenzyl ammonium, dimethylphenyl ammonium, etc.), a pyridinium salt, etc.), a sulfo group and a salt thereof (examples of the cation forming salt are the same as the salts disclosed for the carboxyl group), a phosphonoxy group and a salt thereof (examples of the cation forming salt are the same salts disclosed for the carboxyl group). Q is further preferably a carboxyl group, a sulfo group or a phospho group, and particularly preferably a carboxyl group or a sulfo group.

The above-mentioned fluorine-containing polymer may contain one kind of the repeating unit represented by Formula (II), and may also contain two or more kinds thereof. Moreover, the fluorine-containing polymer may contain one kind or two or more kinds of other repeating units in addition to the above-mentioned each repeating unit. The other repeating unit is not particularly limited, but typically a repeating unit derived from a radically polymerizable monomer may be mentioned as a preferable example. Hereinafter, specific examples of the monomer to be derived to other repeating unit will be mentioned. The fluorine-containing polymer may contain a repeating unit derived from one kind or two or more kinds of monomers selected from the following group of the monomers.

Group of Monomers (1) Alkenes:

ethylene, propylene, 1-butene, isobutene, 1-hexene, 1-dodecene, 1-octadecene, 1-eicosene, hexafluoropropene, vinylidene fluoride, chlorotrifluoroethylene, 3,3,3-trifluoropropylene, tetrafluoroethylene, vinyl chloride, vinylidene chloride and the like;

(2) Dienes:

1,3-butadiene, isoprene, 1,3-pentadiene, 2-ethyl-1,3-butadiene, 2-n-propyl-1,3-butadiene, 2,3-dimethyl-1,3-butadiene, 2-methyl-1,3-pentadiene, 1-phenyl-1,3-butadiene, 1-α-naphthyl-1,3-butadiene, 1-β-naphthyl-1,3-butadiene, 2-chloro-1,3-butadiene, 1-bromo-1,3-butadiene, 1-chlorobutadiene, 2-fluoro-1,3-butadiene, 2,3-chloro-1,3-butadiene, 1,1,2-trichloro-1,3-butadiene and 2-cyano-1,3-butadiene, 1,4-divinyl cyclohexane and the like;

(3) Derivatives of α,β-Unsaturated Carboxylic Acid:

(3a) Alkyl Acrylates:

methyl acrylate, ethyl acrylate, n-propyl acrylate, isopropyl acrylate, n-butyl acrylate, isobutyl acrylate, sec-butyl acrylate, tert-butyl acrylate, amyl acrylate, n-hexyl acrylate, cyclohexyl acrylate, 2-ethylhexyl acrylate, n-octyl acrylate, tert-octyl acrylate, dodecyl acrylate, phenyl acrylate, benzyl acrylate, 2-chloroethyl acrylate, 2-bromoethyl acrylate, 4-chlorobutyl acrylate, 2-cyanoethyl acrylate, 2-acetoxyethyl acrylate, methoxybenzyl acrylate, 2-chlorocyclohexyl acrylate, furfuryl acrylate, tetrahydrofurfuryl acrylate, 2-methoxyethyl acrylate, ω-methoxypolyethyleneglycol acrylate (number of added moles of polyoxyethylene: n=2 to 100), 3-methoxybutyl acrylate, 2-ethoxyethyl acrylate, 2-butoxyethyl acrylate, 2-(2-butoxyethoxy)ethyl acrylate, 1-bromo-2-methoxyethyl acrylate, 1,1-dichloro-2-ethoxyethyl acrylate, glycidylacrylate and the like;

(3b) Alkyl Methacrylates:

methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, n-hexyl methacrylate, cyclohexyl methacrylate, 2-ethylhexyl methacrylate, n-octyl methacrylate, stearyl methacrylate, benzyl methacrylate, phenyl methacrylate, allyl methacrylate, furfuryl methacrylate, tetrahydrofurfuryl methacrylate, cresyl methacrylate, naphthyl methacrylate, 2-methoxyethyl methacrylate, 3-methoxybutyl methacrylate, ω-methoxypolyethyleneglycol methacrylate (number of added moles of polyoxyethylene: n=2 to 100), 2-acetoxyethyl methacrylate, 2-ethoxyethyl methacrylate, 2-butoxyethyl methacrylate, 2-(2-butoxyethoxy)ethyl methacrylate, glycidyl methacrylate, 3-trimethoxysilylpropyl methacrylate, allyl methacrylate, 2-isocyanatoethyl methacrylate and the like;

(3c) Diesters of Unsaturated Polyvalence Carboxylic Acid:

dimethyl malate, dibutyl malate, dimethyl itaconate, dibutyl itaconate, dibutyl crotonate, dihexyl crotonate, diethyl fumarate, dimethyl fumarate and the like; and (3d) Amides of α,β-Unsaturated Carboxylic Acid:

N,N-dimethylacrylic amide, N,N-diethylacrylic amide, N-n-propylacrylic amide, N-tert-butylacrylic amide, N-tert-octyl methacrylamide, N-cyclohexylacrylic amide, N-phenylacrylic amide, N-(2-acetoacetoxyethyl)acrylic amide, N-benzylacrylic amide, N-acryloyl morpholine, diacetone acrylic amide, N-methylmaleimide and the like;

(4) Unsaturated Nitriles:

acrylonitrile, methacrylonitrile and the like;

(5) Styrenes and their Derivatives:

styrene, vinyl toluene, ethyl styrene, p-tert-butyl styrene, p-vinylbenzoic acid methyl, α-methyl styrene, p-chloromethyl styrene, vinylnaphthalene, p-methoxy styrene, p-hydroxymethyl styrene, p-acetoxy styrene and the like;

(6) Vinyl Esters:

vinyl acetate, vinyl propionate, vinyl butyrate, vinyl isobutyrate, vinyl benzoate, vinyl salicylate, vinyl chloroacetate, vinyl methoxyacetate, vinyl phenylacetate and the like;

(7) Vinyl Ethers:

methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, n-eicosyl vinyl ether, 2-ethylhexyl vinyl ether, cyclohexyl vinyl ether, fluorobutyl vinyl ether, fluorobutoxyethyl vinyl ether and the like; and (8) Other Polymerizable Monomers:

N-vinyl pyrrolidone, methyl vinyl ketone, phenyl vinyl ketone, methoxyethyl vinyl ketone, 2-vinyl oxazoline, 2-isopropenyl oxazoline and the like.

Within the above-mentioned fluorine-containing polymer, the content of the fluoro-aliphatic group-containing monomer is preferably 5% by weight or more, more preferably 10% by weight or more, and even more preferably 30% by weight or more of the total content of the component monomer in the polymer. For the fluorine-containing polymer, the content of the repeating unit represented by Formula (II) is preferably 0.5% by weight or more of the total content of the component monomer in the polymer, more preferably 1 to 20% by weight or more, and even more preferably 1 to 10% by weight or more. The percent by weight may be easily changed as the value of the preferable range is changed according to the molecular weight of the monomer being used, thus by presenting the molar number of the functional group per unit weight of a polymer, an accurate content of the repeating unit represented by Formula (II) can be determined. In the case of using such notation, a preferable content of a hydrophilic group contained in the fluorine-containing polymer (Q in Formula (II)) is 0.1 mmol/g to 10 mmol/g, and more preferable content is 0.2 mmol/g to 8 mmol/g.

The weight average molecular weight of the fluorine-containing polymer used in the invention is preferably 1,000,000 or less, more preferably 500,000 or less, and even more preferably 100,000 or less. The weight average molecular weight can be measured in terms of polystyrene (PS) value by gel permeation chromatography (GPC).

A method for polymerization of the above-mentioned fluorine-containing polymer is not particularly limited, but a cationic polymerization or radical polymerization using a vinyl group, or an anionic polymerization can be mentioned. Among them, the radical polymerization is particularly preferred from the viewpoint of common use. For the polymerization initiator, a conventional compound such as a radical thermopolymerization initiator or radical photopolymerization initiator can be used, but particularly preferably a radical thermopolymerization initiator is used. Herein, the radical thermopolymerization initiator is a compound which generates radical by heating to a temperature of decomposition temperature or more. Examples of the radical thermopolymerization initiator include dioxy peroxides (acetyl peroxides, benzoyl peroxides, etc.), keton peroxides (methylethyl ketone peroxides, cyclohexanone peroxides, etc.), hydroperoxides (hydrogen peroxide, tert-butylhydroperoxide, cumenehydroperoxide, etc.), dialkyl peroxides (di-tert-butyl peroxide, dicumyl peroxide, dilauroyl peroxide, etc.), peroxy esters (tert-butylperoxyacetate, tert-butylperoxypivalate, etc.), azo compounds (azo-bis-isobutyronitrile, azo-bis-isovaleronitrile, etc.), persulfates (ammonium persulfate, sodium persulfate, potassium persulfate, etc.). These radical thermopolymerization initiators can be used alone or in combination of two or more kinds thereof.

The radical polymerization is not particularly limited, but any one of an emulsion polymerization, a suspension polymerization, a mass polymerization and a solution polymerization can be adopted. The solution polymerization which is a typical radical polymerization will be described in detail. The fundamentals of other polymerization methods are the same, and they are described, for example, in "Experimental Method for Polymer Synthesis, (Tokyo KAGAKU-DOJIN, 1981), and the like.

An organic solvent is used in carrying out the solution polymerization. The organic solvent can be arbitrarily selected as long as it does not impair the object and effect of the invention. The organic solvent is generally one having a boiling point within the range of 50 to 200 degrees Celsius under atmospheric pressure, and an organic compound which may dissolve each constitutional component is preferred. Preferable examples of the organic solvent include alcohols such as isopropanol and butanol; ethers such as dibutyl ether, ethyleneglycol diemethyl ether, tetrahydrofuran and dioxane; ketones such as acetone, methylethyl ketone, methylisobutyl ketone and cyclohexanone; esters such as ethyl acetate, butyl acetate, amyl acetate and γ-butyrolactone; and aromatic hydrocarbons such as benzene, toluene and xylene. Further, the organic solvent can be used alone or in combination of two or more. In addition, from the viewpoint of dissolvability of a monomer or a produced polymer, a water-mixed organic solvent, in which water is used in combination with the organic solvent, may be also employed.

In addition, the conditions for solution polymerization are not particularly limited, but it is preferable, for example, that the temperature is within the range of 50 to 200 degrees Celsius and the duration time for heating is 10 minutes to 30 hours. Further, in order not to deactivate the generated radicals, it is preferable to conduct inert gas purge surely during the solution polymerization, but also prior to the solution polymerization initiation. For the inert gas, a typical nitrogen gas can be preferably used.

In order to obtain the above-mentioned fluorine-containing polymer within a preferable molecular weight range, a radical polymerization method using a chain transfer agent is particularly effective. For the chain transfer agent, mercaptans (e.g., octylmercaptan, decylmercaptan, dodecylmercaptan, tert-dodecylmercaptan, octadecylmercaptan, thiophenol, p-nonylthiophenol, etc.), polyalkyl halides (e.g., carbon tetrachloride, chloroform, 1,1,1-trichloroethane, 1,1,1-tribromooctane, etc.), low-active monomers (α-methylstyrene, a α-methylstyrene dimer, etc.) can be used, and preferably mercaptan having 4 to 16 carbon atoms is preferably used. The use amount of the chain transfer agent is influenced by activity of the chain transfer agent, combination of the monomers, polymerization conditions, or the like, and is required to under precise control. However, with respect to the total molar number of the used monomer, the use amount of the chain transfer agent is preferably about 0.01 mol % to 50 mol %, more preferably 0.05 mol % to 30 mol %, and even more preferably 0.08 mol % to 25 mol %. The chain transfer agent may exist well together with the subjective monomers to be controlled for the degree of polymerization during the polymerization process, and its additive process is not particularly critical. The chain transfer agent may be added by dissolving in a monomer or added separately from the monomer.

Further, the fluorine-containing polymer of the invention preferably contains a polymerizable group as a substituent for fixating the alignment state of the discotic liquid crystalline compound.

Preferable examples of the fluorine-containing polymer to be used in the present invention include, but are not limited to, those described in JP-A-2006-113500, [0110]-[0114].

The fluorine-containing polymer used in the invention, can be prepared by a conventional and practical method. For example, first, to an organic solvent containing a given fluorine-containing monomer, a monomer having a group capable of hydrogen bonding and the like, a typical radical polymerization initiator is added, and the mixture is polymerized to prepare the fluorine-containing polymer. Further, in cases, other additional polymerizable unsaturated compounds are further added, and the same process is carried out to prepare the fluorine-containing polymer. With respect to the polymerizability of each monomer, a dropwise polymerization method that carries out polymerization while adding monomer and initiator dropwise into a reactor, or the like is effective for obtaining a polymer in a uniformed composition.

A preferable range of the content of the fluorine-containing polymer within the liquid crystalline composition (liquid crystalline composition without a solvent in the case of preparing as a coating solution) varies depending on their use, but it is preferably 0.005 to 8% by weight, more preferably 0.01 to 5% by weight, and even more preferably 0.05 to 1% by weight in the liquid crystalline composition. When the amount of the fluorine-containing polymer to be added is less than 0.005% by weight, its efficacy is insufficient, while when the amount to be added is more than 8% by weight, drying of the coating film is not carried out sufficiently, and the properties as an optic film is given a bad influence (e.g., uniformity of retardation, etc.).

Next, the fluorine-containing compound represented by formula (III) will be described in detail.

$$(R^o)_{mo}\text{-}L^o\text{-}(W)_{no} \qquad \text{Formula (III)}$$

In the formula, $R^o$ functions as a hydrophobic group of a fluorine-containing compound. An alkyl group represented by $R^o$ may be a substituted or unsubstituted alkyl group, may be a linear or branched chain. The alkyl group represented by $R^o$ is preferably an alkyl group having 1 to 20 carbon atoms, more preferably an alkyl group having 4 to 16 carbon atoms, and particularly preferably an alkyl group having 6 to 16 carbon atoms. For the substituent, any one of the substituents exemplified as the following group D of the substituents is suitably used.

An alkyl group having a $CF_3$ group at the end represented by $R^o$ is an alkyl group having preferably 1 to 20 carbon atoms, more preferably 4 to 16 carbon atoms, and even more preferably 4 to 8 carbon atoms. The alkyl group having a $CF_3$ group at the end is an alkyl group having the hydrogen atoms contained in the alkyl group to be substituted in partial or all with a fluorine atom. 50% or more of hydrogen atoms within the alkyl group to be substituted with fluorine atoms is preferred, a substitution degree of 60% or more is more preferred, and a substitution degree of 70% or more is even more preferred. The remaining hydrogen atoms may be further substituted with substituents exemplified as the following group D of the substituents. An alkyl group having a $CF_2H$ group at the end represented by $R^o$ is an alkyl group having preferably 1 to 20 carbon atoms, more preferably 4 to 16 carbon atoms, and even more preferably 4 to 8 carbon atoms. The alkyl group having a $CF_2H$ group at the end is an alkyl group having the hydrogen atoms contained in the alkyl group to be substituted in partial or all with a fluorine atom. 50% or more of hydrogen atoms within the alkyl group to be substituted with fluorine atoms is preferred, a substitution degree of 60% or more is more preferred, and a substitution degree of 70% or more is even more preferred. The remaining hydrogen atoms may be further substituted with substituents exemplified as the following group D of the substituents. Examples of the alkyl group having a $CF_3$ group at the end or the alkyl group having a $CF_2H$ group at the end represented by $R^o$ are shown below.

R1: n-$C_8F_{17}$—
R2: n-$C_6F_{13}$—
R3: n-$C_4F_9$—
R4: n-$C_8F_{17}$—$(CH_2)_2$—
R5: n-$C_6F_{13}$—$(CH_2)_2$—
R6: n-$C_4F_9$—$(CH_2)_2$—
R7: H—$(CF_2)_8$—
R8: H—$(CF_2)_6$—
R9: H—$(CF_2)_4$—
R10: H—$(CF_2)_8$—$(CH_2)$—
R11: H—$(CF_2)_6$—$(CH_2)$—
R12: H—$(CF_2)_4$—$(CH_2)$—

In formula (III), a (m+n)-valent linking group represented by $L^o$ is a linking group of at least two in combination selected from the group comprising an alkylene group, an alkenylene group, an aromatic group, a heterocyclic group, —CO—, —NR— (wherein R is an alkyl group having 1 to 5 carbon atoms or a hydrogen atom), —O—, —S—, —SO—, and —$SO_2$—.

In Formula (III), W is a carboxyl group (—COOH) or a salt thereof, a sulfo group (—$SO_3H$) or a salt thereof, or a phosphonoxy group {—OP(=O)(OH)$_2$} or a salt thereof. The preferable range of W is the same as of Q in Formula (II).

Among the fluorine-containing compound represented by Formula (III), a compound represented by the following Formula (III)-a or Formula (III)-b is preferred.

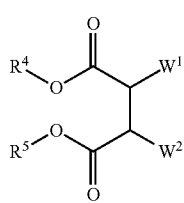

Formula (III)-a

In Formula (III)-a, $R^4$ and $R^5$ are respectively an alkyl group, an alkyl group having a $CF_3$ group at the end, or an alkyl group having a $CF_2H$ group at the end, but $R^4$ and $R^5$ cannot be an alkyl group at the same time. $W^1$ and $W^2$ are respectively a hydrogen atom, a carboxyl group (—COOH) or a salt thereof, a sulfo group (—$SO_3H$) or a salt thereof, a phosphonoxy group {—OP(=O)(OH)$_2$} or a salt thereof, or an alkyl group, an alkoxy group or an alkylamino group having a carboxyl group, a sulfo group or a phosphonoxy group as a substituent, but $W^1$ and $W^2$ cannot be a hydrogen atom at the same time.

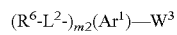  ($R^6$-$L^2$-)$_{m2}$(Ar$^1$)—$W^3$    Formula (III)-b wherein $R^6$ is an alkyl group, an alkyl group having a $CF_3$ group at the end, or an alkyl group having a $CF_2H$ group at the end, m2 is an integer of 1 or greater. A plurality of $R^6$ may be the same as or different from each other, but at least one $R^6$ is an alkyl group having a $CF_3$ group or a $CF_2H$ group at the end. $L^2$ is a divalent linking group selected from a group consisting of an alkylene group, an aromatic group, —CO—, —NR'— (wherein R' is an alkyl group having 1 to 5 carbon atoms or a hydrogen atom), —O—, —S—, —SO—, —$SO_2$—, or a combination thereof, and a plurality of $L^2$ may be the same as or different from each other. Ar$^1$ is an aromatic hydrocarbon ring or an aromatic heterocyclic ring, and $W^3$ is a carboxyl group (—COOH) or a salt thereof, a sulfo group (—$SO_3H$) or a salt thereof, a phosphonoxy group {—OP(=O)(OH)$_2$} or a salt thereof, or an alkyl group, an alkoxy group or an alkylamino group having a carboxyl group, a sulfo group or a phosphonoxy group as a substituent.

First, Formula (III)-a will be described.

$R^4$ and $R^5$ have the same definition as for $R^o$ in Formula (III), and their preferable ranges are also the same. A carboxyl group (—COOH) or a salt thereof, a sulfo group (—$SO_3H$) or a salt thereof, a phosphonoxy group {—OP(=O)(OH)$_2$} or a salt thereof represented by $W^1$ and $W^2$ have the same definition as W in Formula (III), and their preferable ranges are also the same. An alkyl group having a carboxyl group, a sulfo group or a phosphonoxy group as a substituent represented by $W^1$ and $W^2$ may be a linear or branched chain, and the alkyl group having 1 to 20 carbon atom is preferred, the alkyl group having 1 to 8 carbon atoms is more preferred, and the alkyl group having 1 to 3 carbon atoms is particularly preferred. The alkyl group having a carboxyl group, a sulfo group or a phosphonoxy group as a substituent may have at least one of a carboxyl group, a sulfo group or a phosphonoxy group, and the carboxyl group, the sulfo group and the phosphonoxy group have the same definition as the carboxyl group, the sulfo group and the phosphonoxy group represented by W in Formula (III), and their preferable ranges are also the same. The alkyl group having a carboxyl group, a sulfo group or a phosphonoxy group as a substituent may be substituted with other substituents in addition thereto, and for the substituent, any one of substituents exemplified as the following group D of the substituents can be suitably used. An alkoxy group having a carboxyl group, a sulfo group or a phosphonoxy group as a substituent represented by $W^1$ and $W^2$ may be a linear or branched chain, and the alkoxy group having 1 to 20 carbon atom is preferred, the alkoxy group having 1 to 8 carbon atoms is more preferred, and the alkoxy group having 1 to 4 carbon atoms is particularly preferred. The alkoxy group having a carboxyl group, a sulfo group or a phosphonoxy group as a substituent may have at least one of a carboxyl group, a sulfo group or a phosphonoxy group, and the carboxyl group, the sulfo group and the phosphonoxy group have the same definition as the carboxyl group, the sulfo group and the phosphonoxy group represented by W in Formula (III), and their preferable ranges are also the same. The alkoxy group having a carboxyl group, a sulfo group or a phosphonoxy group as a substituent may be substituted with other substituents in addition thereto, and for the substituent, any one of substituents exemplified as the following group D of the substituents can be suitably used. An alkylamino group having a carboxyl group, a sulfo group or a phosphonoxy group as a substituent represented by $W^1$ and $W^2$ may be a linear or branched chain, and the alkylamino group having 1 to 20 carbon atom is preferred, the alkylamino group having 1 to 8 carbon atoms is more preferred, and the alkylamino group having 1 to 4 carbon atoms is particularly preferred. The alkylamino group having a carboxyl group, a sulfo group or a phosphonoxy group as a substituent may have at least one of a carboxyl group, a sulfo group or a phosphonoxy group, and the carboxyl group, the sulfo group and the phosphonoxy group have the same definition as the carboxyl group, the sulfo group and the phosphonoxy group represented by W in Formula (III), and their preferable ranges are also the same. The alkylamino group having a carboxyl group, a sulfo group or a phosphonoxy group as a substituent may be substituted with other substituents in addition thereto, and for the substituent, any one of substituents exemplified as the following group D of the substituents can be suitably used.

$W^1$ and $W^2$ are particularly preferably a hydrogen atom or $-(CH_2)_nSO_3M$ (wherein n is 0 or 1), respectively. M is a cation, but in the case where the charge within the molecule becomes 0, M may not exist. Examples of the cation represented by M, a protonium ion, an alkali metal ion (a lithium ion, a sodium ion, a potassium ion, etc.), an alkaline-earth metal ion (a barium ion, a calcium ion, etc.), an ammonium ion and the like, can be preferably used. Among these, a protonium ion, a lithium ion, a sodium ion, a potassium ion and an ammonium ion are particularly preferred.

Next, Formula (III)-b will be described.

$R^6$ has the same definition as $R^\circ$ in Formula (III), and their preferable ranges are also the same. $L^2$ is preferably a linking group having total of 0 to 40 carbon atoms selected from a group consisting of an alkylene group having 1 to 12 carbon atoms, an aromatic group having 6 to 12 carbon atoms, $-CO-$, $-NR-$, $-O-$, $-S-$, $-SO-$, $-SO_2-$, or a combination thereof, and more preferably a linking group having total of 0 to 20 carbon atoms selected from a group consisting of an alkylene group having 1 to 8 carbon atoms, a phenyl group, $-CO-$, $-NR-$, $-O-$, $-S-$, $-SO_2-$, or a combination thereof. $Ar^1$ is preferably an aromatic hydrocarbon ring having 6 to 12 carbon atoms, and more preferably a benzene ring or a naphthalene ring. $W^3$ is a carboxyl group ($-COOH$) or a salt thereof, a sulfo group ($-SO_3H$) or a salt thereof, a phosphonoxy group $\{-OP(=O)(OH)_2\}$ or a salt thereof, or an alkyl group, an alkoxy group or an alkylamino group having a carboxyl group, a sulfo group or a phosphonoxy group as a substituent has the same definition as a carboxyl group ($-COOH$) or a salt thereof, a sulfo group ($-SO_3H$) or a salt thereof, a phosphonoxy group $\{-OP(=O)(OH)_2\}$ or a salt thereof, or an alkyl group, an alkoxy group or an alkylamino group having a carboxyl group, a sulfo group or a phosphonoxy group as a substituent represented by $W^1$ and $W^2$ in Formula (III)-a, and their preferable ranges are also the same.

$W^3$ is preferably a carboxyl group ($-COOH$) or a salt thereof, a sulfo group ($-SO_3H$) or a salt thereof, or an alkylamino group having a carboxyl group ($-COOH$) or a salt thereof, or a sulfo group ($-SO_3H$) or a salt thereof as a substituent, and particularly preferably $SO_3M$ or $CO_2M$. M is a cation, but in the case where the charge within the molecule becomes 0, M may not exist. Examples of the cation represented by M, a protonium ion, an alkali metal ion (a lithium ion, a sodium ion, a potassium ion, etc.), an alkaline-earth metal ion (a barium ion, a calcium ion, etc.), an ammonium ion and the like, can be preferably used. Among these, a protonium ion, a lithium ion, a sodium ion, a potassium ion and an ammonium ion are particularly preferred.

In the specification, examples of the group D of the substituents include an alkyl group (an alkyl group having preferably 1 to 20 carbon atoms, more preferably 1 to 12 carbon atoms, and even more preferably 1 to 8 carbon atoms such as a methyl group, an ethyl group, an isopropyl group, a tert-butyl group, an n-octyl group, an n-decyl group, an n-hexadecyl group, a cyclopropyl group, a cyclopentyl group, a cyclohexyl group, etc.); an alkenyl group (an alkenyl group having preferably 2 to 20 carbon atoms, more preferably 2 to 12 carbon atoms, and even more preferably 2 to 8 carbon atoms such as a vinyl group, an aryl group, a 2-butenyl group, a 3-pentenyl group, etc.); an alkynyl group (an alkynyl group having preferably 2 to 20 carbon atoms, more preferably 2 to 12 carbon atoms, and even more preferably 2 to 8 carbon atoms such as a propargyl group, a 3-pentynyl group, etc.); an aryl group (an aryl group having preferably 6 to 30 carbon atoms, more preferably 6 to 20 carbon atoms, and even more preferably 6 to 12 carbon atoms such as a phenyl group, a p-methylphenyl group, a naphthyl group, etc.); a substituted or unsubstituted amino group (an amino group having preferably 0 to 20 carbon atoms, more preferably 0 to 10 carbon atoms, and even more preferably 0 to 6 carbon atoms such as an unsubstituted amino group, a methylamino group, a dimethylamino group, a diethylamino group, a dibenzylamino group, etc.); an alkoxy group (an alkoxy group having preferably 1 to 20 carbon atoms, more preferably 1 to 12 carbon atoms, and even more preferably 1 to 8 carbon atoms such as a methoxy group, an ethoxy group, a butoxy group, etc.); an aryloxy group (an aryloxy group having preferably 6 to 20 carbon atoms, more preferably 6 to 16 carbon atoms, and even more preferably 6 to 12 carbon atoms such as a phenyloxy group, a 2-naphthyloxy group, etc.); an acyl group (an acyl group having 1 to 20 carbon atoms, more preferably 1 to 16 carbon atoms, and even more preferably 1 to 12 carbon atoms such as an acetyl group, a benzoyl group, a formyl group, a pivaloyl group, etc.); an alkoxycarbonyl group (an alkoxycarbonyl group having preferably 2 to 20 carbon atoms, more preferably 2 to 16 carbon atoms, and even more preferably 2 to 12 carbon atoms such as a methoxycarbonyl group, an ethoxycarbonyl group, etc.); an aryloxycarbonyl group (an aryloxycarbonyl group having preferably 7 to 20 carbon atoms, more preferably 7 to 16 carbon atoms, and even more preferably 7 to 10 carbon atoms such as phenyloxycarbonyl group, etc.); an acyloxy group (an acyloxy group having preferably 2 to 20 carbon atoms, more preferably 2 to 16 carbon atoms, and even more preferably 2 to 10 carbon atoms such as an acetoxy group, a benzoyloxy group, etc.); an acylamino group (an acylamino group having preferably 2 to 20 carbon atoms, more preferably 2 to 16 carbon atoms, and even more preferably 2 to 10 carbon atoms such as an acetylamino group, a benzoylamino group, etc.); an alkoxycarbonylamino group (an alkoxycarbonylamino group having preferably 2 to 20 carbon atoms, more preferably 2 to 16 carbon atoms, and even more preferably 2 to 12 carbon atoms such as methoxycarbonylamino group, etc.); an aryloxycarbonylamino group (an aryloxycarbonylamino group having preferably 7 to 20 carbon atoms, more preferably 7 to 16 carbon atoms, and even more preferably 7 to 12 carbon atoms such as phenyloxycarbonylamino group, etc.); a sulfonylamino group (a sulfonylamino group having preferably 1 to 20 carbon atoms, more preferably 1 to 16 carbon atoms, and even more preferably 1 to 12 carbon atoms such as a methanesulfonylamino group, a benzenesulfonylamino group, etc.); a sulfamoyl group (a sulfamoyl group having preferably 0 to 20 carbon atoms, more preferably 0 to 16 carbon atoms, and even more preferably 0 to 12 carbon atoms such as a sulfamoyl group, a methylsulfamoyl group, a dimethylsulfamoyl group, a phenylsulfamoyl group, etc.); a carbamoyl group (a carbamoyl group having preferably 1 to 20 carbon atoms, more preferably 1 to 16 carbon atoms, and even more preferably 1 to 12 carbon atoms such as an unsubstituted carbamoyl group, a methylcarbamoyl group, a diethylcarbamoyl group, a phenylcarbamoyl group, etc.); an alkylthio group (an alkylthio group having preferably 1 to 20 carbon atoms, more preferably 1 to 16 carbon atoms, and even more preferably 1 to 12 carbon atoms such as a methylthio group, an ethylthio group, etc.); an arylthio group (an arylthio group having preferably 6 to 20 carbon atoms, more preferably 6 to 16 carbon atoms, and even more preferably 6 to 12 carbon atoms such as a phenylthio group, etc.); a sulfonyl group (a sulfonyl group having preferably 1 to 20 carbon atoms, more preferably 1 to 16 carbon atoms, and even more preferably 1 to 12 carbon atoms such as a mesyl group, a tosyl group, etc.); a sulfinyl group (a sulfinyl group having preferably 1 to 20 carbon atoms, more preferably 1 to 16 carbon atoms, and even more preferably 1 to 12 carbon atoms such as a methanesulfinyl group, a benzenesulfinyl group, etc.); a ureido group (a ureido group having preferably 1 to 20 carbon atoms, more preferably 1 to 16 carbon atoms, and even more preferably 1 to 12 carbon atoms such as an unsubstituted ureido group, a methylureido group, a phenylureido group, etc.); a phosphoric amido group (a phosphoric amido group having preferably 1 to 20 carbon atoms, more preferably 1 to 16 carbon atoms, and even more preferably 1 to 12 carbon atoms such as a diethylphosphoric amido group, a phenylphosphoric amido group, etc.); a hydroxyl group; a mercapto group; a halogen atom (e.g., a fluorine atom, a chlorine atom, a bromine atom and an iodine atom); a cyano group; a sulfo group; a carboxyl group; a nitro group; a hydroxamic acid group; a sulfino group; a hydrazino group; an imino group; a heterocyclic group (a heterocyclic group having preferably 1 to 30 carbon atoms, and more preferably 1 to 12 carbon atoms such as heterocyclic group containing heteroatoms such as a nitrogen atom, an oxygen atom, a sulfur atom, e.g., an imidazolyl group, a pyridyl group, a quinolyl group, a furyl group, a piperidine group, a morpholino group, a benzoxazolyl group, a benzimidazolyl group, a benzthiazolyl group, etc.); a silyl group (a silyl group having preferably 3 to 40 carbon atoms, more preferably 3 to 30 carbon atoms, and even more preferably 3 to 24 carbon atoms such as a trimethylsilyl group, a triphenylsilyl group, etc.). These substituents may be further substituted with these substituents. In addition, when two or more substituents exist, they may be the same as or different from each other. Further, they may be bonded to each other to form a ring, if possible.

Further, for the fluorine-containing compound, it is preferable to contain a polymerizable group as a substituent for fixating the alignment state of the discotic liquid crystalline compound.

Examples of the fluorine-containing compound represented by formula (III) which can be used in the invention include, but are not limited to, those described in JP-A-2006-113500, [0136]-[0140].

A preferable range of the content of the fluorine-containing compound within the liquid crystalline composition (liquid crystalline composition without a solvent in the case of preparing as a coating solution) varies depending on their use, but it is preferably 0.005 to 8% by weight, more preferably 0.01 to 5% by weight, and even more preferably 0.05 to 3% by weight in the liquid crystalline composition.

[Polymerization Initiator]

The aligned (vertically aligned) liquid crystalline compound is fixed while maintaining the alignment state. Fixation is preferably carried out by polymerizing a polymerizable group (P) which was introduced to the liquid crystalline compound. Polymerization reaction includes thermopolymerization reaction using a thermopolymerization initiator and photopolymerization reaction using a photopolymerization initiator. Photopolymerization reaction is preferred. Examples of the photopolymerization initiator include α-carbonyl compounds (U.S. Pat. Nos. 2,367,661 and 2,367,670), acyloin ethers (U.S. Pat. No. 2,448,828), α-hydrocarbon substituted aromatic acyloin compounds (U.S. Pat. No. 2,722, 512), polynuclear quinone compounds (U.S. Pat. Nos. 3,046, 127 and 2,951,758), combination of triarylimidazole dimer and p-aminophenyl ketone (U.S. Pat. No. 3,549,367), acridine and phenazine compounds (JP-A No. 60-105667 and U.S. Pat. No. 4,239,850) and oxadiazole compounds (U.S. Pat. No. 4,212,970).

The content of the photopolymerization initiator is preferably 0.01 to 20% by weight, and more preferably 0.5 to 5% by weight of a solid matter in a coating solution. For the light irradiation for polymerization of a discotic liquid crystalline compound, UV ray is preferably used. The irradiation energy is preferably 20 mJ/cm$^2$ to 50 mJ/cm$^2$, and more preferably 100 mJ/cm$^2$ to 800 mJ/cm$^2$. In order to promote the polymerization reaction, light irradiation may be carried out under heating condition. The thickness of the retardation layer is preferably 0.1 to 10 micro meters, more preferably 0.5 to 5 micro meters, and most preferably 1 to 5 micro meters.

[Other Additives in Optically Anisotropic Layer]

In addition to the above-mentioned liquid crystalline compound, a plasticizer, a surfactant, polymerizable monomers or the like are used in combination, thereby allowing improvement in the uniformity of coating film, the film strength, alignment characteristics of liquid crystalline compound. For the materials, one having compatibility with a liquid crystalline compound and one not hindering the alignment is preferred.

For the polymerizable monomer, a radical polymerizable or cationic polymerizable compound may be mentioned. Preferably, a multifunctional radical polymerizable monomer which is copolymerizable with the liquid crystalline compound having a polymerizable group is preferred. Examples thereof include one described in the paragraph Nos. [0018] to [0020] of JP-A No. 2002-296423. The content of the compound with respect to the discotic liquid crystalline compound is preferably 1 to 50% by weight, and more preferably 5 to 30% by weight.

For the surfactant, a conventional compound may be mentioned, but particularly a fluorine-containing compound is preferred. Specific examples thereof include the compounds as described in the paragraph Nos. [0028] to [0056] of JP-A No. 2001-330725 and a compound as described in the paragraph Nos. [0069] to of JP-A No. 2003-295212.

A polymer used with a liquid crystalline compound, is preferably one which can increase viscosity of a coating solution. For the polymer, cellulose ester may be mentioned. Preferable examples of cellulose ester include one as described in the paragraph No. [0178] of JP-A No. 2000-155216. To prevent hindering of the alignment of liquid crystalline compound, the content of the polymer with respect to the liquid crystalline compound is preferably in the range of 0.1 to 10% by weight, and more preferably in the range of 0.1 to 8% by weight.

The transition temperature of discotic nematic liquid crystal phase-solid phase of the liquid crystalline compound is preferably 70 to 300 degrees Celsius, and more preferably 70 to 170 degrees Celsius.

[Coating Solvent]

For the solvent used to prepare a coating solution, an organic solvent can be preferably used. Examples of the organic solvent include amides (e.g., N,N-dimethylformamide), sulfoxides (e.g., dimethylsulfoxide), heterocyclic compounds (e.g., pyridine), hydrocarbons (e.g., benzene and hexane), alkyl halides (e.g., chloroform and dichloromethane), esters (e.g., methyl acetate and butyl acetate), ketones (e.g., acetone and methylethyl ketone), ethers (e.g., tetrahydrofuran and 1,2-dimethoxyethane). Alkyl halides and ketones are preferred. Two or more organic solvents may be used in combination.

[Coating Method]

Coating of a coating solution can be performed by a known method (e.g., a wire-bar coating method, an extrusion coating method, a direct gravure coating method, a reverse gravure coating method, a die coating method, etc.). Among the methods, coating is preferably carried out according to the method using a wire-bar; and the number of rotations preferably satisfies the following relation.

$$0.6 < (W \times (R+2r) \times \pi)/V < 1.4$$

[W: the number of rotations of a wire-bar (rpm); R: the diameter (m) of a center core of a bar; r: the diameter (m) of a wire; V: the transportation velocity (m/min) of a support]

The value of $(W \times (R+2r) \times \pi)/V$ is more preferably from 0.7 to 1.3, or more preferably from 0.8 to 1.2.

For preparing the retardation layer, a die coating method is preferably used, or especially, a method using a slide coater or a slot-die coater is even more preferably.

2. First and Second Polarizing Films:

The polarizing films to be used in the invention are not specifically defined. As the polarizing films, usable are any of iodine-based polarizing films, dye-based polarizing films using a dichroic dye, and a polyene-type polarizing films. The iodine-based polarizing film and the dye-based polarizing film are produced generally by using a polyvinyl alcohol film. The absorption axis of the polarizing film corresponds to the film stretching direction. Accordingly, a polarizing film stretched in the machine direction (traveling direction) has an absorption axis parallel to the machine direction, and a polarizing film stretched in the lateral direction (direction perpendicular to the traveling direction) has an absorption axis vertical to the machine direction.

In general, the polarizing film has a protective film. In the invention, the optical compensatory film can function as a protective film for the first polarizing film, and preferably, the first retardation region is so disposed as to face the first polarizing film. Preferably, a protective film is disposed also on the other side of the first polarizing film opposite to the side thereof to which the optical compensatory film is stuck. The protective film to be disposed on the outer side of the polarizing film is not specifically defined, including cellulose acylate films, cyclic olefin polymer films, polyvinyl alcohol films, polypropylene films, polycarbonate films, norbornene films, acrylic films, PET films, etc. Above all, preferred is use of cellulose acylate films.

Also preferably, a protective film is laminated on both surfaces of the second polarizing film. In particular, the protective film to be disposed on the liquid-crystal cell side is required to have a low Re and a low Rth from the viewpoint of improving the viewing angle contrast. Concretely, the absolute value of Re(550), |Re(550)| is equal to or less than 10 nm, and the absolute value of Rth(550), |Rth(550)| is equal to or less than 30 nm. Ideally, |Re(550)| and |Rth(550)| are both 0 nm. From the viewpoint of reducing the color shift in oblique directions, preferably, the wavelength dispersion characteristics of Re of the protective film are on a low level, concretely, |Re(400)−Re(700)| is equal to or less than 10 nm and |Rth(400)−Rth(700)| is equal to or less than 35 nm, and ideally, |Re(400)−Re(700)| and |Rth(400)−Rth(700)| are both 0 nm.

For attaining low Re and low Rth, preferably, the thickness of the film is reduced, but on the other hand, when the film is too thin, the function thereof as a protective film would be insufficient and the durability of the polarizing film may be thereby lowered, and eventually the durability of the liquid-crystal display device may lower. From these viewpoints, the thickness of the protective film for the second polarizing film, which is disposed on the liquid-crystal cell side, is preferably from 10 to 90 μm, more preferably from 20 to 80 μm.

When a thin film is prepared according to the solution-casting method, feeding or handling it may become difficult since the rigidity thereof may be reduced during drying and feeding the film, containing volatile matters in a high concentration, which is obtained by peeling off it from a support such as a metallic support after casting the dope on the support. For avoiding that, the feeding- or handling-property thereof is preferably improved by casting plural dopes including any dope(s) for forming a removal film and temporarily thickening the thickness of the film. The obtained film from which the removal film(s) may be removed prior to any actual use may be used as a thin film.

Examples of the film which has the above-mentioned thickness and can attain the above-mentioned optical characteristics and which is favorably used as the protective film for the second polarizing film include cellulose acylate films, cyclic olefin polymer films, and acrylic polymer films. Of acrylic polymer films, preferred are those containing an acrylic polymer that has at least one unit selected from lactone ring units, maleic anhydride units and glutaric anhydride units, as having high optical anisotropy. The details of the acrylic polymer films are given in JP-A 2008-9378, and can be referred to herein. Regarding their examples, referred to here are the same as those for the cellulose acylate films, the cyclic olefin polymer films and the acrylic polymer films usable as the first transparent film in JP-A 2010-33041.

A preferred production method for the polarizing plate includes a step of continuously laminating two protective films and a polarizing film all in a long film state. The long polarizing plate is cut in accordance with the panel size of the image display device in which the polarizing plate is used. The above-mentioned optical compensatory film is stuck to one surface of the first polarizing film. The polarizing plate produced in that manner is so disposed in a display device that the optical compensatory film could face the liquid-crystal side. Any of the first and second retardation regions constituting the optical compensatory film can be disposed to face the polarizing film side; however, from the viewpoint of the adhesiveness thereof to the polarizing film, preferably, the polymer film is disposed to face the side. In the embodiment where the first retardation region is stuck to the polarizing film, preferably, a polymer film is disposed on the retardation layer formed of a discotic liquid-crystal compound and the polymer film is stuck to the polarizing film. Preferably, the polymer film has a low Re and a low Rth, and examples of the polymer film usable here are the same as those of the polymer film favorable for the protective film (protective film on the liquid-crystal cell side) for the second polarizing film.

3. Liquid-Crystal Cell:

The liquid-crystal display device of the invention has an IPS or FFS-mode liquid-crystal cell. These modes are described in various references, and any configuration therein is employable in the invention. Usable here are configurations of IPS-mode liquid-crystal display devices, for example, those described in JP-A 2003-15160, 2003-75850, 2003-295171, 2004-12730, 2004-12731, 2005-106967, 2005-134914, 2005-241923, 2005-284304, 2006-189758, 2006-194918, 2006-220680, 2007-140353, 2007-178904, 2007-293290, 2007-328350, 2008-3251, 2008-39806, 2008-40291, 2008-65196, 2008-76849, 2008-96815, etc.

The FFS-mode liquid-crystal cell has a counter electrode and a pixel electrode. These electrodes are formed of a transparent substance such as ITO or the like, and are spaced from each other by a distance therebetween narrower than the distance between the upper and lower substrates in such a manner that all the liquid-crystal molecules and others disposed above the electrode can be driven. Having the configuration, the FFS mode can provide an aperture higher than that in the IPS mode, and in the former, in addition, since the electrode part is light-transmissive, the FFS mode can attain a higher transmittance than the IPS mode. For the FFS-mode liquid-crystal cell, for example, referred herein are the descriptions in JP-A 2001-100183, 2002-14374, 2002-182230, 2003-131248, 2003-233083, etc.

EXAMPLES

The invention is described in more detail with reference to the following Examples. In the following Examples, the material used, its amount and ratio, the details of the treatment and the treatment process may be suitably modified or changed not overstepping the sprit and the scope of the invention. Accordingly, the scope of the invention should not be limited to the following Examples.

1. Preparation of Polymer Film:

(1) Preparation of Polymer Film 1:

A commercial triacetyl cellulose film "Fujitac TD80UL" (by FUJIFILM) was prepared and used as a polymer film 1.

(2) Preparation of Polymer Film 2:

A commercial triacetyl cellulose film "Fujitac T40UZ" (by FUJIFILM) was prepared and used as a polymer film 2.

(3) Preparation of Polymer Film 3:

The following ingredients were put into a mixing tank, and stirred with heating to dissolve them, thereby preparing a cellulose acetate solution.

(Composition of Cellulose Acetate Solution)

| | |
|---|---|
| Cellulose acetate having a degree of acetylation of from 60.7 to 61.1% | 100 parts by mass |
| Triphenyl phosphate (plasticizer) | 7.8 parts by mass |
| Biphenyldiphenyl phosphate (plasticizer) | 3.9 parts by mass |
| Methylene chloride (first solvent) | 336 parts by mass |
| Methanol (second solvent) | 29 parts by mass |
| 1-Butanol (third solvent) | 11 parts by mass |

16 parts by mass of the following retardation enhancer (A), 92 parts by mass of methylene chloride and 8 parts by mass of methanol were put into another mixing tank, and stirred with heating to prepare a retardation enhancer solution. 25 parts by mass of the retardation enhancer was mixed in 474 parts by mass of the cellulose acetate solution, and fully stirred to prepare a dope. The amount of the retardation enhancer was 6.0 parts by mass relative to 100 parts by mass of cellulose acetate.

Retardation Enhancer (A):

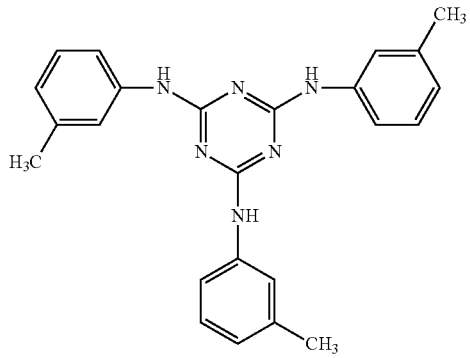

The obtained dope was cast, using a band caster. After the surface temperature on the band reached 40 degrees Celsius, this was dried with hot air at 70 degrees Celsius for 1 minute and then with dry air at 140 degrees Celsius for 10 minutes, thereby forming a cellulose acetate film having a residual solvent amount of 0.3% by mass. The width of the obtained, long cellulose acetate film was 1490 mm and the thickness thereof was 80 μm.

(4) Preparation of Polymer Film 4:

A polymer film 4 was formed in the same manner as that for the polymer film 3, except that the thickness of the film was changed to 60 μm.

(5) Preparation of Polymer Film 5:

(Preparation of Cellulose Acylate Solution for Low-Substitution Layer)

The following ingredients were put into a mixing tank, and stirred to dissolve them, thereby preparing a cellulose acylate solution. The amount of the solvent (methylene chloride and methanol) was suitably controlled so that the solid concentration of the cellulose acylate solution could be 22% by mass.

| | |
|---|---|
| Cellulose acetate (degree of substitution, 2.45) | 100.0 parts by mass |
| Additive A | 19.0 parts by mass |
| Methylene chloride | 365.5 parts by mass |
| Methanol | 54.6 parts by mass |

The additive A is terephthalic acid/succinic acid/propylene glycol/ethylene glycol copolymer (copolymerization ratio [mol %]=27.5/22.5/25/25).

(Preparation of Cellulose Acylate Solution for High-Substitution Layer)

The following ingredients were put into a mixing tank, and stirred to dissolve them, thereby preparing a cellulose acylate solution. The amount of the solvent (methylene chloride and methanol) was suitably controlled so that the solid concentration of the cellulose acylate solution could be 20% by mass.

| | |
|---|---|
| Cellulose acetate (degree of substitution, 2.81) | 100.0 parts by mass |
| Additive A | 11 parts by mass |
| Silica fine particles R972 (by Nippon Aerosil) | 0.15 parts by mass |
| Methylene chloride | 395.0 parts by mass |
| Methanol | 59.0 parts by mass |

(Formation of Cellulose Acylate Film)

The cellulose acylate solution for low-substitution layer was cast to be a core layer having a thickness of 56 μm, and the cellulose acylate solution for high-substitution layer was cast to be a skin layer A having a thickness of 2 µm and a skin layer B having a thickness of 2 µm, thereby forming a film.

The obtained web (film) was peeled from the band, dried and then wound up. In this stage, the residual solvent amount was from 0 to 0.5% relative to the mass of the entire film. Subsequently, the film was fed out, and TD-stretched with a tenter under the stretching condition at a stretching temperature of 172 degrees Celsius and at a draw ratio of 30%.

The residual solvent amount was determined according to the following formula:

Residual solvent amount (% by mass)={$(M-N)/N$}×100

In this, M means the mass of the web at an arbitrary time; N is the mass of the web having M, after dried at 120 degrees Celsius for 2 hours.

(6) Preparation of Polymer Film 6:

A commercial triacetyl cellulose film "Z-TAC" (by FUJIFILM) was prepared and used as a polymer film 6.

(7) Preparation of Polymer Film 7:

(Preparation of Cellulose Acetate Solution)

The following composition was put into a mixing tank and stirred to dissolve the ingredients, thereby preparing a cellulose acetate solution.

Composition of Cellulose Acetate Solution:

| | |
|---|---|
| Cellulose acetate having a degree of acetylation of 2.86 | 100 parts by mass |
| Methylene chloride (first solvent) | 402.0 parts by mass |
| Methanol (second solvent) | 60.0 parts by mass |

(Preparation of Mat Agent Solution)

20 parts by mass of silica particles having a mean particle size of 16 nm (AEROSIL R972, by Nippon Aerosil) and 80 parts by mass of methanol were well stirred and mixed to prepare a silica particles dispersion.

The dispersion was put into a disperser along with the following composition, and further stirred for at least 30 minutes to dissolve the ingredients, thereby preparing a mat agent solution.

Composition of Mat Agent Solution:

| | |
|---|---|
| Silica particles dispersion having a mean particle size of 16 nm | 10.0 parts by mass |
| Methylene chloride (first solvent) | 76.3 parts by mass |
| Methanol (second solvent) | 3.4 parts by mass |
| Cellulose acetate solution | 10.3 parts by mass |

(Preparation of Additive Solution)

The following composition was put into a mixing tank and stirred with heating to dissolve the ingredients, thereby preparing an additive solution. The compound for reducing optical anisotropy (retardation reducer) and the wavelength dispersion characteristics-regulating agent used here are mentioned below.

Composition of Additive Solution:

| | |
|---|---|
| Compound A-19 (retardation reducer) | 49.3 parts by mass |
| UV-102 (wavelength dispersion characteristics-regulating agent) | 7.6 parts by mass |
| Methylene chloride (first solvent) | 58.4 parts by mass |
| Methanol (second solvent) | 8.7 parts by mass |
| Cellulose acetate solution | 12.8 parts by mass |

(Formation of Polymer Film 7)

94.6 parts by mass of the cellulose acetate solution, 1.3 parts by mass of the mat agent solution and 4.1 parts by mass of the additive solution were, after filtered separately, mixed, and cast using a band caster. The total amount of the additive compounds (compound A-19 and UV-102) was 13.6% by mass of cellulose acetate.

Having a residual solvent amount of 30%, the film was peeled away from the band, and dried at 140 degrees Celsius for 40 minutes to give a cellulose acetate film 7. The residual solvent amount of the thus-obtained cellulose acetate film 7 was 0.2%, and the thickness thereof was 40 µm.

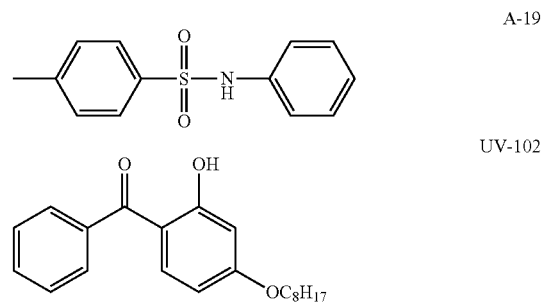

(8) Preparation of Polymer Film 8:

(Preparation of Cellulose Acylate)

A cellulose acylate was prepared in the same manner as that for the polymer film 5.

(Preparation of Cellulose Acylate Solution for Low-Substitution Layer)

The following ingredients were put into a mixing tank, and stirred to dissolve them, thereby preparing a cellulose acylate solution. The amount of the solvent (methylene chloride and methanol) was suitably controlled so that the solid concentration of the cellulose acylate solution could be 25% by mass.

| | |
|---|---|
| Cellulose acetate (degree of substitution, 2.45) | 100.0 parts by mass |
| Additive A | 40.0 parts by mass |
| Methylene chloride | 365.5 parts by mass |
| Methanol | 54.6 parts by mass |

The additive A is terephthalic acid/succinic acid/propylene glycol/ethylene glycol copolymer (copolymerization ratio [mol %]=27.5/22.5/25/25).

(Preparation of Cellulose Acylate Solution for High-Substitution Layer)

The following ingredients were put into a mixing tank, and stirred to dissolve them, thereby preparing a cellulose acylate solution. The amount of the solvent (methylene chloride and methanol) was suitably controlled so that the solid concentration of the cellulose acylate solution could be 20% by mass.

| | |
|---|---|
| Cellulose acetate (degree of substitution, 2.81) | 100.0 parts by mass |
| Additive A | 11 parts by mass |
| Silica fine particles R972 (by Nippon Aerosil) | 0.15 parts by mass |
| Methylene chloride | 395.0 parts by mass |
| Methanol | 59.0 parts by mass |

(Formation of Cellulose Acylate Film)

The cellulose acylate solution for low-substitution layer was cast to be a core layer having a thickness of 36 µm, and the cellulose acylate solution for high-substitution layer was cast to be a skin layer A having a thickness of 2 μm and a skin layer B having a thickness of 2 μm, thereby forming a film.

The obtained web (film) was peeled from the band, dried and then wound up. In this stage, the residual solvent amount was from 0 to 0.5% relative to the mass of the entire film. Subsequently, the film was fed out, and TD-stretched with a tenter under the stretching condition at a stretching temperature of 200 degrees Celsius and at a draw ratio of 2%.

(9) Preparation of Polymer Film 9:

Preparation of Acrylic Polymer Containing Maleic Anhydride Unit:

According to the description of "(b) heat-resistant acrylic resin" in [0050] in JP-A 2007-113109, a resin composed of 10 mol % of maleic anhydride, 16 mol % of styrene and 74 mol % of methyl methacrylate was synthesized. Tg of the resin was 112 degrees Celsius.

The prepared acrylic polymer was dried with a vacuum drier at 90 degrees Celsius to have a water content of equal to or less than 0.03%, and then 0.3% by weight of a stabilizer (Irganox 1010, by Ciba-Geigy) was added thereto, and at 230 degrees Celsius in a nitrogen stream atmosphere, this was extruded into water as strands, using a vented double-screw kneading extruder, and then cut into pellets each having a diameter of 3 mm and a length of 5 mm.

The pellets were dried with a vacuum drier at 90 degrees Celsius to have a water content of equal to or less than 0.03%, and then kneaded and extruded at a temperature under the condition mentioned below, using a single-screw kneading extruder. Subsequently, a 300-mesh screen filter was disposed between the extruder and a gear pump. Subsequently, this was led to pass through the gear pump under the condition mentioned below, then led to pass through a leaf disc filter having a filtration accuracy of 7 μm, then the melt was extruded out through a die, and cast under the condition mentioned below. In the following condition, the "differential pressure before and after gear pump" is computed by subtracting the rear side pressure from the front side pressure; regarding the "shift of the melt landing point from the midpoint between touch roll and cast roll", the positive number means that the melt landed on the touch roll side and the negative number means that the melt landed on the cast roll side.

After the above, the melt (molten resin) was extruded on three consecutive cast rolls. In this stage, a touch roll was kept in contact with the most upstream side cast roll (chill roll) under the facial pressure under the condition mentioned below. As the touch roll, used here was one described in Example 1 in JP-A 11-235747 (shown therein as a double holddown roll; however, the thickness of the thin metal jacket was changed to 2 mm herein), and at Tg−5 degrees Celsius, this was used under the touch pressure as in the following condition. The temperature of the three consecutive cast rolls including the chill roll was so controlled that the cast roll (first roll) on the most upstream side to be kept in contact with the touch roll could have a temperature difference (cast roll temperature−touch roll temperature) as described in the following condition. Further, the temperature of the next cast roll (second roll) was controlled to be first roll−5 degrees Celsius, and the next roll after that next roll (third roll) was at first roll−10 degrees Celsius.

Subsequently, just before wound up, both sides of the film (each 5 cm of the overall width) were trimmed off, and knurled to a width of 10 mm and at a height of 20 μm. The filming width was 1.5 m, and the filming speed was 30 m/min, and under the condition, the film was wound up to a length of 3000 m. Thus formed, the thickness of the unstretched film was 60 μm.

The touch roll was kept in contact with the most upstream side cast roll under the condition mentioned below. The screw temperature difference, the discharge rate, the differential pressure before and after gear pump, the temperature difference between the surface and the back of the melt on the cast roll, the temperature difference between the cast roll and the touch roll, the shift of the melt landing point from the midpoint between the touch roll and the cast roll, the touch pressure of the touch roll, the film width fluctuation, the average of film width are shown below.

(Condition)

Screw temperature different (outlet port-inlet port): 30 degrees Celsius

Discharge rage: 200 kg/hr

Differential pressure before and after gear pump (before-after): −3 MPa

Cast roll temperature-touch roll temperature: −5 degrees Celsius

Shift of the melt landing point from the midpoint between the touch roll and the cast roll: −3 mm Touch pressure of the touch roll: 0.1 MPa Film width fluctuation: 6%

Average of film width: 25 m

(10) Preparation of Polymer Film 10:

Pellets of TOPAS #6013 by Polyplastics (Tg=136 degrees Celsius) were used. The pellets were dried at 110 degrees Celsius for 2 hours or more, and extruded out through a single-screw kneading extruder. A screen filter, a gear pump and a leaf disc filter were disposed in that order between the extruder and the die and these were connected to each other via a melt pipeline. The melt was extruded out at an extrusion temperature (melt temperature) of 260 degrees Celsius through a die having a width of 1900 mm and a lip gap of 1 mm.

Subsequently, the melt was extruded onto the center part between a chill roll and a touch roll. As the chill roll, used was an HCr-plated metal roll having a width of 2000 mm and a diameter of 400 mm; and as the touch roll, used was one having a width of 1700 mm and a diameter of 350 mm, as described in Example 1 in JP-A 11-235747 (the roll is described in the publication as a double-pressure roll, however, the thin-walled metal jacket thickness of the roll was changed to 2 mm here).

These rolls were used. The temperature of both the touch roll and the chill roll was Tg−5 degrees Celsius. The atmosphere in film formation was at 25 degrees Celsius and 60%.

After this, just before wound up, the film was trimmed on both edges thereof (each 5 cm of the overall width), and then knurled also on both edges thereof at a width of 10 mm and a height of 20 μm each. The width of the film was 1540 mm, and the film was wound up to a length of 450 m.

The characteristics of the polymer films 1 to 10 are shown in the following Tables.

TABLE 1

| Film No. | Re (nm) | Rth (nm) | Thickness (μm) |
|---|---|---|---|
| 1 | 1 | 45 | 80 |
| 2 | 1 | 35 | 40 |
| 3 | 6 | 92 | 80 |
| 4 | 5 | 65 | 60 |
| 5 | 46 | 122 | 60 |

TABLE 2

| Film No. | Re(550) [nm] | Rth(550) [nm] | \|Re(400)-Re(700)\| [nm] | \|Rth(400)-Re(700)\| [nm] | Thickness [μm] |
|---|---|---|---|---|---|
| 6 | 2 | −6 | 4 | 30 | 60 |
| 7 | 0.3 | 3.2 | 1.2 | 7.5 | 40 |
| 8 | 0.7 | −3 | 1.5 | 8.7 | 40 |
| 9 | 2 | −2 | 0.1 | 1.1 | 40 |
| 10 | 2 | 4 | 0.5 | 1.0 | 40 |

2. Production of Optical Compensatory Film:
(1) Preparation of Support:
The polymer films 1 to 6 were used as supports.
(Alkali Saponification)
The polymer film was led to run on a dielectric heating roll at a temperature of 60 degrees Celsius so that the film surface temperature was elevated up to 40 degrees Celsius, and then an alkali solution having the composition shown below was applied on one surface of the film, using a bar coater. The coating amount was 14 ml/m². With that, the film was led to run below a steam-type far-infrared heater (by Noritake Company) heated at 110 degrees Celsius, taking 10 seconds. Subsequently, also using a bar coater, pure water was applied thereonto in an amount of 3 ml/m². Next, this was washed with water, using a fountain coater, and then processed for water removal with an air knife. The operation was repeated three times. Next, this was led to pass through a drying zone at 70 degrees Celsius and dried therein, taking 10 seconds. Thus, an alkali-saponified cellulose acylate film was produced.

| Composition of Alkali Solution: | |
|---|---|
| Potassium hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene glycol | 14.8 parts by mass |

(Formation of Alignment Layer)
Using a wire bar #14, a coating liquid for alignment layer having the composition mentioned below was applied onto the long cellulose acetate film that had been saponified in the manner as above. This was dried with hot air at 60 degrees Celsius for 60 seconds and then with hot air at 100 degrees Celsius for 120 seconds.

| Composition of Coating Liquid for Alignment Layer: | |
|---|---|
| Modified polyvinyl alcohol mentioned below | 10 parts by mass |
| Water | 371 parts by mass |
| Methanol | 119 parts by mass |
| Glutaraldehyde | 0.5 parts by mass |
| Photopolymerization initiator (Irgacure 2959, by Ciba Japan) | 0.3 parts by mass |

Modified Polyvinyl Alcohol:

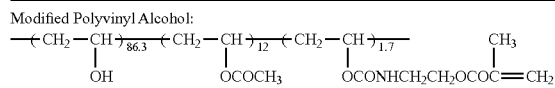

(Formation of Optically Anisotropic Layer Containing Discotic Liquid-Crystal Compound)
The alignment layer formed in the above was continuously rubbed. In this, the machine direction of the long film was parallel to the traveling direction thereof, and the rotation axis of the rubbing roller was orthogonal to the machine direction of the film.

A coating liquid A containing a discotic liquid-crystal compound and having the composition mentioned below was continuously applied onto the alignment layer, using a wire war #2.7. The film traveling speed (V) was 36 m/min. For removing the solvent from the coating liquid by drying and for ripening the alignment of the discotic liquid-crystal compound, the film was heated with hot air at 120 degrees Celsius for 90 seconds. Subsequently, this was UV-irradiated at 80 degrees Celsius so as to fix the alignment of the liquid-crystal compound, thereby forming an optically anisotropic layer 1. Thus, an optical compensatory film was formed.

| Composition of Coating Liquid for Optically anisotropic Layer 1: | |
|---|---|
| Discotic liquid-crystal compound mentioned below | 100 parts by mass |
| Photopolymerization initiator (Irgacure 907, by Ciba Japan) | 3 parts by mass |
| Sensitizer (Kayacure DETX, by Nippon Kayaku) | 1 part by mass |
| Pyridinium salt mentioned below | 1 part by mass |
| Fluoropolymer mentioned below (FP1) | 0.4 parts by mass |
| Methyl ethyl ketone | 252 parts by mass |

Discotic Liquid-Crystal Compound:

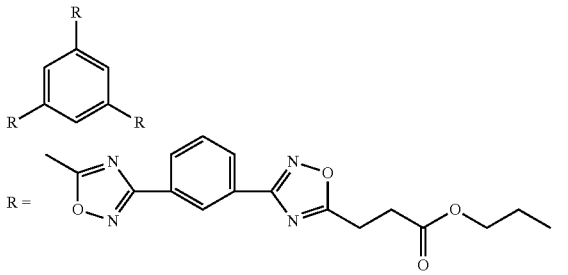

Pyridinium Salt:

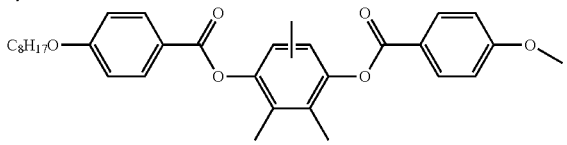

Fluoropolymer (FP1):

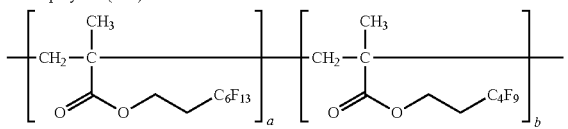

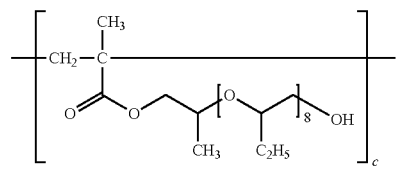

a/b/c = 20/20/60 wt %
Mw = 16,000

The direction of the slow axis was orthogonal to the rotation axis of the rubbing roller. Specifically, the slow axis was in the direction parallel to the long direction of the support. Separately, a glass substrate was used in place of the cellulose acetate film support, and a layer containing a discotic liquid-crystal compound was formed thereon. Re(0°), Re(40°) and Re(−40°) of the layer were measured, using KOBRA 21 ADH, and were 140.3 nm, 126.9 nm and 126.7 nm, respectively. (Re(°) means the incident angle to the normal direction, 0° of the sample face.) These results confirm that the mean tilt angle to the film face of the discotic face of the discotic liquid-crystal molecules is 90°, or that is, the discotic liquid-crystal molecules are aligned vertically to the film face. Regarding the wavelength dispersion characteristics of the retardation layer formed, Re(450)/Re(550) of the layer was 1.10 and Re(650)/Re(550) thereof was 0.96.

(Formation of Optically Anisotropic Layer 2 Containing Discotic Liquid-Crystal Compound)

An alignment layer similar to the optically anisotropic layer 1 was formed on a polymer film.

A coating liquid containing a discotic liquid-crystal compound and having the composition mentioned below was continuously applied onto the alignment layer, using a wire war #4.0. The film traveling speed (V) was 20 m/min. For removing the solvent from the coating liquid by drying and for ripening the alignment of the discotic liquid-crystal compound, the film was heated with hot air at 100 degrees Celsius for 30 seconds and then with hot air at 130 degrees Celsius for 90 seconds. Subsequently, this was UV-irradiated so as to fix the alignment of the liquid-crystal compound, thereby forming an optically anisotropic layer 2. Thus, an optical compensatory film was formed.

| Composition of Coating Liquid for Optically anisotropic Layer 2: | |
|---|---|
| Discotic liquid-crystal compound mentioned below | 91 parts by mass |
| Ethylene oxide-modified trimethylolpropane triacrylate (V#360, by Osaka Organic Chemical) | 9 parts by mass |
| Photopolymerization initiator (Irgacure 907, by Ciba-Geigy) | 3 parts by mass |
| Sensitizer (Kayacure DETX, by Nippon Kayaku) | 1 part by mass |
| Pyridinium salt mentioned below | 0.5 parts by mass |
| Fluoropolymer mentioned above (FP2) | 0.4 parts by mass |
| Methyl ethyl ketone | 195 parts by mass |

Discotic Liquid-Crystal Compound:

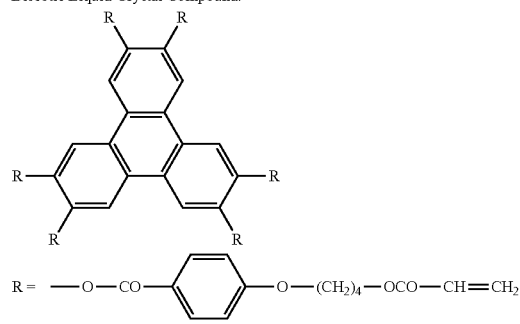

Pyridinium Salt:

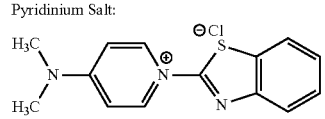

The direction of the slow axis was orthogonal to the rotation axis of the rubbing roller. Specifically, the slow axis was in the direction parallel to the machine direction of the support. Like in Example 1, Re(0°, Re(40° and Re(−40° were measured, using KOBRA 21 ADH, and were 139.7 nm, 125.3 nm and 125.4 nm, respectively. These results confirm that the mean tilt angle to the film face of the discotic face of the discotic liquid-crystal molecules is 90°, or that is, the discotic liquid-crystal molecules are aligned vertically to the film face. Regarding the wavelength dispersion characteristics of the retardation layer formed, Re(450)/Re(550) of the layer was 1.16 and Re(650)/Re(550) thereof was 0.93.

In the manner as above, any of the polymer films 1 to 10 was combined with the optically anisotropic layers 1 and 2 to construct an optical compensatory film. The optically anisotropic layers 1 and 2 were so controlled as to have desired Re and Rth by changing the coating amount of the discotic liquid-crystal compound-containing coating liquid. In some optical compensatory films used in Examples mentioned below, any of the polymer films was laminated on the surface of the retardation layer formed according to the above-mentioned method.

3. Production of Polarizing Plate:

The surface of a support, TD80UL (by FUJIFILM) was alkali-saponified. Briefly, the film was immersed in an aqueous 1.5 N sodium hydroxide solution at 55 degrees Celsius for 2 minutes, then washed with water in a washing bath at room temperature, and neutralized with 0.1 N sulfuric acid at 30 degrees Celsius. Again this was washed with water in a washing bath at room temperature, and dried with hot air at 100 degrees Celsius. Subsequently, a roll of a polyvinyl alcohol film having a thickness of 80 µm was unrolled and continuously stretched by 5 times in an aqueous iodine solution, and dried to give a polarizing film having a thickness of 20 µm.

Any of the optical compensatory films prepared in the above or any of the polymer films was stuck to the other surface to sandwich the polarizing film between the films, thereby preparing a polarizing plate in which TD80UL or the optical compensatory film or the polymer film served as the protective film for the polarizing film. For sticking them, used was an aqueous polyvinyl alcohol adhesive solution. In sticking the cellulose acylate film, the surface was saponified with an alkali solution and then the film was stuck thereto. In sticking them, the films were so disposed and laminated that the slow axis of the optical compensatory film or the polymer film could be parallel or orthogonal to the absorption axis of the polarizing film. TD80UL alone was stuck to the surface of the polarizing film but nothing was stuck to the other surface thereof, thereby preparing a polarizing plate in the same manner.

4. Production and Evaluation of Liquid-Crystal Display Device:

(1) Production of IPS-Mode Liquid-Crystal Display Device:

The polarizing plate was peeled from a liquid-crystal TV by Toshiba (37Z3500) on both surfaces thereof, and the IPS-mode liquid-crystal cell thus taken out was used here. Δn·d=311 nm, and the pretilt was 2.0 degrees.

IPS-mode liquid-crystal display devices having the same configuration as in FIG. 1 or FIG. 2 were produced as Examples and Comparative Examples. Concretely, as the polarizing plates POL1 and POL2 in FIG. 1, any of the polarizing plates prepared in the above were disposed. The characteristics of the members used in Examples and Comparative Examples are collectively shown in the following Tables.

(2) Production of FFS-Mode Liquid-Crystal Display Device:

The polarizing plate was peeled from a liquid-crystal TV by Toshiba (37H3000) on both surfaces thereof, and the FFS-mode liquid-crystal cell thus taken out was used here. Δn·d=360 nm, and the pretilt was 2.5 degrees.

In the same manner as above except that the FFS-mode liquid-crystal cell was used in place of the IPS-mode liquid-crystal cell, FFS-mode liquid-crystal display devices having the same configuration as in FIG. 1 or FIG. 2 were produced as Examples and Comparative Examples.

(3) Evaluation of Liquid-Crystal Display Device:

Evaluation of Color Shift:

Each of the produced liquid-crystal display devices was switched on in a black state, and the brightness was measured in the direction of the polar angle 60° from the normal direction to the display plane, using a color brightness meter (Topcon's BM-5), and the color shift change ΔE was computed. The color shift change ΔE is a color difference in a Luv color system, which is defined as the mean value of the color difference data computed in changing the angle direction from 0 to 360° at intervals of 15° at a polar angle of 60° from the normal direction. For practical use, the device is requested to have ΔE of not more than 0.3.

Evaluation of Viewing Angle Contrast:

Each of the produced liquid-crystal display devices was switched on in a black or white state, and the brightness ratios (contrast) at the white state and at the black state were measured respectively in the direction of the polar angle 60° from the normal direction to the display plane, using a color brightness meter (Topcon's BM-5). The mean value of the color difference data was computed in changing the angle direction from 0 to 360° at intervals of 15° at a polar angle of 60°, from which the viewing angle contrast was computed. The results are shown in the following Tables.

TABLE 3

| | | Constituent Members | Characteristics | Examples 1 | 2 | 3 | 4 | 5 | 6 | 7 | 8 | 9 | 10 |
|---|---|---|---|---|---|---|---|---|---|---|---|---|---|
| Configuration | Viewers' Side | First/Second Polarizing Film | Direction of Absorption Axis*1 | ⇔ | ⇔ | ⇔ | ⇔ | ⇔ | ⇔ | ⇔ | ⇔ | ⇔ | ⇔ |
| | | First Retardation Region (DLC retardation layer) *4 | Slow Axis*1 | ⇔ | ⇔ | ⇔ | ⇔ | ⇔ | ⇔ | ⇔ | ⇔ | ⇔ | ⇔ |
| | | | Re (nm) | 140 | 140 | 140 | 140 | 100 | 170 | 140 | 140 | 140 | 140 |
| | | | Re450/550*2 | 1.10 | 1.10 | 1.10 | 1.10 | 1.10 | 1.10 | 1.10 | 1.10 | 1.10 | 1.10 |
| | | | Re650/550*2 | 0.96 | 0.96 | 0.96 | 0.96 | 0.96 | 0.96 | 0.96 | 0.96 | 0.96 | 0.96 |
| | | | Rth (nm) | −70 | −70 | −70 | −70 | −50 | −85 | −70 | −70 | −70 | −70 |
| | | Second Retardation Region/Protective Film | Slow Axis*1 | ⇔ | ⇔ | ⇔ | ⇔ | ⇔ | ⇔ | ⇔ | ⇔ | ⇔ | ⇔ |
| | | | Film No. | 1 | 2 | 3 | 4 | 4 | 4 | 4 | 4 | 4 | 4 |
| | | | Re (nm) | 1 | 1 | 6 | 5 | 5 | 5 | 5 | 5 | 5 | 5 |
| | | | Rth (nm) | 45 | 35 | 92 | 65 | 65 | 65 | 65 | 65 | 65 | 65 |
| | | Total Rth | |Rth|*3(nm) | 25 | 35 | 22 | 5 | 15 | 20 | 5 | 5 | 5 | 5 |
| | Liquid-Crystal Cell | Mode | | IPS | IPS | IPS | IPS | IPS | IPS | IPS | IPS | IPS | IPS |
| | BL Side | Total Rth | |Rth|*3(nm) | — | — | — | — | — | — | — | — | — | — |
| | | Second Retardation Region/Protective Film | Slow Axis*1 | — | — | — | — | — | — | — | — | — | — |
| | | | Film No. | 6 | 6 | 6 | 6 | 6 | 6 | 8 | 9 | 10 | — |
| | | | Re(nm) | 2 | 2 | 2 | 2 | 2 | 2 | 1 | 2 | 2 | — |
| | | | Rth(nm) | −6 | −6 | −6 | −6 | −6 | −6 | −3 | −2 | 4 | — |
| | | First Retardation Region (DLC retardation layer) *4 | Slow Axis*1 | — | — | — | — | — | — | — | — | — | — |
| | | | Re(nm) | — | — | — | — | — | — | — | — | — | — |
| | | | Re450/550*2 | — | — | — | — | — | — | — | — | — | — |
| | | | Re650/550*2 | — | — | — | — | — | — | — | — | — | — |
| | | | Rth(nm) | — | — | — | — | — | — | — | — | — | — |
| | | Second/First Polarizing Film | Direction of Absorption Axis*1 | ◉ | ◉ | ◉ | ◉ | ◉ | ◉ | ◉ | ◉ | ◉ | ◉ |
| Evaluation | | Color Shift | ΔE | 0.144 | 0.242 | 0.240 | 0.095 | 0.158 | 0.222 | 0.102 | 0.132 | 0.159 | 0.136 |
| | | Viewing Angle CR | Mean Value at polar angle 60° | 133.5 | 108.5 | 144.2 | 170.7 | 146.0 | 126.8 | 163.0 | 156.6 | 140.0 | 154.1 |

In the Table, Examples 1 to 10 each are the configuration of FIG. 1.

*1: "⇔" means that the axis is parallel to the horizontal direction of the panel; "◉" means that the axis is parallel to the vertical direction of the panel; and "⇔" and "◉" are orthogonal to each other.
*2: Re450/550 means Re(450)/Re(550); and Re650/550 means Re(650)/Re(550).
*3: |Rth| means the absolute value of Rth of the optical compensatory film including both the first retardation region and the second retardation region.
*4: DLC retardation layer means the retardation layer containing a discotic liquid-crystal compound.

TABLE 4

| | | Constituent Members | Characteristics | Examples 11 | 12*5 | 13*5 | 14*5 | 15 | 16 |
|---|---|---|---|---|---|---|---|---|---|
| Configuration | Viewers' Side | First/Second Polarizing Film | Direction of Absorption Axis*1 | ⇔ | ⇔ | ⇔ | ⇔ | ◉ | ◉ |
| | | First Retardation Region (DLC retardation layer) *4 | Film No. | — | 7 | 9 | 10 | — | — |
| | | | Slow Axis*1 | ⇔ | ◉ | ⇔ | ⇔ | — | — |
| | | | Re (nm) | 140 | 140 | 140 | 140 | — | — |
| | | | Re450/550*2 | 1.10 | 1.10 | 1.10 | 1.10 | — | — |
| | | | Re650/550*2 | 0.96 | 0.96 | 0.96 | 0.96 | — | — |

TABLE 4-continued

| | Constituent Members | Character-istics | Examples 11 | 12*5 | 13*5 | 14*5 | 15 | 16 |
|---|---|---|---|---|---|---|---|---|
| | Second Retardation Region/Protective Film | Rth (nm) | −70 | −70 | −70 | −70 | — | — |
| | | Slow Axis*1 | ⇔ | ⇔ | ⇔ | ⇔ | — | — |
| | | Film No. | 4 | 4 | 4 | 4 | 6 | 6 |
| | | Re (nm) | 5 | 5 | 5 | 5 | 2 | 2 |
| | | Rth (nm) | 65 | 65 | 65 | 65 | −6 | −6 |
| | Total Rth | \|Rth\|*3(nm) | 5 | 5 | 5 | 5 | — | — |
| Liquid-Crystal Cell | Mode | | IPS | IPS | IPS | IPS | IPS | IPS |
| BL Side | Total Rth | \|Rth\|*3(nm) | — | — | — | — | 5 | 5 |
| | Second Retardation Region/Protective Film | Slow Axis*1 | — | — | — | — | ⇔ | ⇔ |
| | | Film No. | 7 | 7 | 7 | 7 | 4 | 4 |
| | | Re(550) | 0 | 0 | 0 | 0 | 5 | 5 |
| | | Rth(550) | 3 | 3 | 3 | 3 | 65 | 65 |
| | First Retardation Region (DLC retardation layer) *4 | Slow Axis*1 | — | — | — | — | ⇔ | ⇔ |
| | | Re(nm) | — | — | — | — | 140 | 140 |
| | | Re450/550*2 | — | — | — | — | 1.10 | 1.10 |
| | | Re650/550*2 | — | — | — | — | 0.96 | 0.96 |
| | | Rth(nm) | — | — | — | — | −70 | −70 |
| | Second/First Polarizing Film | Direction of Absorption Axis*1 | ◉ | ◉ | ◉ | ◉ | ⇔ | ⇔ |
| Evaluation | Color Shift | ΔE | 0.112 | 0.138 | 0.115 | 0.099 | 0.100 | 0.110 |
| | Viewing Angle CR | Mean Value at polar angle 60° | 162.4 | 156.1 | 161.2 | 167.8 | 175.9 | 173.3 |

In the Table, Examples 11 to 14 each are the configuration of FIG. 1; and Examples 15 and 16 each are the configuration of FIG. 3.

*1: "⇔" means that the axis is parallel to the horizontal direction of the panel; "◉" means that the axis is parallel to the vertical direction of the panel; and "⇔" and "◉" are orthogonal to each other.
*2: Re450/550 means Re(450)/Re(550); and Re650/550 means Re(650)/Re(550).
*3: |Rth| means the absolute value of Rth of the optical compensatory film including both the first retardation region and the second retardation region.
*4: DLC retardation layer means the retardation layer containing a discotic liquid-crystal compound.
*5: In Examples 12 to 14, the polymer film 7, 9 or 10 was laminated on the retardation layer formed according to the above-mentioned method, and the polymer film was stuck to the polarizing element.

TABLE 5

| | | Constituent Members | Character-istics | Comparative Examples 1 | 2 | 3 | 4 |
|---|---|---|---|---|---|---|---|
| Con-fig-ura-tion | View-ers' Side | First/Second Polarizing Film | Direction of Absorption Axis*1 | ⇔ | ⇔ | ⇔ | ⇔ |
| | | First Retardation Region (DLC retardation layer) *4 | Slow Axis*1 | ⇔ | ⇔ | ⇔ | ⇔ |
| | | | Re (nm) | 140 | 140 | 140 | 140 |
| | | | Re450/550*2 | 1.16 | 1.16 | 1.10 | 1.10 |
| | | | Re650/550*2 | 0.93 | 0.93 | 0.96 | 0.96 |
| | | | Rth (nm) | −70 | −70 | −70 | −70 |
| | | Second Retardation Region/Protective Film | Slow Axis*1 | ⇔ | ⇔ | — | ⇔ |
| | | | Film No. | 1 | 3 | 6 | 5 |
| | | | Re (nm) | 1 | 6 | 2 | 46 |
| | | | Rth (nm) | 45 | 92 | −6 | 122 |
| | Total Rth | | \|Rth\|*3(nm) | 25 | 22 | 76 | 52 |
| | Liquid-Crystal Cell | Mode | | IPS | IPS | IPS | IPS |
| | BL Side | Total Rth | \|Rth\|*3(nm) | — | — | — | — |
| | | Second Retardation Region/Protective Film | Slow Axis*1 | — | — | — | — |
| | | | Film No. | 6 | 6 | 6 | 6 |
| | | | Re(nm) | 2 | 2 | 2 | 2 |
| | | | Rth(nm) | −6 | −6 | −6 | −6 |
| | | First Retardation Region (DLC retardation layer) *4 | Slow Axis*1 | — | — | — | — |
| | | | Re(nm) | — | — | — | — |
| | | | Re450/550*2 | — | — | — | — |
| | | | Re650/550*2 | — | — | — | — |
| | | | Rth(nm) | — | — | — | — |
| | | Second/First Polarizing Film | Direction of Absorption Axis*1 | ◉ | ◉ | ◉ | ◉ |

TABLE 5-continued

|  | Constituent Members | Characteristics | Comparative Examples 1 | 2 | 3 | 4 |
|---|---|---|---|---|---|---|
| Evaluation | Color Shift | ΔE | 0.351 | 0.430 | 0.639 | 0.893 |
|  | Viewing Angle CR | Mean Value at polar angle 60° | 131.7 | 141.6 | 80.2 | 78.6 |

In the Table, Comparative Examples 1 to 4 each are the configuration of FIG. 1.

*1: "⇔" means that the axis is parallel to the horizontal direction of the panel; "⊙" means that the axis is parallel to the vertical direction of the panel; and "⇔" and "⊙" are orthogonal to each other.
*2: Re450/550 means Re(450)/Re(550); and Re650/550 means Re(650)/Re(550).
*3: |Rth| means the absolute value of Rth of the optical compensatory film including both the first retardation region and the second retardation region.
*4: DLC retardation layer means the retardation layer containing a discotic liquid-crystal compound.

TABLE 6

|  |  | Constituent Members | Characteristics | Examples 17 | 18 | 19 | 20 | 21 | 22 | 23 | 24 | 25 | 26 |
|---|---|---|---|---|---|---|---|---|---|---|---|---|---|
| Configuration | Viewers' Side | First/Second Polarizing Film | Direction of Absorption Axis*1 | ⇔ | ⇔ | ⇔ | ⇔ | ⇔ | ⇔ | ⇔ | ⇔ | ⇔ | ⇔ |
|  |  | First Retardation Region (DLC retardation layer) *4 | Slow Axis*1 | — | — | — | — | — | — | — | — | — | — |
|  |  |  | Re (nm) | — | — | — | — | — | — | — | — | — | — |
|  |  |  | Re450/550*2 | — | — | — | — | — | — | — | — | — | — |
|  |  |  | Re650/550*2 | — | — | — | — | — | — | — | — | — | — |
|  |  |  | Rth (nm) | — | — | — | — | — | — | — | — | — | — |
|  |  | Second Retardation Region/Protective Film | Slow Axis*1 | — | — | — | — | — | — | — | — | — | — |
|  |  |  | Film No. | 6 | 6 | 6 | 6 | 6 | 6 | 8 | 9 | 10 | — |
|  |  |  | Re (nm) | 2 | 2 | 2 | 2 | 2 | 2 | 1 | 2 | 2 | — |
|  |  |  | Rth (nm) | −6 | −6 | −6 | −6 | −6 | −6 | −3 | −2 | 4 | — |
|  |  | Total Rth | |Rth|*3(nm) | — | — | — | — | — | — | — | — | — | — |
|  | Liquid-Crystal Cell | Mode | Mode | FFS | FFS | FFS | FFS | FFS | FFS | FFS | FFS | FFS | FFS |
|  | BL Side | Total Rth | |Rth|*3(nm) | 25 | 35 | 22 | 5 | 15 | 20 | 5 | 5 | 5 | 5 |
|  |  | Second Retardation Region/Protective Film | Slow Axis*1 | ⊙ | ⊙ | ⊙ | ⊙ | ⊙ | ⊙ | ⊙ | ⊙ | ⊙ | ⊙ |
|  |  |  | Film No. | 1 | 2 | 3 | 4 | 4 | 4 | 4 | 4 | 4 | 4 |
|  |  |  | Re(nm) | 1 | 1 | 6 | 5 | 5 | 5 | 5 | 5 | 5 | 5 |
|  |  |  | Rth(nm) | 45 | 35 | 92 | 65 | 65 | 65 | 65 | 65 | 65 | 65 |
|  |  | First Retardation Region (DLC retardation layer) *4 | Slow Axis*1 | ⊙ | ⊙ | ⊙ | ⊙ | ⊙ | ⊙ | ⊙ | ⊙ | ⊙ | ⊙ |
|  |  |  | Re(nm) | 140 | 140 | 140 | 140 | 100 | 170 | 140 | 140 | 140 | 140 |
|  |  |  | Re450/550*2 | 1.10 | 1.10 | 1.10 | 1.10 | 1.10 | 1.10 | 1.10 | 1.10 | 1.10 | 1.10 |
|  |  |  | Re650/550*2 | 0.96 | 0.96 | 0.96 | 0.96 | 0.96 | 0.96 | 0.96 | 0.96 | 0.96 | 0.96 |
|  |  |  | Rth(nm) | −70 | −70 | −70 | −70 | −50 | −85 | −70 | −70 | −70 | −70 |
|  |  | Second/First Polarizing Film | Direction of Absorption Axis*1 | ⊙ | ⊙ | ⊙ | ⊙ | ⊙ | ⊙ | ⊙ | ⊙ | ⊙ | ⊙ |
| Evaluation | Color Shift |  | ΔE | 0.146 | 0.224 | 0.171 | 0.092 | 0.239 | 0.165 | 0.096 | 0.105 | 0.122 | 0.107 |
|  | Viewing Angle CR |  | Mean Value at polar angle 60° | 129.0 | 109.3 | 159.8 | 170.2 | 150.3 | 136.3 | 164.2 | 160.0 | 145.9 | 157.7 |

In the Table, Examples 17 to 26 each are the configuration of FIG. 3.

*1: "⇔" means that the axis is parallel to the horizontal direction of the panel; "⊙" means that the axis is parallel to the vertical direction of the panel; and "⇔" and "⊙" are orthogonal to each other.
*2: Re450/550 means Re(450)/Re(550); and Re650/550 means Re(650)/Re(550).
*3: |Rth| means the absolute value of Rth of the optical compensatory film including both the first retardation region and the second retardation region.
*4: DLC retardation layer means the retardation layer containing a discotic liquid-crystal compound.

TABLE 7

|  |  | Constituent Members | Characteristics | Examples 27 | 28*5 | 29*5 | 30*5 | 31 | 32*5 |
|---|---|---|---|---|---|---|---|---|---|
| Configuration | Viewers' Side | First/Second Polarizing Film | Direction of Absorption Axis*1 | ⇔ | ⇔ | ⇔ | ⇔ | ⊙ | ⊙ |
|  |  | First Retardation | Film No. | — | — | — | — |  | 7 |

TABLE 7-continued

| | | Constituent Members | Character-istics | Examples 27 | 28*5 | 29*5 | 30*5 | 31 | 32*5 |
|---|---|---|---|---|---|---|---|---|---|
| | | First Retardation Region (DLC retardation layer) *4 | Slow Axis*1 | — | — | — | — | ◉ | ◉ |
| | | | Re (nm) | — | — | — | — | 140 | 140 |
| | | | Re450/550*2 | — | — | — | — | 1.10 | 1.10 |
| | | | Re650/550*2 | — | — | — | — | 0.96 | 0.96 |
| | | | Rth (nm) | — | — | — | — | −70 | −70 |
| | | Second Retardation Region/Protective Film | Slow Axis*1 | — | — | — | — | ◉ | ◉ |
| | | | Film No. | 7 | 7 | 7 | 7 | 4 | 4 |
| | | | Re (nm) | 0 | 0 | 0 | 0 | 5 | 5 |
| | | | Rth (nm) | 3 | 3 | 3 | 3 | 65 | 65 |
| | | Total Rth | |Rth|*3(nm) | — | — | — | — | 5 | 6 |
| | Liquid-Crystal Cell | Mode | | FFS | FFS | FFS | FFS | FFS | FFS |
| | BL Side | Total Rth | |Rth|*3(nm) | 5 | 5 | 5 | 5 | — | — |
| | | Second Retardation Region/Protective Film | Slow Axis*1 | ◉ | ◉ | ◉ | ◉ | — | — |
| | | | Film No. | 4 | 4 | 4 | 4 | 6 | 6 |
| | | | Re(nm) | 5 | 5 | 5 | 5 | 2 | 2 |
| | | | Rth(nm) | 65 | 65 | 65 | 65 | −6 | −6 |
| | | First Retardation Region (DLC retardation layer) *4 | Slow Axis*1 | ◉ | ◉ | ◉ | ◉ | — | — |
| | | | Re(nm) | 140 | 140 | 140 | 140 | — | — |
| | | | Re450/550*2 | 1.10 | 1.10 | 1.10 | 1.10 | — | — |
| | | | Re650/550*2 | 0.96 | 0.96 | 0.96 | 0.96 | — | — |
| | | | Rth(nm) | −70 | −70 | −70 | −70 | — | — |
| | | | Film No. | — | 7 | 9 | 10 | — | — |
| | Second/First Polarizing Film | Direction of Absorption Axis*1 | | ◉ | ◉ | ◉ | ◉ | ⇔ | ⇔ |
| Evaluation | Color Shift | | ΔE | 0.097 | 0.114 | 0.097 | 0.100 | 0.070 | 0.092 |
| | Viewing Angle CR | | Mean Value at polar angle 60° | 164.2 | 158.4 | 162.8 | 172.1 | 176.4 | 169.5 |

In the Table, Examples 27 to 30 each are the configuration of FIG. 3; and Examples 31 and 32 each are the configuration of FIG. 1.

*1: "⇔" means that the axis is parallel to the horizontal direction of the panel; "◉" means that the axis is parallel to the vertical direction of the panel; and "⇔" and "◉" are orthogonal to each other.
*2: Re450/550 means Re(450)/Re(550); and Re650/550 means Re(650)/Re(550).
*3: |Rth| means the absolute value of Rth of the optical compensatory film including both the first retardation region and the second retardation region.
*4: DLC retardation layer means the retardation layer containing a discotic liquid-crystal compound.
*5: In Examples 28 to 30 and 32, the polymer film 7, 9, 10 or 6 was laminated on the retardation layer formed according to the above-mentioned method, and the polymer film was stuck to the polarizing element.

TABLE 8

| | | Constituent Members | Character-istics | Comparative Examples 5 | 6 | 7 | 8 |
|---|---|---|---|---|---|---|---|
| Con-fig-ura-tion | View-ers' Side | First/Second Polarizing Film | Direction of Absorption Axis*1 | ⇔ | ⇔ | ⇔ | ⇔ |
| | | First Retardation Region (DLC retardation layer) *4 | Slow Axis*1 | — | — | — | — |
| | | | Re (nm) | — | — | — | — |
| | | | Re450/550*2 | — | — | — | — |
| | | | Re650/550*2 | — | — | — | — |
| | | | Rth (nm) | — | — | — | — |
| | | Second Retardation Region/Protective Film | Slow Axis*1 | — | — | — | — |
| | | | Film No. | 6 | 6 | 6 | 6 |
| | | | Re (nm) | 2 | 2 | 2 | 2 |
| | | | Rth (nm) | −6 | −6 | −6 | −6 |
| | Total Rth | | |Rth|*3(nm) | — | — | — | — |
| | Liquid-Crystal Cell | Mode | | FSS | FFS | FFS | FFS |
| | BL Side | Total Rth | |Rth|*3(nm) | 25 | 22 | 76 | 52 |
| | | Second Retardation Region/Protective Film | Slow Axis*1 | ◉ | ◉ | — | ◉ |
| | | | Film No. | 1 | 3 | 6 | 5 |
| | | | Re(nm) | 1 | 6 | 2 | 46 |
| | | | Rth(nm) | 45 | 92 | −6 | 122 |
| | | First Retardation Region (DLC retardation layer) *4 | Slow Axis*1 | ◉ | ◉ | ◉ | ◉ |
| | | | Re(nm) | 140 | 140 | 140 | 140 |
| | | | Re450/550*2 | 1.16 | 1.16 | 1.10 | 1.10 |
| | | | Re650/550*2 | 0.93 | 0.93 | 0.96 | 0.96 |
| | | | Rth(nm) | −70 | −70 | −70 | −70 |

TABLE 8-continued

|  | Constituent Members | Character-istics | Comparative Examples | | | |
|---|---|---|---|---|---|---|
|  |  |  | 5 | 6 | 7 | 8 |
| Evaluation | Second/First Polarizing Film | Direction of Absorption Axis*1 | ◎ | ◎ | ◎ | ◎ |
|  | Color Shift | ΔE | 0.343 | 0.428 | 0.559 | 0.803 |
|  | Viewing Angle CR | Mean Value at polar angle 60° | 130.2 | 152.3 | 78.1 | 82.1 |

In the Table, Comparative Examples 5 to 8 each are the configuration of FIG. 3.

*1: "↔" means that the axis is parallel to the horizontal direction of the panel; "◎" means that the axis is parallel to the vertical direction of the panel; and "↔" and "◎" are orthogonal to each other.
*2: Re450/550 means Re(450)/Re(550); and Re650/550 means Re(650)/Re(550).
*3: |Rth| means the absolute value of Rth of the optical compensatory film including both the first retardation region and the second retardation region.
*4: DLC retardation layer means the retardation layer containing a discotic liquid-crystal compound.

TABLE 9

|  |  |  | Character- | Examples | | | | | |
|---|---|---|---|---|---|---|---|---|---|
|  |  | Constituent Members | istics | 33 | 34 | 35 | 36 | 37 | 38 |
| Con-figura-tion | View-ers' Side | First/Second Polarizing Film | Direction of Absorption Axis*1 | ↔ | ↔ | ↔ | ↔ | ↔ | ↔ |
|  |  | Second Retardation Region/Protective Film | Slow Axis*1 | ◎ | ◎ | ◎ | ◎ | ◎ | ◎ |
|  |  |  | Film No. | 1 | 2 | 3 | 4 | 4 | 4 |
|  |  |  | Re (nm) | 1 | 1 | 6 | 5 | 5 | 5 |
|  |  |  | Rth (nm) | 45 | 35 | 92 | 65 | 65 | 65 |
|  |  | First Retardation Region (DLC retardation layer) *4 | Slow Axis*1 | ◎ | ◎ | ◎ | ◎ | ◎ | ◎ |
|  |  |  | Re (nm) | 140 | 140 | 140 | 140 | 100 | 170 |
|  |  |  | Re450/550*2 | 1.10 | 1.10 | 1.10 | 1.10 | 1.10 | 1.10 |
|  |  |  | Re650/550*2 | 0.96 | 0.96 | 0.96 | 0.96 | 0.96 | 0.96 |
|  |  |  | Rth (nm) | −70 | −70 | −70 | −70 | −50 | −85 |
|  |  | Total Rth | |Rth|*3(nm) | 25 | 35 | 22 | 5 | 15 | 20 |
|  | Liquid-Crystal Cell |  | Mode | IPS | IPS | IPS | IPS | IPS | IPS |
|  | BL Side | Total Rth | |Rth|*3(nm) | — | — | — | — | — | — |
|  |  | First Retardation Region (DLC retardation layer) *4 | Slow Axis*1 | — | — | — | — | — | — |
|  |  |  | Re(nm) | — | — | — | — | — | — |
|  |  |  | Re450/550*2 | — | — | — | — | — | — |
|  |  |  | Re650/550*2 | — | — | — | — | — | — |
|  |  |  | Rth(nm) | — | — | — | — | — | — |
|  |  | Protective Film/Second Retardation Region | Slow Axis*1 | — | — | — | — | — | — |
|  |  |  | Film No. | 6 | 6 | 6 | 6 | 6 | 6 |
|  |  |  | Re(nm) | 2 | 2 | 2 | 2 | 2 | 2 |
|  |  |  | Rth(nm) | −6 | −6 | −6 | −6 | −6 | −6 |
|  |  | Second/First Polarizing Film | Direction of Absorption Axis*1 | ◎ | ◎ | ◎ | ◎ | ◎ | ◎ |
| Evaluation | Color Shift |  | ΔE | 0.155 | 0.263 | 0.102 | 0.093 | 0.196 | 0.170 |
|  | Viewing Angle CR |  | Mean Value at polar angle 60° | 126.2 | 103.9 | 178.8 | 160.4 | 122.5 | 139.6 |

|  |  |  | Character- | Examples | | | | |
|---|---|---|---|---|---|---|---|---|
|  |  | Constituent Members | istics | 39 | 40 | 41 | 42 | 43 |
| Con-figura-tion | View-ers' Side | First/Second Polarizing Film | Direction of Absorption Axis*1 | ↔ | ↔ | ↔ | ↔ | ↔ |
|  |  | Second Retardation Region/Protective Film | Slow Axis*1 | ◎ | ◎ | ◎ | ◎ | ◎ |
|  |  |  | Film No. | 4 | 4 | 4 | 4 | 4 |
|  |  |  | Re (nm) | 5 | 5 | 5 | 5 | 5 |
|  |  |  | Rth (nm) | 65 | 65 | 65 | 65 | 65 |
|  |  | First Retardation Region (DLC retardation layer) *4 | Slow Axis*1 | ◎ | ◎ | ◎ | ◎ | ◎ |
|  |  |  | Re (nm) | 140 | 140 | 140 | 140 | 140 |
|  |  |  | Re450/550*2 | 1.10 | 1.10 | 1.10 | 1.10 | 1.10 |
|  |  |  | Re650/550*2 | 0.96 | 0.96 | 0.96 | 0.96 | 0.96 |
|  |  |  | Rth (nm) | −70 | −70 | −70 | −70 | −70 |
|  |  | Total Rth | |Rth|*3(nm) | 5 | 5 | 5 | 5 | 5 |

TABLE 9-continued

|  |  |  |  |  |  |  |  |  |
|---|---|---|---|---|---|---|---|---|
|  | Liquid-Crystal Cell | Mode | IPS | IPS | IPS | IPS | IPS |
|  | BL Side Total Rth | |Rth|*3(nm) | — | — | — | — | — |
|  | First Retardation | Slow Axis*1 | — | — | — | — | — |
|  | Region (DLC | Re(nm) | — | — | — | — | — |
|  | retardation layer) | Re450/550*2 | — | — | — | — | — |
|  | *4 | Re650/550*2 | — | — | — | — | — |
|  |  | Rth(nm) | — | — | — | — | — |
|  | Protective Film/Second | Slow Axis*1 | — | — | — | — | — |
|  | Retardation Region | Film No. | 8 | 9 | 10 | — | 7 |
|  |  | Re(nm) | 1 | 2 | 2 | — | 0 |
|  |  | Rth(nm) | −3 | −2 | 4 | — | 3 |
|  | Second/First | Direction of | ◉ | ◉ | ◉ | ◉ | ◉ |
|  | Polarizing Film | Absorption Axis*1 |  |  |  |  |  |
| Evaluation | Color Shift | ΔE | 0.088 | 0.079 | 0.075 | 0.078 | 0.082 |
|  | Viewing Angle CR | Mean Value at polar angle 60° | 164.2 | 169.0 | 175.6 | 170.1 | 165.9 |

In the Table, Examples 33 to 42 each are the configuration of FIG. 2.

*1: "⇔" means that the axis is parallel to the horizontal direction of the panel; "◉" means that the axis is parallel to the vertical direction of the panel; and "⇔" and "◉" are orthogonal to each other.
*2: Re450/550 means Re(450)/Re(550); and Re650/550 means Re(650)/Re(550).
*3: |Rth| means the absolute value of Rth of the optical compensatory film including both the first retardation region and the second retardation region.
*4: DLC retardation layer means the retardation layer containing a discotic liquid-crystal compound.

TABLE 10

|  |  |  |  | Character- | Comparative Examples | | | |
|---|---|---|---|---|---|---|---|---|
|  |  | Constituent Members |  | istics | 9 | 10 | 11 | 12 |
| Con-fig-ura-tion | View-ers' Side | First/Second Polarizing Film |  | Direction of Absorption Axis*1 | ⇔ | ⇔ | ⇔ | ⇔ |
|  |  | Second Retardation |  | Slow Axis*1 | ◉ | ◉ | — | ◉ |
|  |  | Region/Protective Film |  | Film No. | 1 | 3 | 6 | 5 |
|  |  |  |  | Re (nm) | 1 | 6 | 2 | 46 |
|  |  |  |  | Rth (nm) | 45 | 92 | −6 | 122 |
|  |  | First Retardation |  | Slow Axis*1 | ◉ | ◉ | ◉ | ◉ |
|  |  | Region (DLC |  | Re (nm) | 140 | 140 | 140 | 140 |
|  |  | retardation layer) |  | Re450/550*2 | 1.16 | 1.16 | 1.10 | 1.10 |
|  |  | *4 |  | Re650/550*2 | 0.93 | 0.93 | 0.96 | 0.96 |
|  |  |  |  | Rth (nm) | −70 | −70 | −70 | −70 |
|  |  | Total Rth |  | |Rth|*3(nm) | 25 | 22 | 76 | 52 |
|  | Liquid-Crystal Cell |  |  | Mode | IPS | IPS | IPS | IPS |
|  | BL Side Total Rth |  |  | |Rth|*3(nm) | — | — | — | — |
|  |  | First Retardation |  | Slow Axis*1 | — | — | — | — |
|  |  | Region (DLC |  | Re(nm) | — | — | — | — |
|  |  | retardation layer) |  | Re450/550*2 | — | — | — | — |
|  |  | *4 |  | Re650/550*2 | — | — | — | — |
|  |  |  |  | Rth(nm) | — | — | — | — |
|  |  | Protective Film/Second |  | Slow Axis*1 | — | — | — | — |
|  |  | Retardation Region |  | Film No. | 6 | 6 | 6 | 6 |
|  |  |  |  | Re(nm) | 2 | 2 | 2 | 2 |
|  |  |  |  | Rth(nm) | −6 | −6 | −6 | −6 |
|  |  | Second/First |  | Direction of | ◉ | ◉ | ◉ | ◉ |
|  |  | Polarizing Film |  | Absorption Axis*1 |  |  |  |  |
| Evaluation |  | Color Shift |  | ΔE | 0.361 | 0.329 | 0.671 | 0.598 |
|  |  | Viewing Angle CR |  | Mean Value at polar angle 60° | 125.5 | 172.4 | 79.6 | 87.3 |

In the Table, Comparative Examples 9 to 12 each are the configuration of FIG. 2.

*1: "⇔" means that the axis is parallel to the horizontal direction of the panel; "◉" means that the axis is parallel to the vertical direction of the panel; and "⇔" and "◉" are orthogonal to each other.
*2: Re450/550 means Re(450)/Re(550); and Re650/550 means Re(650)/Re(550).
*3: |Rth| means the absolute value of Rth of the optical compensatory film including both the first retardation region and the second retardation region.
*4: DLC retardation layer means the retardation layer containing a discotic liquid-crystal compound.

TABLE 11

|  |  | Constituent Members | Character-istics | Examples 44 | 45 | 46 | 47 | 48 | 49 |
|---|---|---|---|---|---|---|---|---|---|
| Con-figura-tion | View-ers' Side | First/Second Polarizing Film | Direction of Absorption Axis*1 | ⇔ | ⇔ | ⇔ | ⇔ | ⇔ | ⇔ |
|  |  | Second Retardation Region/Protective Film | Slow Axis*1 | — | — | — | — | — | — |
|  |  |  | Film No. | 6 | 6 | 6 | 6 | 6 | 6 |
|  |  |  | Re (nm) | 2 | 2 | 2 | 2 | 2 | 2 |
|  |  |  | Rth (nm) | −6 | −6 | −6 | −6 | −6 | −6 |
|  |  | First Retardation Region (DLC retardation layer) *4 | Slow Axis*1 | — | — | — | — | — | — |
|  |  |  | Re (nm) | — | — | — | — | — | — |
|  |  |  | Re450/550*2 | — | — | — | — | — | — |
|  |  |  | Re650/550*2 | — | — | — | — | — | — |
|  |  |  | Rth (nm) | — | — | — | — | — | — |
|  |  | Total Rth | |Rth|*3(nm) | — | — | — | — | — | — |
|  | Liquid-Crystal Cell | Mode | | FFS | FFS | FFS | FFS | FFS | FFS |
|  | BL Side | Total Rth | |Rth|*3(nm) | 25 | 35 | 22 | 5 | 15 | 20 |
|  |  | First Retardation (Region DLC retardation layer) *4 | Slow Axis*1 | ⇔ | ⇔ | ⇔ | ⇔ | ⇔ | ⇔ |
|  |  |  | Re(nm) | 140 | 140 | 140 | 140 | 100 | 170 |
|  |  |  | Re450/550*2 | 1.10 | 1.10 | 1.10 | 1.10 | 1.10 | 1.10 |
|  |  |  | Re650/550*2 | 0.96 | 0.96 | 0.96 | 0.96 | 0.96 | 0.96 |
|  |  |  | Rth(nm) | −70 | −70 | −70 | −70 | −50 | −85 |
|  |  | Protective Film/Second Retardation Region | Slow Axis*1 | ⇔ | ⇔ | ⇔ | ⇔ | ⇔ | ⇔ |
|  |  |  | Film No. | 1 | 2 | 3 | 4 | 4 | 4 |
|  |  |  | Re(nm) | 1 | 1 | 6 | 5 | 5 | 5 |
|  |  |  | Rth(nm) | 45 | 35 | 92 | 65 | 65 | 65 |
|  |  | Second/First Polarizing Film | Direction of Absorption Axis*1 | ⊙ | ⊙ | ⊙ | ⊙ | ⊙ | ⊙ |
| Evaluation |  | Color Shift | ΔE | 0.182 | 0.264 | 0.097 | 0.101 | 0.236 | 0.143 |
|  |  | Viewing Angle CR | Mean Value at polar angle 60° | 121.9 | 103.6 | 186.2 | 160.5 | 115.0 | 157.6 |

|  |  | Constituent Members | Character-istics | Examples 50 | 51 | 52 | 53 | 54 | 55 |
|---|---|---|---|---|---|---|---|---|---|
| Con-figura-tion | View-ers' Side | First/Second Polarizing Film | Direction of Absorption Axis*1 | ⇔ | ⇔ | ⇔ | ⇔ | ⇔ | ⊙ |
|  |  | Second Retardation Region/Protective Film | Slow Axis*1 | — | — | — | — | — | ⇔ |
|  |  |  | Film No. | 8 | 9 | 10 | — | 7 | 4 |
|  |  |  | Re (nm) | 1 | 2 | 2 | 0 | 0 | 5 |
|  |  |  | Rth (nm) | −3 | −2 | 4 | 0 | 3 | 65 |
|  |  | First Retardation Region (DLC retardation layer) *4 | Slow Axis*1 | — | — | — | — | — | ⇔ |
|  |  |  | Re (nm) | — | — | — | — | — | 140 |
|  |  |  | Re450/550*2 | — | — | — | — | — | 1.10 |
|  |  |  | Re650/550*2 | — | — | — | — | — | 0.96 |
|  |  |  | Rth (nm) | — | — | — | — | — | −70 |
|  |  | Total Rth | |Rth|*3(nm) | — | — | — | — | — | 5 |
|  | Liquid-Crystal Cell | Mode | | FFS | FFS | FFS | FFS | FFS | FFS |
|  | BL Side | Total Rth | |Rth|*3(nm) | 5 | 5 | 5 | 5 | 5 | — |
|  |  | First Retardation Region (DLC retardation layer) *4 | Slow Axis*1 | ⇔ | ⇔ | ⇔ | ⇔ | ⇔ | — |
|  |  |  | Re(nm) | 140 | 140 | 140 | 140 | 140 | — |
|  |  |  | Re450/550*2 | 1.10 | 1.10 | 1.10 | 1.10 | 1.10 | — |
|  |  |  | Re650/550*2 | 0.96 | 0.96 | 0.96 | 0.96 | 0.96 | — |
|  |  |  | Rth(nm) | −70 | −70 | −70 | −70 | −70 | — |
|  |  | Protective Film/Second Retardation Region | Slow Axis*1 | ⇔ | ⇔ | ⇔ | ⇔ | ⇔ | — |
|  |  |  | Film No. | 4 | 4 | 4 | 4 | 4 | 6 |
|  |  |  | Re(nm) | 5 | 5 | 5 | 5 | 5 | 2 |
|  |  |  | Rth(nm) | 65 | 65 | 65 | 65 | 65 | −6 |
|  |  | Second/First Polarizing Film | Direction of Absorption Axis*1 | ⊙ | ⊙ | ⊙ | ⊙ | ⊙ | ⇔ |
| Evaluation |  | Color Shift | ΔE | 0.103 | 0.102 | 0.099 | 0.101 | 0.101 | 0.085 |
|  |  | Viewing Angle CR | Mean Value at polar angle 60° | 159.3 | 163.8 | 174.1 | 165.6 | 160.5 | 166.4 |

In the Table, Examples 44 to 54 each are the configuration of FIG. 4; and Example 55 is the configuration of FIG. 2.

*1: "⇔" means that the axis is parallel to the horizontal direction of the panel; "⊙" means that the axis is parallel to the vertical direction of the panel; and "⇔" and "⊙" are orthogonal to each other.

*2: Re450/550 means Re(450)/Re(550); and Re650/550 means Re(650)/Re(550).

*3: |Rth| means the absolute value of Rth of the optical compensatory film including both the first retardation region and the second retardation region.

*4: DLC retardation layer means the retardation layer containing a discotic liquid-crystal compound.

TABLE 12

| | | Constituent Members | Characteristics | Comparative Examples 13 | 14 | 15 | 16 |
|---|---|---|---|---|---|---|---|
| Configuration | Viewers' Side | First/Second Polarizing Film | Direction of Absorption Axis*1 | ⇔ | ⇔ | ⇔ | ⇔ |
| | | Second Retardation Region/Protective Film | Slow Axis*1 | — | — | — | — |
| | | | Film No. | 6 | 6 | 6 | 6 |
| | | | Re (nm) | 2 | 2 | 2 | 2 |
| | | | Rth (nm) | −6 | −6 | −6 | −6 |
| | | First Retardation Region (DLC retardation layer) *4 | Slow Axis*1 | — | — | — | — |
| | | | Re (nm) | — | — | — | — |
| | | | Re450/550*2 | — | — | — | — |
| | | | Re650/550*2 | — | — | — | — |
| | | | Rth (nm) | — | — | — | — |
| | | Total Rth | |Rth|*3(nm) | — | — | — | — |
| | Liquid-Crystal Cell | | Mode | FFS | FFS | FFS | FFS |
| | BL Side | Total Rth | |Rth|*3(nm) | 25 | 22 | 76 | 52 |
| | | First Retardation Region (DLC retardation layer) *4 | Slow Axis*1 | ⇔ | ⇔ | ⇔ | ⇔ |
| | | | Re(nm) | 140 | 140 | 140 | 140 |
| | | | Re450/550*2 | 1.16 | 1.16 | 1.10 | 1.10 |
| | | | Re650/550*2 | 0.93 | 0.93 | 0.96 | 0.96 |
| | | | Rth(nm) | −70 | −70 | −70 | −70 |
| | | Protective Film/Second Retardation Region | Slow Axis*1 | ◉ | ◉ | — | ⇔ |
| | | | Film No. | 1 | 3 | 6 | 5 |
| | | | Re(nm) | 1 | 6 | 2 | 46 |
| | | | Rth(nm) | 45 | 92 | −6 | 122 |
| | | Second/First Polarizing Film | Direction of Absorption Axis*1 | ◉ | ◉ | ◉ | ◉ |
| Evaluation | | Color Shift | ΔE | 0.368 | 0.315 | 0.599 | 0.471 |
| | | Viewing Angle CR | Mean Value at polar angle 60° | 125.8 | 181.1 | 75.6 | 85.4 |

In the Table, Comparative Examples 13 to 16 each are the configuration of FIG. 4.

*1: "⇔" means that the axis is parallel to the horizontal direction of the panel; "◉" means that the axis is parallel to the vertical direction of the panel; and "⇔" and "◉" are orthogonal to each other.
*2: Re450/550 means Re(450)/Re(550); and Re650/550 means Re(650)/Re(550).
*3: |Rth| means the absolute value of Rth of the optical compensatory film including both the first retardation region and the second retardation region.
*4: DLC retardation layer means the retardation layer containing a discotic liquid-crystal compound.

From the results shown in the above Tables, it is understood that the IPS or FFS-mode liquid-crystal display devices of Examples, in which is used an optical compensatory film prepared by laminating a second retardation region including a polymer film satisfying predetermined optical characteristics and a first retardation region including a retardation layer where discotic liquid-crystal molecules are fixed in a vertical alignment state and Re shows predetermined wavelength dispersion characteristics, in such a manner that the slow axes thereof are parallel to each other, are reduced in the color shift in oblique directions, as compared with the IPS or FFS-mode liquid-crystal display devices of Comparative Examples, in which is used an optical compensatory film having the same configuration as in Examples except that the wavelength dispersion characteristics of the retardation layer are outside the scope of the invention. In particular, it is understood that the devices of Examples in which the absolute value of the total Rth of the optical compensatory film used falls within a predetermined range, and the devices of Examples in which the protective film on the liquid-crystal cell side of the second polarizing film is a polymer film satisfying predetermined optical characteristics exhibit totally excellent display characteristics in that not only the color shift is remarkably reduced but also the viewing angle contrast is increased.

In addition, it is also understood that the devices of Examples in which the first retardation region containing a retardation layer where the vertical alignment state of the discotic liquid-crystal compound molecules therein is fixed is disposed on the polarizing element side are superior to the devices of Examples in which the first retardation region containing a retardation layer where the vertical alignment state of the discotic liquid-crystal compound molecules therein is fixed is disposed on the liquid-crystal cell side, in that the color shift in the former is reduced more and that the former exhibit totally excellent display characteristics.

5. Examples Using Thin Film

Dope P10 and Dope T30 having a following formulation were prepared respectively.

Formulation of Dope P10:

| | |
|---|---|
| Commercially available "DIANAL BR88" from Mitsubishi Rayon Co., Ltd. | 100.0 parts by mass |
| Additive AA1 | 5.8 parts by mass |
| Additive AA2 | 1.8 parts by mass |
| Additive UU1 | 2.0 parts by mass |

Formulation of Dope T30:

| | |
|---|---|
| Cellulose acylate (degree of substitution 2.42) | 100.0 parts by mass |
| Additive AA1 | 5.8 parts by mass |
| Additive AA2 | 1.8 parts by mass |
| Additive UU1 | 2.0 parts by mass |

Additive AA1 is a compound represented by the following formula. In the formula, R represents a benzoyl, and the compound having the mean degree of substitution of from 5 to 7 was used.

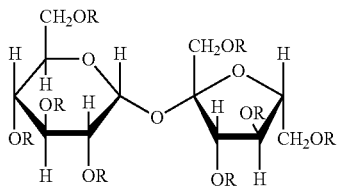

Additive AA2 is a compound represented by the following formula. The structures of $R^9$ and the degrees of substitution thereof are shown below.

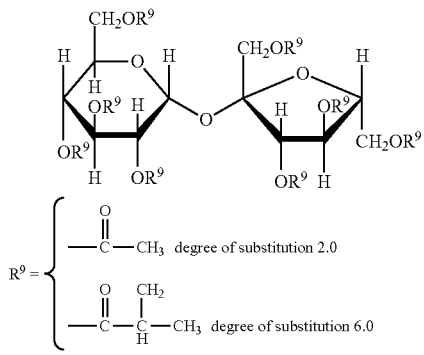

Additive UU1 is a compound represented by the following formula.

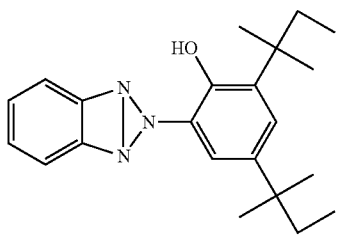 [SMILES: CCC(C)(C)c1cc(-n2n3c4ccccc4n23)c(O)c(C(C)(C)CC)c1]

A lamination film was prepared by using Dope P10 and Dope T30 according to a solution casting method. More specifically, the lamination film was prepared as follows. Via a casting die capable of carrying out a three-layered co-casting, the above-described two types of dopes were cast on a metallic support. Casting was carried out so that a lower layer (formed of T30), a medium layer (formed of P10) and an upper layer (formed of T30) was stacked on the support in that order. The viscosity of each of the layers was adjusted by the concentration of the solid content of each of the dopes depending on the combination thereof if desired for carrying out casting uniformly. The dopes on the support were dried by a dry air of 40 degrees Celsius, and in this way, a lamination film was prepared. After that, the film was removed from the support and dried by a dry air of 105 degrees Celsius for 5 minutes while both ends thereof were fixed by pins so as to keep the distance between the pins same. After the pins were removed, the lamination film was dried again at 130 degrees Celsius for 20 minutes, and was rolled up.

After that, the three layers of the film were separated from each other. The lower layer had same optical properties (Re=1.0 nm and Rth=35 nm) as those of Polymer Film 2 prepared in the above-described examples, and had a thickness of 20 micro meters. In this way, a thin film was prepared stably.

Each of the liquid crystal display devices was produced in the same manner as the examples employing Polymer Film 2, except that the obtained thin film was used in place of Polymer Film 2. The liquid crystal display devices were evaluated in the same manner as described above, and it was confirmed that each of the produced devices showed a good result same as that of the example employing Polymer Film 2.

The invention claimed is:

1. An IPS or FFS-mode liquid-crystal display device comprising:
   a first polarizing film,
   an optical compensatory film comprising a first retardation region and a second retardation region adjacent to the first retardation region,
   a first substrate,
   a liquid-crystal layer comprising a nematic liquid-crystal material, and
   a second substrate,
   a second polarizing film on the more outer side of the second substrate in that order, wherein:
   liquid-crystal molecules of the nematic liquid-crystal material are aligned parallel to the surfaces of the pair of substrates at the black state,
   a slow axis of the first retardation region is parallel to a slow axis of the second retardation region,
   an absorption axis of the first polarizing film and an absorption axis of the second polarizing film are disposed orthogonally to each other,
   a slow axis of the liquid-crystal layer is parallel to the absorption axis of the second polarizing film,
   the absorption axis of the first polarizing film is parallel to the slow axis of the first retardation region and the slow axis of the second retardation region,
   retardation in-plane at a wavelength of 550 nm, Re(550) of the second retardation region is equal to or less than 20 nm, and retardation along the thickness-direction at a wavelength of 550 nm, Rth(550) of the second retardation region is from 20 nm to 120 nm,
   the first retardation region comprises a retardation layer containing a vertically-aligned discotic liquid-crystal compound, and Re thereof at a wavelength of 450 nm, 550 nm and 650 nm, Re(450), Re(550) and Re(650) satisfy Re(450)/Re(550) of from 1 to 1.13 and Re(650)/Re(550) of from 0.94 to 1,
   where retardation in-plane Re and retardation along the thickness-direction Rth are defined as Re=(nx−ny)×d, and Rth={(nx+ny)/2−nz}×d, in which nx and ny each are the in-plane refractive index (nx≥ny), nz is the thickness-direction refractive index, and d is the thickness of the film.

2. The IPS or FFS-mode liquid-crystal display device according to claim 1, wherein the first polarizing film, the first retardation region and the second retardation region are disposed in that order.

3. The IPS or FFS-mode liquid-crystal display device according to claim 1, wherein the first polarizing film, the second retardation region and the first retardation region are disposed in that order.

4. The IPS or FFS-mode liquid-crystal display device according to claim 1, wherein Re(550) of the first retardation region is from 50 nm to 200 nm.

5. The IPS or FFS-mode liquid-crystal display device according to claim 1, wherein the absolute value of total Rth(550) of the optical compensatory film, |Rth(550)| is equal to or less than 40 nm.

6. The IPS or FFS-mode liquid-crystal display device according to claim 1, wherein the second retardation region comprises multiple layers, a layer of the multiple layers that is adjacent to the first retardation region is an alignment layer, the first retardation region comprises a composition containing at least a discotic liquid-crystal compound and an alignment controlling agent, and the alignment controlling agent has the effect of reducing the tilt angle of the director for the discotic liquid-crystal compound on the air interface side.

7. The IPS or FFS-mode liquid-crystal display device according to claim 2, wherein the first retardation region has a polymer film along with the retardation layer, and the polymer film is adjacent to the first polarizing film.

8. The IPS or FFS-mode liquid-crystal display device according to claim 1, which has a polymer film between the second polarizing film and the second substrate.

9. The IPS or FFS-mode liquid-crystal display device according to claim 7, wherein the absolute value of retardation in-plane at a wavelength of 550 nm, Re(550) of the polymer film, |Re(550)| is equal to or less than 10 nm, and the absolute value of retardation along the thickness-direction at the same wavelength, Rth(550) thereof, |Rth(550)| is equal to or less than 30 nm.

10. The IPS or FFS-mode liquid-crystal display device according to claim 7, wherein |Re(400)−Re(700)| of the polymer film is equal to or less than 10 nm, and |Rth(400)−Rth(700)| thereof is equal to or less than 35 nm.

11. The IPS or FFS-mode liquid-crystal display device according to claim 7, wherein the thickness of the polymer film is from 10 to 90 μm.

12. The IPS or FFS-mode liquid-crystal display device according to claim 7, wherein the polymer film is a cellulose acylate film, a cyclic olefin polymer film, or an acrylic polymer film.

13. The IPS or FFS-mode liquid-crystal display device according to claim 12, wherein the acrylic polymer film contains an acrylic polymer containing at least one unit selected from a lactone ring unit, a maleic anhydride unit and a glutaric anhydride unit.

* * * * *